United States Patent
Vandike et al.

(10) Patent No.: US 12,284,934 B2
(45) Date of Patent: Apr. 29, 2025

(54) SYSTEMS AND METHODS FOR PREDICTIVE TRACTIVE CHARACTERISTICS AND CONTROL

(71) Applicant: Deere & Company, Moline, IL (US)

(72) Inventors: Nathan R. Vandike, Geneseo, IL (US); William D. Graham, East Moline, IL (US); Cary S. Hubner, Geneseo, IL (US); Andrew J. Peterson, Ankeny, IA (US); Benjamin M. Lovett, Ottumwa, IA (US); Darin L. Roth, Batavia, IA (US); Martin Unterpaintner, Saarbrücken (DE)

(73) Assignee: Deere & Company, Moline, IL (US)

( * ) Notice: Subject to any disclaimer, the term of this patent is extended or adjusted under 35 U.S.C. 154(b) by 311 days.

(21) Appl. No.: 17/716,362

(22) Filed: Apr. 8, 2022

(65) Prior Publication Data

US 2023/0320249 A1    Oct. 12, 2023

(51) Int. Cl.
*A01B 79/00*    (2006.01)
*A01B 69/00*    (2006.01)
*A01C 21/00*    (2006.01)

(52) U.S. Cl.
CPC .......... *A01B 79/005* (2013.01); *A01B 69/004* (2013.01); *A01C 21/005* (2013.01)

(58) Field of Classification Search
CPC .... A01B 79/005; A01B 69/004; A01C 21/005
USPC ........................................................ 701/50
See application file for complete search history.

(56) References Cited

U.S. PATENT DOCUMENTS

| | | | |
|---|---|---|---|
| 3,568,157 A | 3/1971 | Downing et al. |
| 3,580,257 A | 5/1971 | Teague |
| 3,599,543 A | 8/1971 | Kerridge |
| 3,775,019 A | 11/1973 | Konig et al. |
| 3,856,754 A | 12/1974 | Habermeier et al. |
| 4,129,573 A | 12/1978 | Bellus et al. |

(Continued)

FOREIGN PATENT DOCUMENTS

| | | |
|---|---|---|
| AR | 108898 A1 | 10/2018 |
| AU | 20100224431 A1 | 4/2011 |

(Continued)

OTHER PUBLICATIONS

Leu et al., Grazing Corn Residue Using Resources and Reducing Costs, Aug. 2009, 4 pages.

(Continued)

*Primary Examiner* — Yazan A Soofi
*Assistant Examiner* — Ahmed Alkirsh
(74) *Attorney, Agent, or Firm* — Christopher R. Christenson; Kelly, Holt & Christenson PLLC

(57) ABSTRACT

An information map is obtained by an agricultural system. The information map maps values of a characteristic at different geographic locations in a worksite. An in-situ sensor detects tractive characteristic values as a mobile agricultural machine operates at the worksite. A predictive map generator generates a predictive map that maps predictive tractive characteristic values at different geographic locations in the worksite based on a relationship between values of the characteristic in the information map and tractive characteristic values detected by the in-situ sensor. The predictive map can be output and used in automated machine control.

18 Claims, 14 Drawing Sheets

(56) References Cited

U.S. PATENT DOCUMENTS

| | | |
|---|---|---|
| 4,166,735 A | 9/1979 | Pilgram et al. |
| 4,183,742 A | 1/1980 | Sasse et al. |
| 4,268,679 A | 5/1981 | Lavanish |
| 4,349,377 A | 9/1982 | Durr et al. |
| 4,360,677 A | 11/1982 | Doweyko et al. |
| 4,435,203 A | 3/1984 | Funaki et al. |
| 4,493,726 A | 1/1985 | Burdeska et al. |
| 4,527,241 A | 7/1985 | Sheehan et al. |
| 4,566,901 A | 1/1986 | Martin et al. |
| 4,584,013 A | 4/1986 | Brunner |
| 4,687,505 A | 8/1987 | Sylling et al. |
| 4,857,101 A | 8/1989 | Musco et al. |
| 4,911,751 A | 3/1990 | Nyffeler et al. |
| 5,059,154 A | 10/1991 | Reyenga |
| 5,089,043 A | 2/1992 | Hayase et al. |
| 5,246,164 A | 9/1993 | McCann et al. |
| 5,246,915 A | 9/1993 | Lutz et al. |
| 5,250,690 A | 10/1993 | Turner et al. |
| 5,296,702 A | 3/1994 | Beck et al. |
| 5,300,477 A | 4/1994 | Tice |
| 5,416,061 A | 5/1995 | Hewett et al. |
| 5,477,459 A | 12/1995 | Clegg et al. |
| 5,488,817 A | 2/1996 | Paquet et al. |
| 5,563,112 A | 10/1996 | Barnes, III |
| 5,585,626 A | 12/1996 | Beck et al. |
| 5,586,033 A | 12/1996 | Hall |
| 5,592,606 A | 1/1997 | Myers |
| 5,606,821 A | 3/1997 | Sadjadi et al. |
| 5,666,793 A | 9/1997 | Bottinger |
| 5,712,782 A | 1/1998 | Weigelt et al. |
| 5,721,679 A | 2/1998 | Monson |
| 5,767,373 A | 6/1998 | Ward et al. |
| 5,771,169 A | 6/1998 | Wendte |
| 5,789,741 A | 8/1998 | Kinter et al. |
| 5,809,440 A | 9/1998 | Beck et al. |
| 5,841,282 A | 11/1998 | Christy et al. |
| 5,849,665 A | 12/1998 | Gut et al. |
| 5,878,821 A | 3/1999 | Flenker et al. |
| 5,899,950 A | 5/1999 | Milender et al. |
| 5,902,343 A | 5/1999 | Hale et al. |
| 5,915,492 A | 6/1999 | Yates et al. |
| 5,957,304 A | 9/1999 | Dawson |
| 5,974,348 A | 10/1999 | Rocks |
| 5,978,723 A | 11/1999 | Hale et al. |
| 5,991,687 A | 11/1999 | Hale et al. |
| 5,991,694 A | 11/1999 | Gudat et al. |
| 5,995,859 A | 11/1999 | Takahashi |
| 5,995,894 A | 11/1999 | Wendte |
| 5,995,895 A | 11/1999 | Watt et al. |
| 6,004,076 A | 12/1999 | Cook et al. |
| 6,016,713 A | 1/2000 | Hale |
| 6,029,106 A | 2/2000 | Hale et al. |
| 6,041,582 A | 3/2000 | Tiede et al. |
| 6,073,070 A | 6/2000 | Diekhans |
| 6,073,428 A | 6/2000 | Diekhans |
| 6,085,135 A | 7/2000 | Steckel |
| 6,119,442 A | 9/2000 | Hale |
| 6,119,531 A | 9/2000 | Wendte et al. |
| 6,128,574 A | 10/2000 | Diekhans |
| 6,141,614 A | 10/2000 | Janzen et al. |
| 6,178,253 B1 | 1/2001 | Hendrickson et al. |
| 6,185,990 B1 | 2/2001 | Missotten et al. |
| 6,188,942 B1 | 2/2001 | Corcoran et al. |
| 6,199,000 B1 | 3/2001 | Keller et al. |
| 6,204,856 B1 | 3/2001 | Wood et al. |
| 6,205,381 B1 | 3/2001 | Motz et al. |
| 6,205,384 B1 | 3/2001 | Diekhans |
| 6,216,071 B1 | 4/2001 | Motz |
| 6,236,907 B1* | 5/2001 | Hauwiller ............ A01B 79/005 701/50 |
| 6,236,924 B1 | 5/2001 | Motz et al. |
| 6,272,819 B1 | 8/2001 | Wendte et al. |
| 6,327,569 B1 | 12/2001 | Reep |
| 6,374,173 B1 | 4/2002 | Ehlbeck |
| 6,380,745 B1 | 4/2002 | Anderson et al. |
| 6,431,790 B1 | 8/2002 | Anderegg et al. |
| 6,451,733 B1 | 9/2002 | Pidskalny et al. |
| 6,505,146 B1 | 1/2003 | Blackmer |
| 6,505,998 B1 | 1/2003 | Bullivant |
| 6,539,102 B1 | 3/2003 | Anderson et al. |
| 6,549,849 B2 | 4/2003 | Lange et al. |
| 6,584,390 B2 | 6/2003 | Beck |
| 6,591,145 B1 | 7/2003 | Hoskinson et al. |
| 6,591,591 B2 | 7/2003 | Coers et al. |
| 6,592,453 B2 | 7/2003 | Coers et al. |
| 6,604,432 B1 | 8/2003 | Hamblen et al. |
| 6,681,551 B1 | 1/2004 | Sheidler et al. |
| 6,682,416 B2 | 1/2004 | Behnke et al. |
| 6,687,616 B1 | 2/2004 | Peterson et al. |
| 6,729,189 B2 | 5/2004 | Paakkinen |
| 6,735,568 B1 | 5/2004 | Buckwalter et al. |
| 6,826,472 B1* | 11/2004 | Kamei ............... G01C 21/3605 701/428 |
| 6,834,550 B2 | 12/2004 | Upadhyaya et al. |
| 6,838,564 B2 | 1/2005 | Edmunds et al. |
| 6,846,128 B2 | 1/2005 | Sick |
| 6,932,554 B2 | 8/2005 | Isfort et al. |
| 6,999,877 B1 | 2/2006 | Dyer et al. |
| 7,073,374 B2 | 7/2006 | Berkman |
| 7,167,797 B2 | 1/2007 | Faivre et al. |
| 7,167,800 B2 | 1/2007 | Faivre et al. |
| 7,191,062 B2 | 3/2007 | Chi et al. |
| 7,194,965 B2 | 3/2007 | Hickey et al. |
| 7,211,994 B1 | 5/2007 | Mergen et al. |
| 7,248,968 B2 | 7/2007 | Reid |
| 7,255,016 B2 | 8/2007 | Burton |
| 7,261,632 B2 | 8/2007 | Pirro et al. |
| 7,302,837 B2 | 12/2007 | Wendte |
| 7,308,326 B2 | 12/2007 | Maertens et al. |
| 7,313,478 B1 | 12/2007 | Anderson et al. |
| 7,318,010 B2 | 1/2008 | Anderson |
| 7,347,168 B2 | 3/2008 | Reckels et al. |
| 7,408,145 B2 | 8/2008 | Holland |
| 7,480,564 B2 | 1/2009 | Metzler et al. |
| 7,483,791 B2 | 1/2009 | Anderegg et al. |
| 7,537,519 B2 | 5/2009 | Huster et al. |
| 7,557,066 B2 | 7/2009 | Hills et al. |
| 7,628,059 B1 | 12/2009 | Scherbring |
| 7,687,435 B2 | 3/2010 | Witschel et al. |
| 7,703,036 B2 | 4/2010 | Satterfield et al. |
| 7,725,233 B2 | 5/2010 | Hendrickson et al. |
| 7,733,416 B2 | 6/2010 | Gal |
| 7,756,624 B2 | 7/2010 | Diekhans et al. |
| 7,798,894 B2 | 9/2010 | Isfort |
| 7,827,042 B2 | 11/2010 | Jung et al. |
| 7,915,200 B2 | 3/2011 | Epp et al. |
| 7,945,364 B2 | 5/2011 | Schricker et al. |
| 7,993,188 B2 | 8/2011 | Ritter |
| 8,024,074 B2 | 9/2011 | Stelford et al. |
| 8,060,283 B2 | 11/2011 | Mott et al. |
| 8,107,681 B2 | 1/2012 | Gaal |
| 8,145,393 B2 | 3/2012 | Foster et al. |
| 8,147,176 B2 | 4/2012 | Coers et al. |
| 8,152,610 B2 | 4/2012 | Harrington |
| 8,190,335 B2 | 5/2012 | Vik et al. |
| 8,195,342 B2 | 6/2012 | Anderson |
| 8,195,358 B2 | 6/2012 | Anderson |
| 8,213,964 B2 | 7/2012 | Fitzner et al. |
| 8,224,500 B2 | 7/2012 | Anderson |
| 8,252,723 B2 | 8/2012 | Jakobi et al. |
| 8,254,351 B2 | 8/2012 | Fitzner et al. |
| 8,321,365 B2 | 11/2012 | Anderson |
| 8,329,717 B2 | 12/2012 | Minn et al. |
| 8,332,105 B2 | 12/2012 | Laux |
| 8,338,332 B1 | 12/2012 | Hacker et al. |
| 8,340,862 B2 | 12/2012 | Baumgarten et al. |
| 8,407,157 B2 | 3/2013 | Anderson |
| 8,428,829 B2 | 4/2013 | Brunnert et al. |
| 8,478,493 B2 | 7/2013 | Anderson |
| 8,488,865 B2 | 7/2013 | Hausmann et al. |
| 8,494,727 B2 | 7/2013 | Green et al. |
| 8,527,157 B2 | 9/2013 | Imhof et al. |
| 8,544,397 B2 | 10/2013 | Bassett |
| 8,577,561 B2 | 11/2013 | Green et al. |

(56) References Cited

U.S. PATENT DOCUMENTS

| | | |
|---|---|---|
| 8,606,454 B2 | 12/2013 | Wang et al. |
| 8,626,406 B2 | 1/2014 | Schleicher et al. |
| 8,635,903 B2 | 1/2014 | Oetken et al. |
| 8,649,940 B2 | 2/2014 | Bonefas |
| 8,656,693 B2 | 2/2014 | Madsen et al. |
| 8,662,972 B2 | 3/2014 | Behnke et al. |
| 8,671,760 B2 | 3/2014 | Wallrath et al. |
| 8,677,724 B2 | 3/2014 | Chaney et al. |
| 8,738,238 B2 | 5/2014 | Rekow |
| 8,738,244 B2 | 5/2014 | Lenz et al. |
| 8,755,976 B2 | 6/2014 | Peters et al. |
| 8,781,692 B2 | 7/2014 | Kormann |
| 8,789,563 B2 | 7/2014 | Wenzel |
| 8,814,640 B2 | 8/2014 | Behnke et al. |
| 8,843,269 B2 | 9/2014 | Anderson et al. |
| 8,868,304 B2 | 10/2014 | Bonefas |
| 8,909,389 B2 | 12/2014 | Meyer |
| D721,740 S | 1/2015 | Schmaltz et al. |
| 8,942,860 B2 | 1/2015 | Morselli |
| 8,962,523 B2 | 2/2015 | Rosinger et al. |
| 9,002,591 B2 | 4/2015 | Wang et al. |
| 9,008,918 B2 | 4/2015 | Missotten et al. |
| 9,009,087 B1 | 4/2015 | Mewes et al. |
| 9,011,222 B2 | 4/2015 | Johnson et al. |
| 9,014,901 B2 | 4/2015 | Wang et al. |
| 9,043,096 B2 | 5/2015 | Zielke et al. |
| 9,043,129 B2 | 5/2015 | Bonefas et al. |
| 9,066,465 B2 | 6/2015 | Hendrickson et al. |
| 9,072,227 B2 | 7/2015 | Wenzel |
| 9,095,090 B2 | 8/2015 | Casper et al. |
| 9,119,342 B2 | 9/2015 | Bonefas |
| 9,127,428 B2 | 9/2015 | Meier |
| 9,131,644 B2 | 9/2015 | Osborne |
| 9,152,938 B2 | 10/2015 | Lang et al. |
| 9,173,339 B2 | 11/2015 | Sauder et al. |
| 9,179,599 B2 | 11/2015 | Bischoff |
| 9,188,518 B2 | 11/2015 | Snyder et al. |
| 9,188,986 B2 | 11/2015 | Baumann |
| 9,226,449 B2 | 1/2016 | Bischoff |
| 9,234,317 B2 | 1/2016 | Chi |
| 9,235,214 B2 | 1/2016 | Anderson |
| 9,301,447 B2 | 4/2016 | Kormann |
| 9,301,466 B2 | 4/2016 | Kelly |
| 9,313,951 B2 | 4/2016 | Herman et al. |
| 9,326,443 B2 | 5/2016 | Zametzer et al. |
| 9,326,444 B2 | 5/2016 | Bonefas |
| 9,392,746 B2 | 7/2016 | Darr et al. |
| 9,405,039 B2 | 8/2016 | Anderson |
| 9,410,840 B2 | 8/2016 | Acheson et al. |
| 9,439,342 B2 | 9/2016 | Pasquier |
| 9,457,971 B2 | 10/2016 | Bonefas et al. |
| 9,463,939 B2 | 10/2016 | Bonefas et al. |
| 9,485,905 B2 | 11/2016 | Jung et al. |
| 9,489,576 B2 | 11/2016 | Johnson et al. |
| 9,497,898 B2 | 11/2016 | Dillon |
| 9,510,508 B2 | 12/2016 | Jung |
| 9,511,633 B2 | 12/2016 | Anderson et al. |
| 9,511,958 B2 | 12/2016 | Bonefas |
| 9,516,812 B2 | 12/2016 | Baumgarten et al. |
| 9,521,805 B2 | 12/2016 | Muench et al. |
| 9,522,791 B2 | 12/2016 | Bonefas et al. |
| 9,522,792 B2 | 12/2016 | Bonefas et al. |
| 9,523,180 B2 | 12/2016 | Deines |
| 9,529,364 B2 | 12/2016 | Foster et al. |
| 9,532,504 B2 | 1/2017 | Herman et al. |
| 9,538,714 B2 | 1/2017 | Anderson |
| 9,563,492 B2 | 2/2017 | Bell et al. |
| 9,563,848 B1 | 2/2017 | Hunt |
| 9,563,852 B1 | 2/2017 | Wiles et al. |
| 9,578,808 B2 | 2/2017 | Dybro et al. |
| 9,629,308 B2 | 4/2017 | Schøler et al. |
| 9,631,964 B2 | 4/2017 | Gelinske et al. |
| 9,642,305 B2 | 5/2017 | Nykamp et al. |
| 9,648,807 B2 | 5/2017 | Escher et al. |
| 9,675,008 B1 | 6/2017 | Rusciolelli et al. |
| 9,681,605 B2 | 6/2017 | Noonan et al. |
| 9,694,712 B2 | 7/2017 | Healy |
| 9,696,162 B2 | 7/2017 | Anderson |
| 9,699,967 B2 | 7/2017 | Palla et al. |
| 9,714,856 B2 | 7/2017 | Myers |
| 9,717,178 B1 | 8/2017 | Sauder et al. |
| 9,721,181 B2 | 8/2017 | Guan et al. |
| 9,723,790 B2 | 8/2017 | Berry et al. |
| 9,740,208 B2 | 8/2017 | Sugumaran et al. |
| 9,767,521 B2 | 9/2017 | Stuber et al. |
| 9,807,934 B2 | 11/2017 | Rusciolelli et al. |
| 9,807,940 B2 | 11/2017 | Roell et al. |
| 9,810,679 B2 | 11/2017 | Kimmel |
| 9,829,364 B2 | 11/2017 | Wilson et al. |
| 9,848,528 B2 | 12/2017 | Werner et al. |
| 9,856,609 B2 | 1/2018 | Dehmel |
| 9,856,612 B2 | 1/2018 | Oetken |
| 9,861,040 B2 | 1/2018 | Bonefas |
| 9,872,433 B2 | 1/2018 | Acheson et al. |
| 9,903,077 B2 | 2/2018 | Rio |
| 9,903,979 B2 | 2/2018 | Dybro et al. |
| 9,904,963 B2 | 2/2018 | Rupp et al. |
| 9,915,952 B2 | 3/2018 | Dollinger et al. |
| 9,922,405 B2 | 3/2018 | Sauder et al. |
| 9,924,636 B2 | 3/2018 | Lisouski et al. |
| 9,928,584 B2 | 3/2018 | Jens et al. |
| 9,933,787 B2 | 4/2018 | Story |
| 9,974,226 B2 | 5/2018 | Rupp et al. |
| 9,982,397 B2 | 5/2018 | Korb et al. |
| 9,984,455 B1 | 5/2018 | Fox et al. |
| 9,992,931 B2 | 6/2018 | Bonefas et al. |
| 9,992,932 B2 | 6/2018 | Bonefas et al. |
| 10,004,176 B2 | 6/2018 | Mayerle |
| 10,015,928 B2 | 7/2018 | Nykamp et al. |
| 10,019,018 B2 | 7/2018 | Hulin |
| 10,019,790 B2 | 7/2018 | Bonefas et al. |
| 10,025,983 B2 | 7/2018 | Guan et al. |
| 10,028,435 B2 | 7/2018 | Anderson et al. |
| 10,028,451 B2 | 7/2018 | Rowan et al. |
| 10,034,427 B2 | 7/2018 | Krause et al. |
| 10,039,231 B2 | 8/2018 | Anderson et al. |
| 10,064,331 B2 | 9/2018 | Bradley |
| 10,064,335 B2 | 9/2018 | Byttebier et al. |
| 10,078,890 B1 | 9/2018 | Tagestad et al. |
| 10,085,372 B2 | 10/2018 | Noyer et al. |
| 10,091,925 B2 | 10/2018 | Aharoni et al. |
| 10,126,153 B2 | 11/2018 | Bischoff et al. |
| 10,126,913 B1 * | 11/2018 | Ho ................... G06F 3/04815 |
| 10,129,528 B2 | 11/2018 | Bonefas et al. |
| 10,143,132 B2 | 12/2018 | Inoue et al. |
| 10,152,035 B2 | 12/2018 | Reid et al. |
| 10,154,624 B2 | 12/2018 | Guan et al. |
| 10,165,725 B2 | 1/2019 | Sugumaran et al. |
| 10,178,823 B2 | 1/2019 | Kovach et al. |
| 10,183,667 B2 | 1/2019 | Anderson et al. |
| 10,188,037 B2 | 1/2019 | Bruns et al. |
| 10,201,121 B1 | 2/2019 | Wilson |
| 10,209,179 B2 | 2/2019 | Hollstein |
| 10,231,371 B2 | 3/2019 | Dillon |
| 10,254,147 B2 | 4/2019 | Vermue et al. |
| 10,254,765 B2 | 4/2019 | Rekow |
| 10,255,670 B1 | 4/2019 | Wu et al. |
| 10,275,550 B2 | 4/2019 | Lee |
| 10,295,703 B2 | 5/2019 | Dybro et al. |
| 10,310,455 B2 | 6/2019 | Blank et al. |
| 10,314,232 B2 | 6/2019 | Isaac et al. |
| 10,315,655 B2 | 6/2019 | Blank et al. |
| 10,317,272 B2 | 6/2019 | Bhavsar et al. |
| 10,351,364 B2 | 7/2019 | Green et al. |
| 10,368,488 B2 | 8/2019 | Becker et al. |
| 10,398,084 B2 | 9/2019 | Ray et al. |
| 10,408,545 B2 | 9/2019 | Blank et al. |
| 10,412,889 B2 | 9/2019 | Palla et al. |
| 10,426,086 B2 | 10/2019 | Van de Wege et al. |
| 10,437,243 B2 | 10/2019 | Blank et al. |
| 10,477,756 B1 | 11/2019 | Richt et al. |
| 10,485,178 B2 | 11/2019 | Mayerle |
| 10,521,526 B2 | 12/2019 | Haaland et al. |
| 10,537,061 B2 | 1/2020 | Farley et al. |

(56) References Cited

U.S. PATENT DOCUMENTS

| | | |
|---|---|---|
| 10,568,316 B2 | 2/2020 | Gall et al. |
| 10,631,462 B2 | 4/2020 | Bonefas |
| 10,677,637 B1 | 6/2020 | Von Muenster |
| 10,681,872 B2 | 6/2020 | Viaene et al. |
| 10,703,277 B1 | 7/2020 | Schroeder |
| 10,729,067 B2 | 8/2020 | Hammer et al. |
| 10,740,703 B2 | 8/2020 | Story |
| 10,745,868 B2 | 8/2020 | Laugwitz et al. |
| 10,760,946 B2 | 9/2020 | Meier et al. |
| 10,809,118 B1 | 10/2020 | Von Muenster |
| 10,830,634 B2 | 11/2020 | Blank et al. |
| 10,866,109 B2 | 12/2020 | Madsen et al. |
| 10,890,922 B2 | 1/2021 | Ramm et al. |
| 10,909,368 B2 | 2/2021 | Guo et al. |
| 10,912,249 B1 | 2/2021 | Wilson |
| 11,145,007 B2 * | 10/2021 | Ruff ............... A01B 79/005 |
| 11,238,283 B2 * | 2/2022 | Young ............. A01B 79/005 |
| 11,665,992 B2 * | 6/2023 | Placella ............ G06Q 10/04 701/50 |
| 2001/0016788 A1 * | 8/2001 | Hauwiller ......... A01B 79/005 700/283 |
| 2002/0011061 A1 | 1/2002 | Lucand et al. |
| 2002/0083695 A1 | 7/2002 | Behnke et al. |
| 2002/0091458 A1 | 7/2002 | Moore |
| 2002/0099471 A1 | 7/2002 | Benneweis |
| 2002/0133309 A1 | 9/2002 | Hardt |
| 2002/0173893 A1 | 11/2002 | Blackmore et al. |
| 2002/0193928 A1 | 12/2002 | Beck |
| 2002/0193929 A1 | 12/2002 | Beck |
| 2002/0198654 A1 | 12/2002 | Lange et al. |
| 2003/0004630 A1 | 1/2003 | Beck |
| 2003/0014171 A1 | 1/2003 | Ma et al. |
| 2003/0015351 A1 | 1/2003 | Goldman et al. |
| 2003/0024450 A1 | 2/2003 | Juptner |
| 2003/0036852 A1 * | 2/2003 | Ell ..................... A01C 21/00 702/5 |
| 2003/0060245 A1 | 3/2003 | Coers et al. |
| 2003/0069680 A1 | 4/2003 | Cohen et al. |
| 2003/0075145 A1 | 4/2003 | Sheidler et al. |
| 2003/0174207 A1 | 9/2003 | Alexia et al. |
| 2003/0182144 A1 | 9/2003 | Pickett et al. |
| 2003/0187560 A1 | 10/2003 | Keller et al. |
| 2003/0216158 A1 | 11/2003 | Bischoff |
| 2003/0229432 A1 | 12/2003 | Ho et al. |
| 2003/0229433 A1 | 12/2003 | van den Berg et al. |
| 2003/0229435 A1 | 12/2003 | Van der Lely |
| 2004/0004544 A1 | 1/2004 | William Knutson |
| 2004/0054457 A1 | 3/2004 | Kormann |
| 2004/0073468 A1 | 4/2004 | Vyas et al. |
| 2004/0193348 A1 | 9/2004 | Gray et al. |
| 2005/0059445 A1 | 3/2005 | Niermann et al. |
| 2005/0066738 A1 | 3/2005 | Moore |
| 2005/0149235 A1 | 7/2005 | Seal et al. |
| 2005/0150202 A1 | 7/2005 | Quick |
| 2005/0197175 A1 | 9/2005 | Anderson |
| 2005/0241285 A1 | 11/2005 | Maertens et al. |
| 2005/0283314 A1 | 12/2005 | Hall |
| 2005/0284119 A1 | 12/2005 | Brunnert |
| 2006/0014489 A1 | 1/2006 | Fitzner et al. |
| 2006/0014643 A1 | 1/2006 | Hacker et al. |
| 2006/0047377 A1 | 3/2006 | Ferguson et al. |
| 2006/0058896 A1 | 3/2006 | Pokorny et al. |
| 2006/0074560 A1 | 4/2006 | Dyer et al. |
| 2006/0155449 A1 | 7/2006 | Dammann |
| 2006/0162631 A1 | 7/2006 | Hickey et al. |
| 2006/0196158 A1 | 9/2006 | Faivre et al. |
| 2006/0200334 A1 | 9/2006 | Faivre et al. |
| 2007/0005209 A1 | 1/2007 | Fitzner et al. |
| 2007/0021948 A1 | 1/2007 | Anderson |
| 2007/0056258 A1 | 3/2007 | Behnke |
| 2007/0068238 A1 | 3/2007 | Wendte |
| 2007/0073700 A1 | 3/2007 | Wippersteg et al. |
| 2007/0089390 A1 | 4/2007 | Hendrickson et al. |
| 2007/0135190 A1 | 6/2007 | Diekhans et al. |
| 2007/0185749 A1 | 8/2007 | Anderson et al. |
| 2007/0199903 A1 | 8/2007 | Denny |
| 2007/0208510 A1 | 9/2007 | Anderson et al. |
| 2007/0233348 A1 | 10/2007 | Diekhans et al. |
| 2007/0233374 A1 | 10/2007 | Diekhans et al. |
| 2007/0239337 A1 | 10/2007 | Anderson |
| 2007/0282523 A1 | 12/2007 | Diekhans et al. |
| 2007/0298744 A1 | 12/2007 | Fitzner et al. |
| 2008/0030320 A1 | 2/2008 | Wilcox et al. |
| 2008/0098035 A1 | 4/2008 | Wippersteg et al. |
| 2008/0140431 A1 | 6/2008 | Anderson et al. |
| 2008/0177449 A1 | 7/2008 | Pickett et al. |
| 2008/0248843 A1 | 10/2008 | Birrell et al. |
| 2008/0268927 A1 | 10/2008 | Farley et al. |
| 2008/0269052 A1 | 10/2008 | Rosinger et al. |
| 2008/0289308 A1 | 11/2008 | Brubaker |
| 2008/0312085 A1 | 12/2008 | Kordes et al. |
| 2009/0044505 A1 | 2/2009 | Huster et al. |
| 2009/0074243 A1 | 3/2009 | Missotten et al. |
| 2009/0143941 A1 | 6/2009 | Tarasinski et al. |
| 2009/0192654 A1 | 7/2009 | Wendte et al. |
| 2009/0216410 A1 | 8/2009 | Allen et al. |
| 2009/0226036 A1 | 9/2009 | Gaal |
| 2009/0259483 A1 | 10/2009 | Hendrickson et al. |
| 2009/0265098 A1 | 10/2009 | Dix |
| 2009/0306835 A1 | 12/2009 | Ellermann et al. |
| 2009/0311084 A1 | 12/2009 | Coers et al. |
| 2009/0312919 A1 | 12/2009 | Foster et al. |
| 2009/0312920 A1 | 12/2009 | Boenig et al. |
| 2009/0325658 A1 | 12/2009 | Phelan et al. |
| 2010/0036696 A1 | 2/2010 | Lang et al. |
| 2010/0042297 A1 | 2/2010 | Foster et al. |
| 2010/0063626 A1 | 3/2010 | Anderson |
| 2010/0063648 A1 | 3/2010 | Anderson |
| 2010/0063651 A1 | 3/2010 | Anderson |
| 2010/0063664 A1 | 3/2010 | Anderson |
| 2010/0063954 A1 | 3/2010 | Anderson |
| 2010/0070145 A1 | 3/2010 | Foster et al. |
| 2010/0071329 A1 | 3/2010 | Hindryckx et al. |
| 2010/0094481 A1 | 4/2010 | Anderson |
| 2010/0121541 A1 | 5/2010 | Behnke et al. |
| 2010/0137373 A1 | 6/2010 | Hungenberg et al. |
| 2010/0145572 A1 | 6/2010 | Steckel et al. |
| 2010/0152270 A1 | 6/2010 | Suty-Heinze et al. |
| 2010/0152943 A1 | 6/2010 | Matthews |
| 2010/0217474 A1 | 8/2010 | Baumgarten et al. |
| 2010/0268562 A1 | 10/2010 | Anderson |
| 2010/0268679 A1 | 10/2010 | Anderson |
| 2010/0285964 A1 | 11/2010 | Waldraff et al. |
| 2010/0317517 A1 | 12/2010 | Rosinger et al. |
| 2010/0319941 A1 | 12/2010 | Peterson |
| 2010/0332051 A1 | 12/2010 | Kormann |
| 2011/0056178 A1 | 3/2011 | Sauerwein et al. |
| 2011/0059782 A1 | 3/2011 | Harrington |
| 2011/0072773 A1 | 3/2011 | Schroeder et al. |
| 2011/0084851 A1 | 4/2011 | Peterson et al. |
| 2011/0086684 A1 | 4/2011 | Luellen et al. |
| 2011/0160961 A1 | 6/2011 | Wollenhaupt et al. |
| 2011/0213531 A1 | 9/2011 | Farley et al. |
| 2011/0224873 A1 | 9/2011 | Reeve et al. |
| 2011/0227745 A1 | 9/2011 | Kikuchi et al. |
| 2011/0257850 A1 | 10/2011 | Reeve et al. |
| 2011/0270494 A1 | 11/2011 | Imhof et al. |
| 2011/0270495 A1 | 11/2011 | Knapp |
| 2011/0295460 A1 | 12/2011 | Hunt et al. |
| 2011/0307149 A1 | 12/2011 | Pighi et al. |
| 2012/0004813 A1 | 1/2012 | Baumgarten et al. |
| 2012/0029732 A1 | 2/2012 | Meyer et al. |
| 2012/0087771 A1 | 4/2012 | Wenzel |
| 2012/0096827 A1 | 4/2012 | Chaney et al. |
| 2012/0143642 A1 | 6/2012 | O'Neil |
| 2012/0215378 A1 | 8/2012 | Sprock et al. |
| 2012/0215379 A1 | 8/2012 | Sprock et al. |
| 2012/0253611 A1 | 10/2012 | Zielke et al. |
| 2012/0263560 A1 | 10/2012 | Diekhans et al. |
| 2012/0265412 A1 | 10/2012 | Diekhans et al. |
| 2012/0271489 A1 | 10/2012 | Roberts et al. |
| 2012/0323452 A1 | 12/2012 | Green et al. |
| 2013/0019580 A1 | 1/2013 | Anderson et al. |
| 2013/0022430 A1 | 1/2013 | Anderson et al. |

(56) References Cited

U.S. PATENT DOCUMENTS

| | | |
|---|---|---|
| 2013/0046419 A1 | 2/2013 | Anderson et al. |
| 2013/0046439 A1 | 2/2013 | Anderson et al. |
| 2013/0046525 A1 | 2/2013 | Ali et al. |
| 2013/0103269 A1 | 4/2013 | Meyer Zu Hellgen et al. |
| 2013/0124239 A1 | 5/2013 | Rosa et al. |
| 2013/0184944 A1 | 7/2013 | Missotten et al. |
| 2013/0197767 A1 | 8/2013 | Lenz |
| 2013/0205733 A1 | 8/2013 | Peters et al. |
| 2013/0210505 A1 | 8/2013 | Bischoff |
| 2013/0231823 A1 | 9/2013 | Wang et al. |
| 2013/0319941 A1 | 12/2013 | Schneider |
| 2013/0325242 A1 | 12/2013 | Cavender-Bares et al. |
| 2013/0332003 A1 | 12/2013 | Murray et al. |
| 2014/0002489 A1 | 1/2014 | Sauder et al. |
| 2014/0019017 A1 | 1/2014 | Wilken et al. |
| 2014/0021598 A1 | 1/2014 | Sutardja |
| 2014/0050364 A1 | 2/2014 | Brueckner et al. |
| 2014/0067745 A1 | 3/2014 | Avey |
| 2014/0121882 A1 | 5/2014 | Gilmore et al. |
| 2014/0129048 A1 | 5/2014 | Baumgarten et al. |
| 2014/0172222 A1 | 6/2014 | Nickel |
| 2014/0172224 A1 | 6/2014 | Matthews et al. |
| 2014/0172225 A1 | 6/2014 | Matthews et al. |
| 2014/0208870 A1 | 7/2014 | Quaderer et al. |
| 2014/0215984 A1 | 8/2014 | Bischoff |
| 2014/0230391 A1 | 8/2014 | Hendrickson et al. |
| 2014/0230392 A1 | 8/2014 | Dybro et al. |
| 2014/0236381 A1 | 8/2014 | Anderson et al. |
| 2014/0236431 A1 | 8/2014 | Hendrickson et al. |
| 2014/0257911 A1 | 9/2014 | Anderson |
| 2014/0262547 A1 | 9/2014 | Acheson et al. |
| 2014/0277960 A1 | 9/2014 | Blank et al. |
| 2014/0297242 A1 | 10/2014 | Sauder et al. |
| 2014/0303814 A1 | 10/2014 | Burema et al. |
| 2014/0324272 A1 | 10/2014 | Madsen et al. |
| 2014/0331631 A1 | 11/2014 | Sauder et al. |
| 2014/0338298 A1 | 11/2014 | Jung et al. |
| 2014/0350802 A1 | 11/2014 | Biggerstaff et al. |
| 2014/0360148 A1 | 12/2014 | Wienker et al. |
| 2015/0049088 A1 | 2/2015 | Snyder et al. |
| 2015/0088785 A1 | 3/2015 | Chi |
| 2015/0095830 A1 | 4/2015 | Massoumi et al. |
| 2015/0101519 A1 | 4/2015 | Blackwell et al. |
| 2015/0105984 A1 | 4/2015 | Birrell et al. |
| 2015/0124054 A1 | 5/2015 | Darr et al. |
| 2015/0168187 A1 | 6/2015 | Myers |
| 2015/0211199 A1 | 7/2015 | Corcoran et al. |
| 2015/0230403 A1 | 8/2015 | Jung et al. |
| 2015/0242799 A1 | 8/2015 | Seki et al. |
| 2015/0243114 A1 | 8/2015 | Tanabe et al. |
| 2015/0254800 A1 | 9/2015 | Johnson et al. |
| 2015/0264863 A1 | 9/2015 | Muench et al. |
| 2015/0276794 A1 | 10/2015 | Pistrol et al. |
| 2015/0278640 A1 | 10/2015 | Johnson et al. |
| 2015/0285647 A1 | 10/2015 | Meyer zu Helligen et al. |
| 2015/0293029 A1 | 10/2015 | Acheson et al. |
| 2015/0302305 A1 | 10/2015 | Rupp et al. |
| 2015/0305238 A1 | 10/2015 | Klausmann et al. |
| 2015/0305239 A1 | 10/2015 | Jung |
| 2015/0327440 A1 | 11/2015 | Dybro et al. |
| 2015/0351320 A1 | 12/2015 | Takahara et al. |
| 2015/0370935 A1 | 12/2015 | Starr |
| 2015/0373902 A1 | 12/2015 | Pasquier |
| 2015/0379785 A1 | 12/2015 | Brown, Jr. et al. |
| 2016/0025531 A1 | 1/2016 | Bischoff et al. |
| 2016/0029558 A1 | 2/2016 | Dybro et al. |
| 2016/0052525 A1 | 2/2016 | Tuncer et al. |
| 2016/0057922 A1 | 3/2016 | Freiberg et al. |
| 2016/0066505 A1 | 3/2016 | Bakke et al. |
| 2016/0073573 A1 | 3/2016 | Ethington et al. |
| 2016/0078375 A1 | 3/2016 | Ethington et al. |
| 2016/0078570 A1 | 3/2016 | Ethington et al. |
| 2016/0088794 A1 | 3/2016 | Baumgarten et al. |
| 2016/0106038 A1 | 4/2016 | Boyd et al. |
| 2016/0084813 A1 | 5/2016 | Anderson et al. |
| 2016/0146611 A1 | 5/2016 | Matthews |
| 2016/0202227 A1 | 7/2016 | Mathur et al. |
| 2016/0203657 A1 | 7/2016 | Bell et al. |
| 2016/0212939 A1 | 7/2016 | Ouchida et al. |
| 2016/0215994 A1 | 7/2016 | Mewes et al. |
| 2016/0232621 A1 | 8/2016 | Ethington et al. |
| 2016/0247075 A1 | 8/2016 | Mewes et al. |
| 2016/0247082 A1 | 8/2016 | Stehling |
| 2016/0260021 A1 | 9/2016 | Marek |
| 2016/0286720 A1 | 10/2016 | Heitmann et al. |
| 2016/0286721 A1 | 10/2016 | Heitmann et al. |
| 2016/0286722 A1 | 10/2016 | Heitmann et al. |
| 2016/0309656 A1 | 10/2016 | Wilken et al. |
| 2016/0327535 A1 | 11/2016 | Cotton et al. |
| 2016/0330906 A1 | 11/2016 | Acheson et al. |
| 2016/0338267 A1 | 11/2016 | Anderson et al. |
| 2016/0342915 A1 | 11/2016 | Humphrey |
| 2016/0345485 A1 | 12/2016 | Acheson et al. |
| 2016/0360697 A1 | 12/2016 | Diaz |
| 2017/0013773 A1 | 1/2017 | Kirk et al. |
| 2017/0031365 A1 | 2/2017 | Sugumaran et al. |
| 2017/0034997 A1 | 2/2017 | Mayerle |
| 2017/0049045 A1 | 2/2017 | Wilken et al. |
| 2017/0055433 A1 | 3/2017 | Jamison |
| 2017/0082442 A1 | 3/2017 | Anderson |
| 2017/0083024 A1 | 3/2017 | Reijersen Van Buuren et al. |
| 2017/0086381 A1 | 3/2017 | Roell et al. |
| 2017/0089741 A1 | 3/2017 | Takahashi et al. |
| 2017/0089742 A1 | 3/2017 | Bruns et al. |
| 2017/0090068 A1 | 3/2017 | Xiang et al. |
| 2017/0105331 A1 | 4/2017 | Herlitzius et al. |
| 2017/0105335 A1 | 4/2017 | Xu et al. |
| 2017/0112049 A1 | 4/2017 | Weisberg et al. |
| 2017/0112061 A1 | 4/2017 | Meyer |
| 2017/0115862 A1 | 4/2017 | Stratton et al. |
| 2017/0118915 A1 | 5/2017 | Middelberg et al. |
| 2017/0124463 A1 | 5/2017 | Chen et al. |
| 2017/0127606 A1 | 5/2017 | Horton |
| 2017/0160916 A1 | 6/2017 | Baumgarten et al. |
| 2017/0161627 A1 | 6/2017 | Xu et al. |
| 2017/0185086 A1 | 6/2017 | Sauder et al. |
| 2017/0188515 A1 | 7/2017 | Baumgarten et al. |
| 2017/0192431 A1 | 7/2017 | Foster et al. |
| 2017/0208742 A1 | 7/2017 | Ingibergsson et al. |
| 2017/0213141 A1 | 7/2017 | Xu et al. |
| 2017/0215330 A1 | 8/2017 | Missotten et al. |
| 2017/0223947 A1 | 8/2017 | Gall et al. |
| 2017/0227969 A1 | 8/2017 | Murray et al. |
| 2017/0235471 A1 | 8/2017 | Scholer et al. |
| 2017/0245434 A1 | 8/2017 | Jung et al. |
| 2017/0251600 A1 | 9/2017 | Anderson et al. |
| 2017/0270446 A1 | 9/2017 | Starr et al. |
| 2017/0270616 A1 | 9/2017 | Basso |
| 2017/0316692 A1 | 11/2017 | Rusciolelli et al. |
| 2017/0318743 A1 | 11/2017 | Sauder et al. |
| 2017/0322550 A1 | 11/2017 | Yokoyama |
| 2017/0332551 A1 | 11/2017 | Todd et al. |
| 2017/0336787 A1 | 11/2017 | Pichlmaier et al. |
| 2017/0370765 A1 | 12/2017 | Meier et al. |
| 2018/0000011 A1 | 1/2018 | Schleusner et al. |
| 2018/0014452 A1 | 1/2018 | Starr |
| 2018/0022559 A1 | 1/2018 | Knutson |
| 2018/0024549 A1 | 1/2018 | Hurd |
| 2018/0035622 A1 | 2/2018 | Gresch et al. |
| 2018/0054955 A1 | 3/2018 | Oliver |
| 2018/0060975 A1 | 3/2018 | Hassanzadeh |
| 2018/0070534 A1 | 3/2018 | Mayerle |
| 2018/0077865 A1 | 3/2018 | Gallmeier |
| 2018/0084709 A1 | 3/2018 | Wieckhorst et al. |
| 2018/0084722 A1 | 3/2018 | Wieckhorst et al. |
| 2018/0092301 A1 | 4/2018 | Vandike et al. |
| 2018/0092302 A1 | 4/2018 | Vandike et al. |
| 2018/0108123 A1 | 4/2018 | Baurer et al. |
| 2018/0120133 A1 | 5/2018 | Blank et al. |
| 2018/0121821 A1 | 5/2018 | Parsons et al. |
| 2018/0124992 A1 | 5/2018 | Koch et al. |
| 2018/0128933 A1 | 5/2018 | Koch et al. |
| 2018/0129879 A1 | 5/2018 | Achtelik et al. |
| 2018/0132422 A1 | 5/2018 | Hassanzadeh et al. |

(56) References Cited

U.S. PATENT DOCUMENTS

| | | |
|---|---|---|
| 2018/0136664 A1 | 5/2018 | Tomita et al. |
| 2018/0146612 A1 | 5/2018 | Sauder et al. |
| 2018/0146624 A1 | 5/2018 | Chen et al. |
| 2018/0153084 A1 | 6/2018 | Calleija et al. |
| 2018/0177125 A1 | 6/2018 | Takahara et al. |
| 2018/0181893 A1 | 6/2018 | Basso |
| 2018/0196438 A1 | 7/2018 | Newlin et al. |
| 2018/0196441 A1 | 7/2018 | Muench et al. |
| 2018/0211156 A1 | 7/2018 | Guan et al. |
| 2018/0232674 A1 | 8/2018 | Bilde |
| 2018/0242523 A1 | 8/2018 | Kirchbeck et al. |
| 2018/0249641 A1 | 9/2018 | Lewis et al. |
| 2018/0257657 A1 | 9/2018 | Blank et al. |
| 2018/0271015 A1 | 9/2018 | Redden et al. |
| 2018/0279599 A1 | 10/2018 | Struve |
| 2018/0295771 A1 | 10/2018 | Peters |
| 2018/0310474 A1 | 11/2018 | Posselius et al. |
| 2018/0317381 A1 | 11/2018 | Bassett |
| 2018/0317385 A1 | 11/2018 | Wellensiek et al. |
| 2018/0325012 A1 | 11/2018 | Ferrari et al. |
| 2018/0325014 A1 | 11/2018 | Debbaut |
| 2018/0332767 A1 | 11/2018 | Muench et al. |
| 2018/0338422 A1 | 11/2018 | Brubaker |
| 2018/0340845 A1 | 11/2018 | Rhodes et al. |
| 2018/0359917 A1 | 12/2018 | Blank et al. |
| 2018/0359919 A1 | 12/2018 | Blank et al. |
| 2018/0364726 A1 | 12/2018 | Foster et al. |
| 2019/0021226 A1 | 1/2019 | Dima et al. |
| 2019/0025175 A1 | 1/2019 | Laugwitz |
| 2019/0041813 A1 | 2/2019 | Horn et al. |
| 2019/0050948 A1 | 2/2019 | Perry et al. |
| 2019/0057460 A1 | 2/2019 | Sakaguchi et al. |
| 2019/0066234 A1 | 2/2019 | Bedoya et al. |
| 2019/0069470 A1 | 3/2019 | Pfeiffer et al. |
| 2019/0075727 A1 | 3/2019 | Duke et al. |
| 2019/0085785 A1 | 3/2019 | Abolt |
| 2019/0090423 A1 | 3/2019 | Escher et al. |
| 2019/0098825 A1 | 4/2019 | Neitemeier et al. |
| 2019/0104722 A1 | 4/2019 | Slaughter et al. |
| 2019/0108413 A1 | 4/2019 | Chen et al. |
| 2019/0114847 A1 | 4/2019 | Wagner et al. |
| 2019/0124819 A1 | 5/2019 | Madsen et al. |
| 2019/0129430 A1 | 5/2019 | Madsen et al. |
| 2019/0136491 A1 | 5/2019 | Martin et al. |
| 2019/0138962 A1 | 5/2019 | Ehlmann et al. |
| 2019/0147094 A1 | 5/2019 | Zhan et al. |
| 2019/0147249 A1 | 5/2019 | Kiepe et al. |
| 2019/0156255 A1 | 5/2019 | Carroll |
| 2019/0174667 A1 | 6/2019 | Gresch et al. |
| 2019/0183047 A1 | 6/2019 | Dybro et al. |
| 2019/0200522 A1 | 7/2019 | Hansen et al. |
| 2019/0230855 A1 | 8/2019 | Reed et al. |
| 2019/0239416 A1 | 8/2019 | Green et al. |
| 2019/0261550 A1 | 8/2019 | Damme et al. |
| 2019/0261559 A1 | 8/2019 | Heitmann et al. |
| 2019/0261560 A1 | 8/2019 | Jelenkovic |
| 2019/0313570 A1 | 10/2019 | Owechko |
| 2019/0327889 A1 | 10/2019 | Borgstadt |
| 2019/0327892 A1 | 10/2019 | Fries et al. |
| 2019/0335662 A1 | 11/2019 | Good et al. |
| 2019/0335674 A1 | 11/2019 | Basso |
| 2019/0343035 A1 | 11/2019 | Smith et al. |
| 2019/0343043 A1 | 11/2019 | Bormann et al. |
| 2019/0343044 A1 | 11/2019 | Bormann et al. |
| 2019/0343048 A1 | 11/2019 | Farley et al. |
| 2019/0351765 A1 | 11/2019 | Rabusic |
| 2019/0354081 A1 | 11/2019 | Blank et al. |
| 2019/0364733 A1 | 12/2019 | Laugen et al. |
| 2019/0364734 A1 | 12/2019 | Kriebel et al. |
| 2020/0000006 A1 | 1/2020 | McDonald et al. |
| 2020/0008351 A1 | 1/2020 | Zielke et al. |
| 2020/0015416 A1 | 1/2020 | Barther et al. |
| 2020/0019159 A1 | 1/2020 | Kocer et al. |
| 2020/0024102 A1 | 1/2020 | Brill et al. |
| 2020/0029488 A1 | 1/2020 | Bertucci et al. |
| 2020/0034759 A1 | 1/2020 | Dumstorff et al. |
| 2020/0037491 A1 | 2/2020 | Schoeny et al. |
| 2020/0053961 A1 | 2/2020 | Dix et al. |
| 2020/0064144 A1 | 2/2020 | Tomita et al. |
| 2020/0064863 A1 | 2/2020 | Tomita et al. |
| 2020/0074023 A1 | 3/2020 | Nizami et al. |
| 2020/0084963 A1 | 3/2020 | Gururajan et al. |
| 2020/0084966 A1 | 3/2020 | Corban et al. |
| 2020/0090094 A1 | 3/2020 | Blank |
| 2020/0097851 A1 | 3/2020 | Alvarez et al. |
| 2020/0113142 A1 | 4/2020 | Coleman et al. |
| 2020/0125822 A1 | 4/2020 | Yang et al. |
| 2020/0128732 A1 | 4/2020 | Chaney |
| 2020/0128733 A1 | 4/2020 | Vandike et al. |
| 2020/0128734 A1 | 4/2020 | Brammeier et al. |
| 2020/0128735 A1 | 4/2020 | Bonefas et al. |
| 2020/0128737 A1 | 4/2020 | Anderson et al. |
| 2020/0128738 A1 | 4/2020 | Suleman et al. |
| 2020/0128740 A1 | 4/2020 | Suleman |
| 2020/0133262 A1 | 4/2020 | Suleman et al. |
| 2020/0141784 A1 | 5/2020 | Lange et al. |
| 2020/0146203 A1 | 5/2020 | Deng |
| 2020/0150631 A1 | 5/2020 | Freiberg et al. |
| 2020/0154639 A1 | 5/2020 | Takahara et al. |
| 2020/0163277 A1 | 5/2020 | Cooksey et al. |
| 2020/0163292 A1* | 5/2020 | Gerdes .............. A01G 25/092 |
| 2020/0183406 A1 | 6/2020 | Borgstadt |
| 2020/0187409 A1 | 6/2020 | Meyer zu Helligen |
| 2020/0196526 A1 | 6/2020 | Koch et al. |
| 2020/0202596 A1 | 6/2020 | Kitahara et al. |
| 2020/0221632 A1 | 7/2020 | Strnad et al. |
| 2020/0221635 A1 | 7/2020 | Hendrickson et al. |
| 2020/0221636 A1 | 7/2020 | Boydens et al. |
| 2020/0236835 A1* | 7/2020 | Stanhope ............. A01B 79/005 |
| 2020/0236836 A1* | 7/2020 | Barrick ................ A01B 79/005 |
| 2020/0265527 A1 | 8/2020 | Rose et al. |
| 2020/0278680 A1 | 9/2020 | Schultz et al. |
| 2020/0293057 A1 | 9/2020 | Reid et al. |
| 2020/0317114 A1 | 10/2020 | Hoff |
| 2020/0319632 A1 | 10/2020 | Desai et al. |
| 2020/0319655 A1 | 10/2020 | Desai et al. |
| 2020/0323133 A1 | 10/2020 | Anderson et al. |
| 2020/0323134 A1 | 10/2020 | Darr et al. |
| 2020/0326674 A1 | 10/2020 | Palla et al. |
| 2020/0326727 A1 | 10/2020 | Palla et al. |
| 2020/0333278 A1 | 10/2020 | Locken et al. |
| 2020/0337232 A1 | 10/2020 | Blank et al. |
| 2020/0352099 A1 | 11/2020 | Meier et al. |
| 2020/0359547 A1 | 11/2020 | Sakaguchi et al. |
| 2020/0359549 A1 | 11/2020 | Sakaguchi et al. |
| 2020/0363256 A1 | 11/2020 | Meier et al. |
| 2020/0375083 A1 | 12/2020 | Anderson et al. |
| 2020/0375084 A1 | 12/2020 | Sakaguchi et al. |
| 2020/0378088 A1 | 12/2020 | Anderson |
| 2020/0404842 A1 | 12/2020 | Dugas et al. |
| 2021/0015041 A1 | 1/2021 | Bormann et al. |
| 2021/0029877 A1 | 2/2021 | Vandike et al. |
| 2021/0129853 A1* | 5/2021 | Appleton ............. G06Q 10/047 |
| 2021/0176916 A1 | 6/2021 | Sidon et al. |
| 2021/0176918 A1* | 6/2021 | Franzen ............. A01B 79/005 |
| 2021/0289687 A1 | 9/2021 | Heinold et al. |
| 2021/0321567 A1 | 10/2021 | Sidon et al. |
| 2022/0110246 A1* | 4/2022 | Vandike ............. A01D 41/1278 |
| 2022/0113730 A1* | 4/2022 | Vandike ............. G01C 21/3848 |

FOREIGN PATENT DOCUMENTS

| | | |
|---|---|---|
| BR | MU6800140 U | 12/1989 |
| BR | PI0502658 A | 2/2007 |
| BR | PI0802384 A2 | 3/2010 |
| BR | PI1100258 A2 | 3/2014 |
| BR | 102014007178 A2 | 8/2016 |
| CA | 1165300 A | 4/1984 |
| CA | 2283767 A1 | 3/2001 |
| CA | 2330979 A1 | 8/2001 |
| CA | 2629555 A1 | 11/2009 |
| CA | 135611 S | 5/2011 |
| CN | 2451633 Y | 10/2001 |
| CN | 101236188 A | 8/2008 |

(56) References Cited

FOREIGN PATENT DOCUMENTS

| | | |
|---|---|---|
| CN | 100416590 C | 9/2008 |
| CN | 101303338 A | 11/2008 |
| CN | 101363833 A | 2/2009 |
| CN | 201218789 Y | 4/2009 |
| CN | 101839906 A | 9/2010 |
| CN | 101929166 A | 12/2010 |
| CN | 102080373 A | 6/2011 |
| CN | 102138383 A | 8/2011 |
| CN | 102277867 B | 12/2011 |
| CN | 202110103 U | 1/2012 |
| CN | 202119772 U | 1/2012 |
| CN | 202340435 U | 7/2012 |
| CN | 103088807 A | 5/2013 |
| CN | 103181263 A | 7/2013 |
| CN | 203053961 U | 7/2013 |
| CN | 203055121 U | 7/2013 |
| CN | 203206739 U | 9/2013 |
| CN | 203275401 U | 11/2013 |
| CN | 203613525 U | 5/2014 |
| CN | 203658201 U | 6/2014 |
| CN | 103954738 A | 7/2014 |
| CN | 203741803 U | 7/2014 |
| CN | 204000818 U | 12/2014 |
| CN | 204435344 U | 7/2015 |
| CN | 204475304 U | 7/2015 |
| CN | 105205248 A | 12/2015 |
| CN | 204989174 U | 1/2016 |
| CN | 105432228 A | 3/2016 |
| CN | 105741180 A | 7/2016 |
| CN | 106053330 A | 10/2016 |
| CN | 106198877 A | 12/2016 |
| CN | 106198879 A | 12/2016 |
| CN | 106226470 A | 12/2016 |
| CN | 106248873 A | 12/2016 |
| CN | 106290800 A | 1/2017 |
| CN | 106327349 A | 1/2017 |
| CN | 106644663 A | 5/2017 |
| CN | 206330815 U | 7/2017 |
| CN | 206515118 U | 9/2017 |
| CN | 206515119 U | 9/2017 |
| CN | 206616118 U | 11/2017 |
| CN | 206696107 | 12/2017 |
| CN | 206696107 U | 12/2017 |
| CN | 107576674 | 1/2018 |
| CN | 107576674 A | 1/2018 |
| CN | 206906093 U | 1/2018 |
| CN | 206941558 | 1/2018 |
| CN | 206941558 U | 1/2018 |
| CN | 107736088 A | 2/2018 |
| CN | 107795095 A | 3/2018 |
| CN | 207079558 | 3/2018 |
| CN | 107941286 A | 4/2018 |
| CN | 107957408 A | 4/2018 |
| CN | 108009542 A | 5/2018 |
| CN | 108304796 A | 7/2018 |
| CN | 207567744 U | 7/2018 |
| CN | 108614089 A | 10/2018 |
| CN | 208013131 U | 10/2018 |
| CN | 108881825 A | 11/2018 |
| CN | 208047351 U | 11/2018 |
| CN | 109357804 A | 2/2019 |
| CN | 109485353 A | 3/2019 |
| CN | 109633127 A | 4/2019 |
| CN | 109763476 A | 5/2019 |
| CN | 109961024 A | 7/2019 |
| CN | 110262287 A | 9/2019 |
| CN | 110720302 A | 1/2020 |
| CN | 111201879 A | 5/2020 |
| CN | 210585958 U | 5/2020 |
| CN | 111406505 A | 7/2020 |
| CN | 113298670 A | 8/2021 |
| CS | 247426 B1 | 12/1986 |
| CS | 248318 B1 | 2/1987 |
| CZ | 17266 U1 | 2/2007 |
| CZ | 20252 U1 | 11/2009 |
| DE | 441597 C | 3/1927 |
| DE | 504035 C | 7/1930 |
| DE | 2354828 A1 | 5/1975 |
| DE | 152380 A1 | 11/1981 |
| DE | 3728669 A1 | 3/1989 |
| DE | 4431824 C1 | 5/1996 |
| DE | 19509496 A1 | 9/1996 |
| DE | 19528663 A1 | 2/1997 |
| DE | 19718455 A1 | 11/1997 |
| DE | 19705842 A1 | 8/1998 |
| DE | 19828355 A1 | 1/2000 |
| DE | 10050224 A1 | 4/2002 |
| DE | 10120173 A1 | 10/2002 |
| DE | 202004015141 U1 | 12/2004 |
| DE | 102005000770 B3 | 7/2006 |
| DE | 102005000771 A1 | 8/2006 |
| DE | 102008021785 A1 | 11/2009 |
| DE | 102009041646 A1 | 3/2011 |
| DE | 102010004648 A1 | 7/2011 |
| DE | 102010038661 A1 | 2/2012 |
| DE | 102011005400 A1 | 9/2012 |
| DE | 202012103730 U1 | 10/2012 |
| DE | 102011052688 A1 | 2/2013 |
| DE | 102012211001 A1 | 1/2014 |
| DE | 102012220109 | 5/2014 |
| DE | 102012223768 | 6/2014 |
| DE | 102013212151 A1 | 12/2014 |
| DE | 102013019098 B3 | 1/2015 |
| DE | 102014108449 A1 | 2/2015 |
| DE | 2014201203 A1 | 7/2015 |
| DE | 102014208068 A1 | 10/2015 |
| DE | 102015006398 B3 | 5/2016 |
| DE | 102015109799 A1 | 12/2016 |
| DE | 112015002194 T5 | 1/2017 |
| DE | 102017204511 A1 | 9/2018 |
| DE | 102019206734 A1 | 11/2020 |
| DE | 102019114872 A1 | 12/2020 |
| DE | 102021101230 A1 | 4/2022 |
| EP | 0070219 B1 | 10/1984 |
| EP | 0355049 A2 | 2/1990 |
| EP | 0532146 B1 | 8/1998 |
| EP | 1444879 A1 | 8/2004 |
| EP | 1219159 B1 | 6/2005 |
| EP | 1219153 B1 | 2/2006 |
| EP | 1692928 A2 | 8/2006 |
| EP | 1574122 B1 | 2/2008 |
| EP | 1943877 A2 | 7/2008 |
| EP | 1598586 B1 | 9/2009 |
| EP | 1731983 B1 | 9/2009 |
| EP | 2146307 A2 | 1/2010 |
| EP | 0845198 B2 | 2/2010 |
| EP | 2186389 A1 | 5/2010 |
| EP | 2267566 A2 | 12/2010 |
| EP | 3491192 A2 | 12/2010 |
| EP | 2057884 B1 | 1/2011 |
| EP | 2146307 B1 | 5/2012 |
| EP | 2446732 A1 | 5/2012 |
| EP | 2524586 A2 | 11/2012 |
| EP | 2529610 A1 | 12/2012 |
| EP | 2243353 B1 | 3/2013 |
| EP | 2174537 B1 | 5/2013 |
| EP | 2592919 A1 | 5/2013 |
| EP | 1674324 B2 | 5/2014 |
| EP | 2759829 A1 | 7/2014 |
| EP | 2267566 A3 | 12/2014 |
| EP | 2191439 B1 | 3/2015 |
| EP | 2586286 B3 | 3/2015 |
| EP | 2592919 B1 | 9/2015 |
| EP | 2921042 A1 | 9/2015 |
| EP | 2944725 A1 | 11/2015 |
| EP | 2764764 B1 | 12/2015 |
| EP | 2510777 B1 | 3/2016 |
| EP | 2997805 A1 | 3/2016 |
| EP | 3000302 A1 | 3/2016 |
| EP | 2868806 B1 | 7/2016 |
| EP | 3085221 A1 | 10/2016 |
| EP | 3095310 A1 | 11/2016 |
| EP | 3097759 A1 | 11/2016 |
| EP | 2452551 B1 | 5/2017 |

(56) References Cited

FOREIGN PATENT DOCUMENTS

| | | |
|---|---|---|
| EP | 3175691 A1 | 6/2017 |
| EP | 3195719 A1 | 7/2017 |
| EP | 3195720 A1 | 7/2017 |
| EP | 3259976 A1 | 12/2017 |
| EP | 3262934 A1 | 1/2018 |
| EP | 3287007 A1 | 2/2018 |
| EP | 3298876 A1 | 3/2018 |
| EP | 3300579 A1 | 4/2018 |
| EP | 3315005 A1 | 5/2018 |
| EP | 3316208 A1 | 5/2018 |
| EP | 2829171 B1 | 6/2018 |
| EP | 2508057 | 7/2018 |
| EP | 2508057 B1 | 7/2018 |
| EP | 3378298 A1 | 9/2018 |
| EP | 3378299 A1 | 9/2018 |
| EP | 3384754 A1 | 10/2018 |
| EP | 3289853 B1 | 3/2019 |
| EP | 3456167 A1 | 3/2019 |
| EP | 3466239 A1 | 4/2019 |
| EP | 3469878 A1 | 4/2019 |
| EP | 3289852 B1 | 6/2019 |
| EP | 3491192 A1 | 6/2019 |
| EP | 3494770 A1 | 6/2019 |
| EP | 3498074 A1 | 6/2019 |
| EP | 3000302 B1 | 8/2019 |
| EP | 3533314 A1 | 9/2019 |
| EP | 3569049 A1 | 11/2019 |
| EP | 3000307 B1 | 12/2019 |
| EP | 3586592 A2 | 1/2020 |
| EP | 3593613 A1 | 1/2020 |
| EP | 3593620 A1 | 1/2020 |
| EP | 3613272 A1 | 2/2020 |
| EP | 3243374 B1 | 3/2020 |
| EP | 3626038 A1 | 3/2020 |
| EP | 3259976 B1 | 4/2020 |
| EP | 3635647 A1 | 4/2020 |
| EP | 3378298 B1 | 5/2020 |
| EP | 3646699 A1 | 5/2020 |
| EP | 3662741 A1 | 6/2020 |
| EP | 3685648 A1 | 7/2020 |
| EP | 2995191 B2 | 10/2020 |
| EP | 3981231 A1 | 4/2022 |
| ES | 2116215 A1 | 7/1998 |
| ES | 2311322 A1 | 2/2009 |
| FI | 5533 A | 11/1913 |
| FR | 1451480 A | 1/1966 |
| FR | 2817344 A1 | 5/2002 |
| FR | 2901291 A | 11/2007 |
| FR | 2901291 A1 | 11/2007 |
| GB | 901081 A | 7/1962 |
| GB | 201519517 A1 | 5/2017 |
| IN | 01632DE2014 A | 8/2016 |
| IN | 201641027017 A | 10/2016 |
| IN | 202041039250 A | 9/2020 |
| JP | 7079681 A | 11/1982 |
| JP | S60253617 A | 12/1985 |
| JP | S63308110 A | 12/1988 |
| JP | H02196960 A | 8/1990 |
| JP | H02215311 A | 8/1990 |
| JP | H0779681 A | 3/1995 |
| JP | H1066436 A | 3/1998 |
| JP | 2000352044 A | 12/2000 |
| JP | 2005227233 A | 8/2005 |
| JP | 2011205967 A | 10/2011 |
| JP | 2015151826 A | 8/2015 |
| JP | 2015219651 A | 12/2015 |
| JP | 2017136035 A | 8/2017 |
| JP | 2017137729 A | 8/2017 |
| JP | 2018102154 A | 7/2018 |
| JP | 2018151388 A | 9/2018 |
| JP | 2019129744 A | 8/2019 |
| JP | 2019146506 A | 9/2019 |
| JP | 2019216744 A | 12/2019 |
| JP | 2020018255 A | 2/2020 |
| JP | 2020031607 A | 3/2020 |
| KR | 100974892 | 8/2010 |
| KR | 100974892 B1 | 8/2010 |
| KR | 20110018582 A | 2/2011 |
| KR | 101067576 B | 9/2011 |
| KR | 101067576 B1 | 9/2011 |
| KR | 101134075 B1 | 4/2012 |
| KR | 101447197 B1 | 10/2014 |
| KR | 101653750 | 9/2016 |
| KR | 20170041377 A | 4/2017 |
| KR | 200485051 Y | 11/2017 |
| KR | 200485051 Y1 | 11/2017 |
| KR | 101873657 B | 8/2018 |
| MX | GT06000012 A | 1/2008 |
| PL | 178299 B1 | 4/2000 |
| RO | 130713 | 11/2015 |
| RU | 1791767 C | 1/1993 |
| RU | 2005102554 A | 7/2006 |
| RU | 2421744 C | 6/2011 |
| RU | 2421744 C1 | 6/2011 |
| RU | 2447640 C1 | 4/2012 |
| RU | 2502047 C | 12/2013 |
| RU | 2502047 C1 | 12/2013 |
| RU | 164128 | 8/2016 |
| RU | 2017114139 A | 10/2018 |
| RU | 2017114139 A3 | 5/2019 |
| SU | 834514 A1 | 5/1981 |
| SU | 887717 A1 | 12/1981 |
| SU | 1052940 A1 | 11/1983 |
| SU | 1134669 A1 | 1/1985 |
| SU | 1526588 A1 | 12/1989 |
| SU | 1540053 A1 | 1/1991 |
| SU | 1761864 A1 | 9/1992 |
| WO | 1986005353 A1 | 9/1986 |
| WO | 2001052160 A1 | 7/2001 |
| WO | 2002015673 A1 | 2/2002 |
| WO | 2003005803 A1 | 1/2003 |
| WO | 2007050192 A2 | 5/2007 |
| WO | 2009156542 A1 | 12/2009 |
| WO | 2010003421 A1 | 1/2010 |
| WO | 2011104085 A1 | 9/2011 |
| WO | 2012041621 A1 | 4/2012 |
| WO | 2012110508 A1 | 8/2012 |
| WO | 2012110544 A1 | 8/2012 |
| WO | 2013063106 A2 | 5/2013 |
| WO | 2013079247 A1 | 6/2013 |
| WO | 2013086351 A1 | 6/2013 |
| WO | 2013087275 A1 | 6/2013 |
| WO | 2014046685 A1 | 3/2014 |
| WO | 2014093814 A1 | 6/2014 |
| WO | 2014195302 A1 | 12/2014 |
| WO | 2015038751 A1 | 3/2015 |
| WO | 2015153809 A1 | 10/2015 |
| WO | 16020595 A1 | 2/2016 |
| WO | 2016020595 A1 | 2/2016 |
| WO | 2016118686 A1 | 7/2016 |
| WO | 2017008161 A1 | 1/2017 |
| WO | 2017060168 A1 | 4/2017 |
| WO | 2017077113 A1 | 5/2017 |
| WO | 2017096489 A1 | 6/2017 |
| WO | 2017099570 A1 | 6/2017 |
| WO | 2017116913 A1 | 7/2017 |
| WO | 2017170507 A1 | 10/2017 |
| WO | 2017205406 A1 | 11/2017 |
| WO | 2017205410 A1 | 11/2017 |
| WO | 2018043336 A1 | 3/2018 |
| WO | 2018073060 A1 | 4/2018 |
| WO | 2018081759 A1 | 5/2018 |
| WO | 2018112615 | 6/2018 |
| WO | 2018116772 A1 | 6/2018 |
| WO | 2018142768 A1 | 8/2018 |
| WO | 2018200870 A1 | 11/2018 |
| WO | 2018206587 A1 | 11/2018 |
| WO | 2018220159 A1 | 12/2018 |
| WO | 2018226139 A1 | 12/2018 |
| WO | 2018235486 A1 | 12/2018 |
| WO | 2018235942 A1 | 12/2018 |
| WO | WO18235486 A1 | 12/2018 |
| WO | 2019034213 A1 | 2/2019 |
| WO | 2019079205 A1 | 4/2019 |

(56) References Cited

FOREIGN PATENT DOCUMENTS

| | | | |
|---|---|---|---|
| WO | 2019081349 | A1 | 5/2019 |
| WO | 2019091535 | A1 | 5/2019 |
| WO | 2019109191 | A1 | 6/2019 |
| WO | 2019124174 | A1 | 6/2019 |
| WO | 2019124217 | A1 | 6/2019 |
| WO | 2019124225 | A1 | 6/2019 |
| WO | 2019124273 | A1 | 6/2019 |
| WO | 2019129333 | A1 | 7/2019 |
| WO | 2019129334 | A1 | 7/2019 |
| WO | 2019129335 | A1 | 7/2019 |
| WO | 2019215185 | A1 | 11/2019 |
| WO | 2019230358 | A1 | 12/2019 |
| WO | 2020026578 | A1 | 2/2020 |
| WO | 2020026650 | A1 | 2/2020 |
| WO | 2020026651 | A1 | 2/2020 |
| WO | 2020031473 | A1 | 2/2020 |
| WO | 2020038810 | A1 | 2/2020 |
| WO | 2020039312 | A1 | 2/2020 |
| WO | 2020039671 | A1 | 2/2020 |
| WO | 2020044726 | A1 | 3/2020 |
| WO | 2020082182 | A1 | 4/2020 |
| WO | 2020100810 | A1 | 5/2020 |
| WO | 2020195007 | A1 | 10/2020 |
| WO | 2020210607 | A1 | 10/2020 |
| WO | 2020221981 | A1 | 11/2020 |
| WO | 2021262500 | A1 | 12/2021 |

OTHER PUBLICATIONS

"No-Till Soils", Soil Heath Brochure, 2 pages, last accessed Jul. 14, 2020.
Strickland et al., "Nitrate Toxicity in Livestock" Oklahoma State University, Feb. 2017, 2 pages.
Strickland et al., "Nitrate Toxicity in Livestock" Oklahoma State University, 8 pages, Feb. 2017.
Brownlee, "Neural Networks are Function Approximation Algorithms", Mar. 18, 2020, 13 pages.
Thompson, "Morning glory can make it impossible to harvest corn", Feb. 19, 2015, 3 pages.
Tumlison, "Monitoring Growth Development and Yield Estimation of Maize Using Very High-Resolution Uavimages in Gronau, Germany", Feb. 2017, 63 pages.
Hunt, "Mapping Weed Infestations Using Remote Sensing", 8 pages, Sep. 19, 2005.
Wright, et al., "Managing Grain Protein in Wheat Using Remote Sensing", 12 pages, 2003.
"Malting Barley in Pennsylvania", Agronomy Facts 77, 6 pages, Code EE0179 Jun. 2016.
"Green stem syndrome in soybeans", Agronomy eUpdate Issue 478 Oct. 10, 2014, 3 pages.
"Keep Weed Seed Out of Your Harvest", Aug. 8, 2019, 1 pages.
Hodrius et al., "The Impact of Multi-Sensor Data Assimilation on Plant Parameter Retrieval and Yield Estimation for Sugar Beet", The International Archives of the Photogrammetry, Remote Sensing and Spatial Information Sciences, vol. XL-7/W3, 2015, 36th International Symposium on Remote Sensing of Environment, May 11-15, 2015, Berlin, Germany, 7 pages.
Fernandez-Quintanilla et al., "Is the current state of the art of weed monitoring suitable for site-specific weed management in arable crops?", Feb. 2018, 35 pages.
Anonymously, "Improved System and Method for Controlling Agricultural Vehicle Operation Using Historical Data", Dec. 16, 2009, 8 pages.
Anonymously, "System and Method for Controlling Agricultural Vehicle Operation Using Historical Data", Jun. 30, 2009, 8 pages.
"Leafsnap, a new mobile app that identifies plants by leaf shape, is launched by Smithsonian and collaborators", May 2, 2011, 5 pages.
Insect Gallery, Department of Entomology, Kansas State University, Oct. 19, 2020, 8 pages.
Licht, "Influence of Corn Seeding Rate, Soil Attributes, and Topographic Characteristics on Grain Yield, Yield Components, and Grain Composition", 2015, 107 pages.
"Notice of Retraction Virtual simulation of plant with individual stem based on crop growth model", Mar. 5, 2017, 7 pages.
Ma et al., "Identification of Fusarium Head Blight in Winter Wheat Ears Using Continuous Wavelet Analysis", Dec. 19, 2019, 15 pages.
Leland, "Who Did that? Identifying Insect Damage", Apr. 1, 2015, 4 pages.
"How to improve maize protein content" https://www.yara.co.uk/crop-nutrition/forage-maize/improving-maize-protein-content, Sep. 30, 2020, 10 pages.
Hafemeister, "Weed control at harvest, combines are ideal vehicles for spreading weed seeds", Sep. 25, 2019, 3 pages.
"Harvesting Tips", Northern Pulse Growers Association, 9 pages, Jan. 31, 2001.
Wortmann et al., "Harvesting Crop Residues", Aug. 10, 2020, 8 pages.
"Harvesting", Oklahoma State University, Canola Swathing Guide, 2010, 9 pages, last accessed Jul. 14, 2020.
Hanna, "Harvest Tips for Lodged Corn", Sep. 6, 2011, 3 pages.
"Green Weeds Complicate Harvest", Crops, Slider, Sep. 26, 2012, 2 pages.
"Agrowatch Green Vegetation Index", Retrieved Dec. 11, 2020, 4 pages.
"Grazing Corn Residues" (http://www.ca.uky.edu), 3 pages, Aug. 24, 2009.
Jarnevich et al., Forecasting Weed Distributions Using Climate Data: A GIS Early Warning Tool, Downloaded on Jul. 13, 2020, 12 pages.
Combine Cutting and Feeding Mechanisms in the Southeast, by J-K Park, Agricultural Research Service, U.S. Dept. of Agriculture, 1963, 1 page.
Hartzler, "Fate of weed seeds in the soil", 4 pages, Jan. 31, 2001.
Digman, "Combine Considerations for a Wet Corn Harvest", Extension SpecialistUW—Madison, 3 pages, Oct. 29, 2009.
S-Series Combine and Front End Equipment Optimization, John Deere Harvester Works, 20 pages Date: Oct. 9, 2017.
Determining yield monitoring system delay time with geostatistical and data segmentation approaches (https://www.ars.usda.gov/ARSUserFiles/50701000/cswq-0036-128359.pdf) Jul. 2002, 13 pages.
Precision Agriculture: Yield Monitors (dated Nov. 1998—metadata; last accessed Jul. 16, 2020) (https://extensiondata.missouri.edu/pub/pdf/envqual/wq0451.pdf) 4 pages.
Paul et al., "Effect of soil water status and strength on trafficability" (1979) (https://www.nrcresearchpress.com/doi/pdfplus/10.4141/cjss79-035), 12 pages, Apr. 23, 1979.
Sick, "Better understanding corn hybrid characteristics and properties can impact your seed decisions" (https://emergence.fbn.com/agronomy/corn-hybrid-characteristics-and-properties-impact-seed-decisions) by Steve Sick, FBN Breeding Project Lead | Sep. 21, 2018, 8 pages.
Robertson et al., "Maize Stalk Lodging: Morphological Determinants of Stalk Strength" Mar. 2017, 10 pages.
Martin, et al., "Breakage Susceptibility and Hardness of Corn Kernels of Various Sizes and Shapes", May 1987, 10 Pages.
Application and Drawings for U.S. Appl. No. 16/171,978, filed Oct. 26, 2018, 53 pages.
Notice of Allowance for U.S. Appl. No. 16/432,557 dated Mar. 22, 2021, 9 pages.
Zhao, L., Yang, J., Li, P. and Zhang, L., 2014. Characteristics analysis and classification of crop harvest patterns by exploiting high-frequency multipolarization SAR data. IEEE Journal of Selected Topics in Applied Earth Observations and Remote Sensing, 7(9), pp. 3773-3783.
Feng-jie, X., Er-da, W. and Feng-yuan, X., Crop area yield risk evaluation and premium rates calculation—Based on nonparametric kernel density estimation. In 2009 International Conference on Management Science and Engineering, 7 pages.
Liu, R. and Bai, X., May 2014, Random fuzzy production and distribution plan of agricultural products and its PSO algorithm. In 2014 IEEE International Conference on Progress in Informatics and Computing (pp. 32-36). IEEE.

(56) References Cited

OTHER PUBLICATIONS

Notice of Allowance for U.S. Appl. No. 16/171,978 dated Mar. 31, 2021, 6 pages.
Application and Drawings for U.S. Appl. No. 17/067,383, filed Oct. 9, 2020, 61 pages.
Extended European Search Report and Written Opinion issued in European Patent Application No. 20208171.7, dated May 11, 2021, in 05 pages.
Cordoba, M.A., Bruno, C.I. Costa, J.L. Peralta, N.R. and Balzarini, M.G., 2016, Protocol for multivariate homegeneous zone delineation in precision agriculture, biosystems engineering, 143, pp. 95-107.
Pioneer Estimator, "Corn Yield Estimator" accessed on Feb. 13, 2018, 1 page. retrieved from: https://www.pioneer.com/home/site/us/tools-apps/growing-tools/corn-yield-estimator/.
Guindin, N. "Estimating Maize Grain Yield From Crop Biophysical Parameters Using Remote Sensing", Nov. 4, 2013, 19 pages.
EP Application No. 19203883.4-1004 Office Action dated May 3, 2021, 4 pages.
Iowa State University Extension and Outreach, "Harvest Weed Seed Control", Dec. 13, 2018, 6 pages. https://crops.extension.iastate.edu/blog/bob-hartzler/harvest-weed-seed-control.
Getting Rid of WeedsThrough Integrated Weed Management, accessed on Jun. 25, 2021, 10 pages. https://integratedweedmanagement.org/index.php/iwm-toolbox/the-harrington-seed-destructor.
The Importance of Reducing Weed Seeds, Jul. 2018, 2 pages. https://www.aphis.usda.gov/plant_health/soybeans/soybean-handouts.pdf.
Alternative Crop Guide, Published by the Jefferson Institute, "Buckwheat", Revised Jul. 2002. 4 pages.
Prosecution History for U.S. Appl. No. 16/380,691 including: Notice of Allowance dated Mar. 10, 2021 and Application and Drawings filed Apr. 10, 2019, 46 pages.
U.S. Appl. No. 16/831,216 Application and Drawings filed Mar. 26, 2020, 56 pages.
Notice of Allowance for U.S. Appl. No. 16/380,531 dated Apr. 5, 2021, 5 pages.
University of Arizona, Agricultural Machinery Management, Revised Jul. 2002, 9 pages.
7 Combine Tweaks to Boost Speed (https://www.agriculture.com/machinery/harvest-equipment/7-combine-tweaks-to-boost-speed_203-ar33059) 8 pages, Aug. 19, 2018.
Managing corn harvest this fall with variable corn conditions (https://www.ocj.com/2019/10/managing-corn-harvest-this-fall-with-variable-corn-conditions/), 4 pages, Oct. 10, 2019.
Reducing Aflatoxin in Corn During Harvest and Storage (https://extension.uga.edu/publications/detail.html?number=B1231&title=Reducing%20Aflatoxin%20in%20Corn%20During%20Harvest%20and%20Storage), 9 pages, Published with Full Review on Apr. 19, 2017.
Variable Rate Applications to Optimize Inputs (https://www.cotton.org/tech/physiology/cpt/miscpubs/upload/CPT-v9No2-98-REPOP.pdf), 8 pages, Nov. 2, 1998.
Robin Booker, Video: Canadian cage mill teams up with JD (https://www.producer.com/2019/12/video-canadian-cage-mill-teams-up-with-jd/), 6 pages, Dec. 19, 2019.
Jarnevich, et al. "Forecasting Weed Distributions using Climate Data: A GIS Early Warning Tool", Invasive Plant Science and Management, 11 pages, Jan. 20, 2017.
Burks, "Classification of Weed Species Using Color Texture Features and Discriminant Analysis" (http://citeseerx.ist.psu.edu/viewdoc/download?doi=10.1.1.468.5833&rep=rep1&type=pdf), 8 pages, 2000.
John Deere, https://www.youtube.com/watch?v=1Gq77CfdGI4&list=PL1KGsSJ4CWk4rShNb3-sTMOliL8meHBL5 (last accessed Jul. 14, 2020), Jun. 15, 2020, 5 pages.
Combine Adjustments (http://corn.agronomy.wisc.edu/Management/L036.aspx), 2 pages, Originally written Feb. 1, 2006; last updated Oct. 18, 2018.
Ardekani, "Off- and on-ground GPR techniques for field-scale soil moisture mapping" Jun. 2013, 13 pages.

Does an Adaptive Gearbox Really Learn How You Drive? (https://practicalmotoring.com.au/voices/does-an-adaptive-gearbox-really-learn-how-you-drive/), Oct. 30, 2019, 8 pages.
https://www.researchgate.net/publication/222527694_Energy_Requirement_Model_for_a_Combine_Harvester_Part_I_Development_of_Component Models, Abstract Only, Jan. 2005.
http://canola.okstate.edu/cropproduction/harvesting, 8 pages, Aug. 2011.
"Tips and Tricks of Harvesting High Moisture Grain", https://www.koenigequipment.com/blog/tips-and-tricks-of-harvesting-highmoisture-grain, 5 pages, last accessed Feb. 11, 2021.
Hoff, Combine Adjustements, Mar. 1943, 8 pages.
Haung et al., "Accurate Weed Mapping and Prescription Map Generation Based onFully Convolutional Networks Using UAV Imagery", 14 pages, Oct. 1, 2018.
Thompson, "Morning glory can make it impossible to harvest corn", Feb. 19, 2015, 4 pages.
Application and Drawings for U.S. Appl. No. 16/175,993, filed Oct. 31, 2018, 28 pages.
Application and Drawings for U.S. Appl. No. 16/380,623, filed Apr. 10, 2019, 36 pages.
Application and Drawings for U.S. Appl. No. 16/783,511, filed Feb. 6, 2020, 55 pages.
"Automated Weed Detection With Drones" dated May 25, 2017, retrieved at: <<https://www.precisionhawk.com/blog/media/topic/automated-weed-identification-with-drones>>, retrieved on Jan. 21, 2020, 4 pages.
F. Forcella, "Estimating the Timing of Weed Emergence", Site-Specific Management Guidelines, retrieved at: <<http://www.ipni.net/publication/ssmg.nsf/0/D26EC9A906F9B8C9852579E500773936/$FILE/SSMG-20.pdf>>, retrieved on Jan. 21, 2020, 4 pages.
Chauhan et al., "Emerging Challenges and Opportunities for Education and Research in Weed Science", frontiers in Plant Science. Published online Sep. 5, 2017, 22 pages.
Apan, A., Wells ,N., Reardon-Smith, K, Richardson, L, McDougall, K, and Basnet, B.B., 2008. Predictive mapping of blackberry in the Condamine Catchment using logistic regression and spatial analysis. In Proceedings of the 2008 Queensland Spatial Conference: Global Warning: What's Happening in Paradise. Spatial Sciences Institute, 11 pages.
Jarnevich, C.S., Holcombe, T.R., Barnett, D.T., Stohlgren, T.J. and Kartesz, J.T., 2010. Forecasting weed distributions using climate data: a GIS early warning tool. Invasive Plant Science and Management. 3(4), pp. 365-375.
Sa et al., "WeedMap: A Large-Scale Semantic Weed Mapping Framework Using Aerial Multispectral Imaging and Deep Neural Network for Precision Farming", Sep. 6, 2018, 25 pages.
Pflanz et al., "Weed Mapping with UAS Imagery and a Bag of Visual Words Based Image Classifier", Published Sep. 24, 2018, 28 pages.
Provisional Application and Drawings for U.S. Appl. No. 62/928,964, filed Oct. 31, 2019, 14 pages.
Application and Drawings for U.S. Appl. No. 16/783,475, filed Feb. 6, 2020, 55 pages.
U.S. Appl. No. 17/067,483 Application and Drawings as filed Oct. 9, 2020, 63 pages.
U.S. Appl. No. 17/066,442 Application and Drawings as filed Oct. 8, 2020, 65 pages.
U.S. Appl. No. 16/380,550, filed Apr. 10, 2019, Application and Drawings, 47 pages.
U.S. Appl. No. 17/066,999 Application and Drawings as filed Oct. 9, 2020, 67 pages.
U.S. Appl. No. 17/066,444 Application and Drawings as filed Oct. 8, 2020, 102 pages.
Extended Search Report for European Patent Application No. 20167930.5 dated Sep. 15, 2020, 8 pages.
Extended Search Report for European Patent Application No. 19205901.2 dated Mar. 17, 2020, 6 pages.
Notice of Allowance for U.S. Appl. No. 16/171,978, dated Dec. 15, 2020, 21 pages.
Zhigen et al., "Research of the Combine Harvester Load Feedback Control System Using Multi-Signal Fusion Method and Fuzzy Algorithm," 2010, Publisher: IEEE, 5 pages.

(56) References Cited

OTHER PUBLICATIONS

Dan et al., "On-the-go Throughput Prediction in a Combine Harvester Using Sensor Fusion," 2017, Publisher: IEEE, 6 pages.
Fernandez-Quintanilla et al., "Is the current state of the art of weed monitoring sutible for site-specific weed management in arable crops?", First Published May 1, 2018, 4 pages.
Dionysis Bochtis et al. "Field Operations Planning for Agricultural Vehicles: A Hierarchical Modeling Framework." Agricultural Engineering International: the CIGR Ejournal. Manuscript PM 06 021. vol. IX. Feb. 2007, pp. 1-11.
U.S. Appl. No. 16/432,557, filed Jun. 5, 2019, 61 pages.
European Search Report issued in counterpart European Patent Application No. 19205142.3 dated Feb. 28, 2020 (6 pages).
Mei-Ju et al., "Two paradigms in cellular Internet-of-Things access for energy-harvesting machine-to-machine devices: push-based versus pull-based," 2016, vol. 6, 9 pages.
Yi et al., "An Efficient MAC Protocol With Adaptive Energy Harvesting for Machine-to-Machine Networks," 2015, vol. 3, Publisher: IEEE, 10 pages.
European Search Report issued in European Patent Application No. 19203883.4 dated Mar. 23, 2020 (10 pages).
Notice of Allowance for U.S. Appl. No. 16/171,978 dated Oct. 28, 2020, 5 pages.
Notice of Allowance for U.S. Appl. No. 16/171,978, dated Aug. 7, 2020, 9 pages.
K.R. Manjunath et al., "Developing Spectral Library of Major Plant Species of Western Himalayas Using Ground Observations", J. Indian Soc Remote Sen (Mar. 2014) 42(a):201-216, 17 pages.
U.S. Appl. No. 16/380,564 Application and Drawings filed Apr. 10, 2019, 55 pages.
S. Veenadhari et al., "Machine Learning Approach for Forecasting Crop Yield Based on Climatic Parameters", 2014 International Conference on Computer Communication and Informatics (ICCCI-2014) Jan. 3-6, 2014, Coimbatore, India, 5 pages.
Non-Final Office Action for U.S. Appl. No. 16/380,531 dated Oct. 21, 2020, 10 pages.
U.S. Appl. No. 16/380,531 Application and Drawings filed Apr. 10, 2019, 46 pages.
Apan et al., "Predictive Mapping of Blackberry in the Condamine Catchment Using Logistic Regressiona dn Spatial Analysis", Jan. 2008, 12 pages.
Robson, "Remote Sensing Applications for the Determination of Yield, Maturity and Aflatoxin Contamination in Peanut", Oct. 2007, 275 pages.
Bhattarai et al., "Remote Sensing Data to Detect Hessian Fly Infestation in Commercial Wheat Fields", Apr. 16, 2019, 8 pages.
Towery, et al., "Remote Sensing of Crop Hail Damage", Jul. 21, 1975, 31 pages.
Sa et al., "WeedMap: A Large-Scale Semantic Weed Mapping Framework Using Aerial Multispectral Imaging and Deep Neural Network for Precision Farming", Sep. 7, 2018, 25 pages.
Mathyam et al., "Remote Sensing of Biotic Stress in Crop Plants and Its Applications for Pest Management", Dec. 2011, 30 pages.
Martinez-Feria et al., "Evaluating Maize and Soybean Grain Dry-Down in the Field With Predictive Algorithms and Genotype-by-Environmental Analysis", May 9, 2019, 13 pages.
"GIS Maps for Agriculture", Precision Agricultural Mapping, Retrieved Dec. 11, 2020, 6 pages.
Paul, "Scabby Wheat Grain? Increasing Your Fan Speed May Help", https://agcrops.osu.edu/newsletter/corn-newsletter/2015-20/scabby-wheat-grain-increasing-yourfan-speed-may-help, C.O.R.N Newsletter//2015-20, 3 pages.
Clay et al., "Scouting for Weeds", SSMG-15, 4 pages, 2002.
Taylor et al., "Sensor-Based Variable Rate Application for Cotton", 8 pages, 2010.
Christiansen et al., "Designing and Testing a UAV Mapping System for Agricultural Field Surveying", Nov. 23, 2017, 19 pages.
Haung et al., "AccurateWeed Mapping and Prescription Map Generation Based on Fully Convolutional Networks Using UAV Imagery", Oct. 1, 2018, 12 pages.
Morrison, "Should You Use Tillage to Control Resistant Weeds", Aug. 29, 2014, 9 pages.
Morrison, "Snow Trapping Snars Water", Oct. 13, 2005, 3 pages.
"Soil Zone Index", https://www.satimagingcorp.com/applications/natural-resources/agricultu . . . , Retrieved Dec. 11, 2020, 5 pages.
Malvic, "Soybean Cyst Nematode", University of Minnesota Extension, Oct. 19, 2020, 3 pages.
Unglesbee, "Soybean Pod Shatter—Bad Enough to Scout Before Harvest?—DTN", Oct. 17, 2018, 4 pages.
Tao, "Standing Crop Residue Can Reduce Snow Drifting and Increase Soil Moisture", 2 pages, last accessed Jul. 14, 2020.
Berglund, et al., "Swathing and Harvesting Canola", Jul. 2019, 8 pages.
Bell et al., "Synthetic Aperture Radar and Optical Remote Sensing of Crop Damage Attributed to Severe Weather in the Central United States", Jul. 25, 2018, 1 page.
Rosencrance, "Tabletop Grapes in India to Be Picked by Virginia Tech Robots", Jul. 23, 2020, 8 pages.
Lofton, et al., The Potential of Grazing Grain Sorghum Residue Following Harvest, May 13, 2020, 11 pages.
Beal et al., "Time Shift Evaluation to Improve Yield Map Quality", Published in Applied Engineering in Agriculture vol. 17(3): 385-390 (© 2001 American Society of Agricultural Engineers ), 9 pages.
"Tips and Tricks of Harvesting High Moisture Grain", https://www.koenigequipment.com/blog/tips-and-tricks-of-harvesting-highmoisture-grain, 7 pages, last accessed Jul. 14, 2020.
Ransom, "Tips for Planting Winter Wheat and Winter Rye (for Grain) (Aug. 15, 2019)", 2017, 3 pages.
AgroWatch Tree Grading Maps, "The Grading Maps and Plant Count Reports", https://www.satimagingcorp.com/applications/natural-resources/agricultu . . . , Retrieved Dec. 11, 2020, 4 pages.
Ackley, "Troubleshooting Abnormal Corn Ears", Jul. 23, 2020, 25 pages.
Smith, "Understanding Ear Flex", Feb. 25, 2019, 17 pages.
Carroll et al., "Use of Spectral Vegetation Indicies Derived from Airborne Hyperspectral Imagery for Detection of European Corn Borer Infestation in Iowa Corn Plots", Nov. 2008, 11 pages.
Agriculture, "Using drones in agriculture and capturing actionable data", Retrieved Dec. 11, 2020, 18 pages.
Bentley et al., "Using Landsat to Identify Thunderstorm Damage in Agricultural Regions", Aug. 28, 2001, 14 pages.
Duane Grant and the Idaho Wheat Commission, "Using Remote Sensing to Manage Wheat Grain Protein", Jan. 2, 2003, 13 pages.
Zhang et al., "Using satellite multispectral imagery for damage mapping of armyworm (*Spodoptera frugiperda*) in maize at a regional scale", Apr. 10, 2015, 14 pages.
Booker, "Video: Canadian cage mill teams up with JD", Dec. 19, 2019, 6 pages.
AgTalk Home, "Best Combine to Handle Weeds", Posted Nov. 23, 2018, 9 pages.
"Volunteer corn can be costly for soybeans", Jun. 2, 2016, 1 page.
Pflanz, et al., "Weed Mapping with UAS Imagery and a Bag of Visual Words Based Image Classifier", Published Sep. 24, 2018, 17 pages.
Hartzler, "Weed seed predation in agricultural fields", 9 pages, 2009.
Sa et al., "Weedmap: A Large-Scale Sematnic Weed Mapping Framework Using Aerial Multispectral Imaging and Deep Neural Netowrk for Precision Farming", Sep. 6, 2018, 25 pages.
Nagelkirk, Michigan State University-Extension, "Wheat Harvest: Minimizing the Risk of Fusarium Head Scab Losses", Jul. 11, 2013, 4 pages.
Saskatchewan, "Wheat: Winter Wheat", (https://www.saskatchewan.ca/business/agriculture-natural-resources-and-industry/agribusiness-farmers-and-ranchers/crops-and-irrigation/field-crops/cereals-barley-wheat-oats-triticale/wheat-winter-wheat) 5 pages, last accessed Jul. 14, 2020.
Quora, "Why would I ever use sport mode in my automatic transmission car? Will this incrase fuel efficiency or isit simply a feature that makes form more fun when driving?", Aug. 10, 2020, 5 pages.
Wade, "Using a Drone's Surface Model to Estimate Crop Yields & Assess Plant Health", Oct. 19, 2015, 14 pages.

(56) References Cited

OTHER PUBLICATIONS

Mathyam et al., "Remote Sensing of Biotic Stress in Crop Plants and Its Applications for Pest Stress", Dec. 2011, 30 pages.
"Four Helpful Weed-Management Tips for Harvest Time", 2 pages, Sep. 4, 2019.
Franz et al., "The role of topography, soil, and remotely sensed vegetation condition towards predicting crop yield", University of Nebraska—Lincoln, Mar. 23, 2020, 44 pages.
Peiffer et al., The Genetic Architecture of Maize Stalk Strength:, Jun. 20, 2013, 14 pages.
Lamsal et al. "Sugarcane Harvest Logistics in Brazil" Iowa Research Online, Sep. 11, 2013, 27 pages.
Jensen, "Algorithms for Operational Planning of Agricultural Field Operations", Mechanical Engineering Technical Report ME-TR-3, Nov. 9, 2012, 23 pages.
Chauhan, "Remote Sensing of Crop Lodging", Nov. 16, 2020, 16 pages.
Martin et al., "Breakage Susceptibility and Harness of Corn Kernels of Various Sizes and Shapes", May 1987, 10 pages.
Jones et al., "Brief history of agricultural systems modeling" Jun. 21, 2016, 15 pages.
Dan Anderson, "Brief history of agricultural systems modeling" 1 pages. Aug. 13, 2019.
A.Y. Şeflek, "Determining the Physico-Mechanical Characteristics of Maize Stalks Fordesigning Harvester", The Journal of Animal & Plant Sciences, 27(3): 2017, p. 855-860 ISSN: 1018-7081, Jun. 1, 2017.
Carmody, Paul, "Windrowing and harvesting", 8 pages Date: Feb. 3, 2010.
Dabney, et al., "Forage Harvest Representation in RUSLE2", Published Nov. 15, 2013, 17 pages.
John Deere S-Series Combines S760, S770, S780, S790 Brochure, 44 pages, Nov. 15, 2017.
Sekhon et al., "Stalk Bending Strength is Strongly Assoicated with Maize Stalk Lodging Incidence Across Multiple Environments", Jun. 20, 2019, 23 pages.
Thomison et al. "Abnormal Corn Ears", Apr. 28, 2015, 1 page.
Anderson, "Adjust your Combine to Reduce Damage to High Moisture Corn", Aug. 13, 2019, 11 pages.
Sumner et al., "Reducing Aflatoxin in Corn During Harvest and Storage", Reviewed by John Worley, Apr. 2017, 6 pages.
Sick, "Better understanding corn hybrid characteristics and properties can impact your seed decisions", 8 pages, Sep. 21, 2018.
TraCI/Change Vehicle State—SUMO Documentation, 10 pages, Retrieved Dec. 11, 2020.
Arnold, et al., Chapter 8. "Plant Growth Component", Jul. 1995, 41 pages.
Humburg, Chapter: 37 "Combine Adjustments to Reduce Harvest Losses", 2019, South Dakota Board of Regents, 8 pages.
Hoff, "Combine Adjustments", Cornell Extension Bulletin 591, Mar. 1943, 10 pages.
University of Wisconsin, Corn Agronomy, Originally written Feb. 1, 2006 | Last updated Oct. 18, 2018, 2 pages.
University of Nebraska-Lincoln, "Combine Adjustments for Downed Corn—Crop Watch", Oct. 27, 2017, 5 pages.
"Combine Cleaning: Quick Guide to Removing Resistant Weed Seeds (Among Other Things)", Nov. 2006, 5 pages.
Dekalb, "Corn Drydown Rates", 7 pages, Aug. 4, 2020.
Mahmoud et al. Iowa State University, "Corn Ear Orientation Effects on Mechanical Damage and Forces on Concave", 1975, 6 pages.
Sindelar et al., Kansas State University, "Corn Growth & Development" Jul. 17, 2017, 9 pages.
Pannar, "Manage the Growth Stages of the Maize Plant With Pannar", Nov. 14, 2016, 7 pages.
He et al., "Crop residue harvest impacts wind erodibility and simulated soil loss in the Central Great Plains", Sep. 27, 2017, 14 pages.
Blanken, "Designing a Living Snow Fence for Snow Drift Control", Jan. 17, 2018, 9 pages.
Jean, "Drones give aerial boost to ag producers", Mar. 21, 2019, 4 pages.
Zhao et al., "Dynamics modeling for sugarcane sucrose estimation using time series satellite imagery", Jul. 27, 2017, 11 pages.
Brady, "Effects of Cropland Conservation Practices on Fish and Wildlife Habitat", Sep. 1, 2007, 15 pages.
Jasa, et al., "Equipment Adjustments for Harvesting Soybeans at 13%-15% Moisture", Sep. 15, 2017, 2 pages.
Bendig et al., "Estimating Biomass of Barley Using Crop Surface Models (CSMs) Derived from UAV-Based RGB Imaging", Oct. 21, 2014, 18 pages.
Robertson, et al., "Maize Stalk Lodging: Morphological Determinants of Stalk Strength", Mar. 3, 2017, 10 pages.
MacGowan et al. Purdue University, Corn and Soybean Crop Deprediation by Wildlife, Jun. 2006, 14 pages.
Martinez-Feria et al., Iowa State University, "Corn Grain Dry Down in Field From Maturity to Harvest", Sep. 20, 2017, 3 pages.
Wrona, "Precision Agriculture's Value" Cotton Physiology Today, vol. 9, No. 2, 1998, 8 pages.
Zhang et al., "Design of an Optical Weed Sensor Using Plant Spectral Characteristics" Sep. 2000, 12 pages.
Hunt, et al., "What Weeds Can Be Remotely Sensed?", 5 pages, May 2016.
Pepper, "Does an Adaptive Gearbox Really Learn How You Drive?", Oct. 30, 2019, 8 pages.
Eggerl, "Optimization of Combine Processes Using Expert Knowledge and Methods of Artificial Intelligence", Oct. 7, 1982, 143 pages.
Sheely et al., "Image-Based, Variable Rate Plant Growth Regulator Application in Cotton at Sheely Farms in California", Jan. 6-10, 2003 Beltwide Cotton Conferences, Nashville, TN, 17 pages.
Kovacs et al., "Physical characteristics and mechanical behaviour of maize stalks for machine development", Apr. 23, 2019, 1-pages.
Anonymously, "Optimizing Crop Profit Across Multiple Grain Attributes and Stover", ip.com, May 26, 2009, 17 pages.
Breen, "Plant Identification: Examining Leaves", Oregon State University, 2020, 8 pages.
Caglayan et al., A Plant Recognition Approach Using Shape and Color Features in Leaf Images, Sep. 2013, 11 pages.
Casady et al., "Precision Agriculture" Yield Monitors University of Missouri-System, 4 pages, 1998.
Apan et al., "Predicting Grain Protein Content in Wheat Using Hyperspectral Sensing of In-season Crop Canopies and Partial Least Squares Regression" 18 pages, 2006.
Xu et al., "Prediction of Wheat Grain Protein by Coupling Multisource Remote Sensing Imagery and ECMWF Data", Apr. 24, 2020, 21 pages.
Day, "Probability Distributions of Field Crop Yields," American Journal of Agricultural Economics, vol. 47, Issue 3, Aug. 1965, Abstract Only, 1 page.
Butzen, "Reducing Harvest Losses in Soybeans", Pioneer, Jul. 23, 2020, 3 pages.
Martin et al., "Relationship between secondary variables and soybean oil and protein concentration", Abstract Only, 1 page., 2007.
Torres, "Precision Planting of Maize" Dec. 2012, 123 pages.
Extended European Search Report and Written Opinion issued in European Patent Application No. 23154789.4, dated Sep. 19, 2023, in 08 pages.
Martin et al. Breakage Susceptibiltiy and Hardness of Corn Kernels of Various Sizes and Shapes, vol. 3( ): May 1087, 10 pages. https://pdfs.semanticscholar.org/e579/1b5363b6a78efd44adfb97755a0cdd14f7ca.pdf.
Hoff, "Combine Adjustments" (https://smallfarmersjournal.com/combine-adjustments/), Mar. 1943, 9 pages.
Optimizing Crop Profit Across Multiple Grain Attributes and Stover, Electronic Publication Date May 26, 2009, 17 pages.
Unglesbee, Soybean Pod Shatter—Bad Enough to Scout Before Harvest—DTN, Oct. 17, 2018, 11 pages. Susceptibility to shatter (https://agfax.com/2018/10/17/soybean-pod-shatter-bad-enough-to-scout-before-harvest-dtn/).
GIS Maps for Agricultural, accessed on May 10, 2022, 7 pages. https://www.satimagingcorp.com/services/geographic-information-systems/gis-maps-agriculture-mapping.

(56) References Cited

OTHER PUBLICATIONS https://wingtra.com/drone-mapping-applications/use-of-drones-in-agriculture, accessed on May 10, 2022, 19 pages.

Energy Requirement Model for a Combine Harvester: Part 1: Development of Component Models, Published online Dec. 22, 2004, 17 pages.

Energy Requirement Model for a Combine Harvester, Part 2: Integration of Component Models, Published online Jan. 18, 2005, 11 pages.

Pioneer on reducing soybean harvest losses including combine adjustments (last accessed Jul. 23, 2020) (https://www.pioneer.com/us/agronomy/reducing_harvest_losses_in_soybeans.html), 5 pages.

\* cited by examiner

SYSTEMS AND METHODS FOR PREDICTIVE TRACTIVE CHARACTERISTICS AND CONTROL

FIELD OF THE DESCRIPTION

The present descriptions relates to mobile machines, particularly mobile agricultural machines

BACKGROUND

There are a wide variety of different types of mobile agricultural machines. A mobile agricultural machine performs an operation at a worksite, such as a field. The mobile agricultural machine may include a propulsion subsystem that propels the agricultural machine across the field.

The discussion above is merely provided for general background information and is not intended to be used as an aid in determining the scope of the claimed subject matter.

SUMMARY

An information map is obtained by an agricultural system. The information map maps values of a characteristic at different geographic locations in a worksite. An in-situ sensor detects tractive characteristic values as a mobile agricultural machine operates at the worksite. A predictive map generator generates a predictive map that maps predictive tractive characteristic values at different geographic locations in the worksite based on a relationship between values of the characteristic in the information map and tractive characteristic values detected by the in-situ sensor. The predictive map can be output and used in automated machine control.

Example 1 is an agricultural system comprising:

a communication system that receives an information map that maps values of a characteristic to different geographic locations in the field;

an in-situ sensor that detects a tractive characteristic value corresponding to a geographic location;

a predictive model generator that generates a predictive tractive characteristic model indicative of a relationship between the characteristic and the tractive characteristic based on the tractive characteristic value detected by the in-situ sensor corresponding to the geographic location and a value of the characteristic in the information map corresponding to the geographic location; and a predictive map generator that generates a functional predictive tractive characteristic map of the field that maps predictive tractive characteristic values to the different geographic locations in the field based on the values of the characteristic in the information map and based on the predictive tractive characteristic model.

Example 2 is the agricultural system of any or all previous examples, wherein the predictive map generator configures the functional predictive tractive characteristic map for consumption by a control system that generates control signals to control a controllable subsystem of a mobile machine based on the functional predictive tractive characteristic map.

Example 3 is the agricultural system of any or all previous examples, wherein the tractive characteristic is one of tractive effort, tractive efficiency, wheel slip, or draft.

Example 4 is the agricultural system of any or all previous examples, wherein the information map is one of:

a topographic map that maps, as the values of the characteristic, topographic characteristic values to the different geographic locations in the field;

a soil property map that maps, as the values of the characteristic, soil property values to the different geographic locations in the field;

a prior operation map that maps, as the values of the characteristic, prior operation characteristic values to the different geographic locations in the field; or a ground cover map that maps, as the values of the characteristic, ground cover values to the different geographic locations in the field.

Example 5 is the agricultural system of any or all previous examples, wherein the information map comprises two or more information maps, each of the two or more information maps mapping values of a respective characteristic to the different geographic locations in the field, wherein the predictive model generator generates, as the predictive tractive characteristic model, a predictive tractive characteristic model indicative of a relationship between the two or more respective characteristics and the tractive characteristic based on the tractive characteristic value detected by the in-situ sensor corresponding to the geographic location and the values of the two or more respective characteristics in the two or more information maps corresponding to the geographic location, and wherein the predictive map generator generates, as the functional predictive tractive characteristic map, a functional predictive tractive characteristic map that maps predictive tractive characteristic values to the different geographic locations in the field based on the values of the two more characteristics in the two or more information maps corresponding to the different geographic locations and the predictive tractive characteristic model.

Example 6 is the agricultural system of any or all previous examples, wherein the in-situ sensor comprises two or more in-situ sensors, each of the two or more in-situ sensors detecting a value of a respective tractive characteristic corresponding to the geographic location, wherein the predictive model generator generates, as the predictive tractive characteristic model, a predictive tractive characteristic model indicative of a relationship between the characteristic and the two or more respective tractive characteristics based on the value of the two or more tractive characteristics detected by two or more in-situ sensors corresponding to the geographic location and the value of the characteristics in the information map corresponding to the geographic location, and wherein the predictive map generator generates, as the functional predictive tractive characteristic map, a functional predictive tractive characteristic map that maps predictive values of two or more tractive characteristics to the different geographic locations in the field based on the values of the characteristic in the information map corresponding to the different geographic locations and the predictive tractive characteristic model.

Example 7 is the agricultural system of any or all previous examples and further comprising:

a control system that generates a control signal to control a controllable subsystem of a mobile machine based on the functional predictive tractive characteristic map.

Example 8 is the agricultural system of any or all previous examples, wherein the controllable subsystem comprises a steering subsystem and wherein the control signal controls the steering subsystem to control a heading of the mobile machine.

Example 9 is the agricultural system of any or all previous examples, wherein the controllable subsystem comprises a position subsystem and wherein the control signal controls the position subsystem to control a position of a component of the mobile machine.

Example 10 is the agricultural system of any or all previous examples and further comprising
a control system that generates a control signal to control a component of a propulsion subsystem of a mobile machine based on the functional predictive tractive characteristic map, wherein the component comprises one of:
a powerplant, and wherein the control signal controls the powerplant to supply more power;
a gear box, and wherein the control signal selects a gear of the gear box;
a transfer case, and wherein the control signal activates the transfer case to lock a first drive shaft to a second drive shaft; or
a differential lock that is controllable to lock a differential; and wherein the control signal controls the differential lock to lock the differential.

Example 11 is a computer implemented method comprising:
receiving an information map that maps values of a characteristic to different geographic locations in a field;
obtaining in-situ sensor data indicative of a value of a tractive characteristic corresponding to a geographic location at the field;
generating a predictive tractive characteristic model indicative of a relationship between the characteristic and the tractive characteristic; and
controlling a predictive map generator to generate a functional predictive tractive characteristic map of the field, that maps predictive values of the tractive characteristic to the different locations in the field based on the values of the characteristic in the information map and the predictive tractive characteristic model.

Example 12 is the computer implemented method of any or all previous examples and further comprising:
controlling a controllable subsystem of a mobile machine based on the functional predictive tractive characteristic map.

Example 13 is the computer implemented method of any or all previous examples, wherein controlling the controllable subsystem comprises controlling a propulsion subsystem of the mobile machine based on the functional predictive tractive characteristic map.

Example 14 is the computer implemented method of any or all previous examples, wherein controlling the controllable subsystem comprises controlling a steering subsystem of the mobile machine based on the functional predictive tractive characteristic map.

Example 15 is the computer implemented method of any or all previous examples, wherein controlling the controllable subsystem comprises controlling a position subsystem to control a position of a component of the mobile machine based on the functional predictive tractive characteristic map.

Example 16 is a mobile agricultural machine, comprising:
a communication system that receives an information map that maps values of a characteristic to different geographic locations in a field;
a geographic position sensor that detects a geographic location of the mobile agricultural machine;
an in-situ sensor that detects a tractive characteristic value corresponding to a geographic location;
a predictive model generator that generates a predictive tractive characteristic model indicative of a relationship between values of the characteristic and tractive characteristic values based on the tractive characteristic value detected by the in-situ sensor corresponding to the geographic location and a value of the characteristic in the information map corresponding to the geographic location; and
a predictive map generator that generates a functional predictive tractive characteristic map of the field, that maps predictive tractive characteristic values to the different geographic locations in the field, based on the values of the characteristic in the information map corresponding to those different geographic locations and based on the predictive tractive characteristic model.

Example 17 is the mobile agricultural machine of any or all previous examples and further comprising:
a control system that generates a control signal to control a position subsystem of the mobile agricultural machine based on the functional predictive tractive characteristic map and the geographic location of the mobile agricultural machine.

Example 18 is the mobile agricultural machine of any or all previous examples and further comprising:
a control system that generates a control signal to control a propulsion subsystem of the mobile agricultural machine based on the functional predictive tractive characteristic map and the geographic location of the mobile agricultural machine.

Example 19 is the mobile agricultural machine of any or all previous examples and further comprising:
a control system that generates a control signal to control a steering subsystem of the mobile agricultural machine based on the functional predictive tractive characteristic map and the geographic location of the mobile agricultural machine.

Example 20 is the mobile agricultural machine of claim 16 and further comprising:
a control system that generates a control signal to control an interface mechanism to generate an indication indicative of the functional predictive tractive characteristic map.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
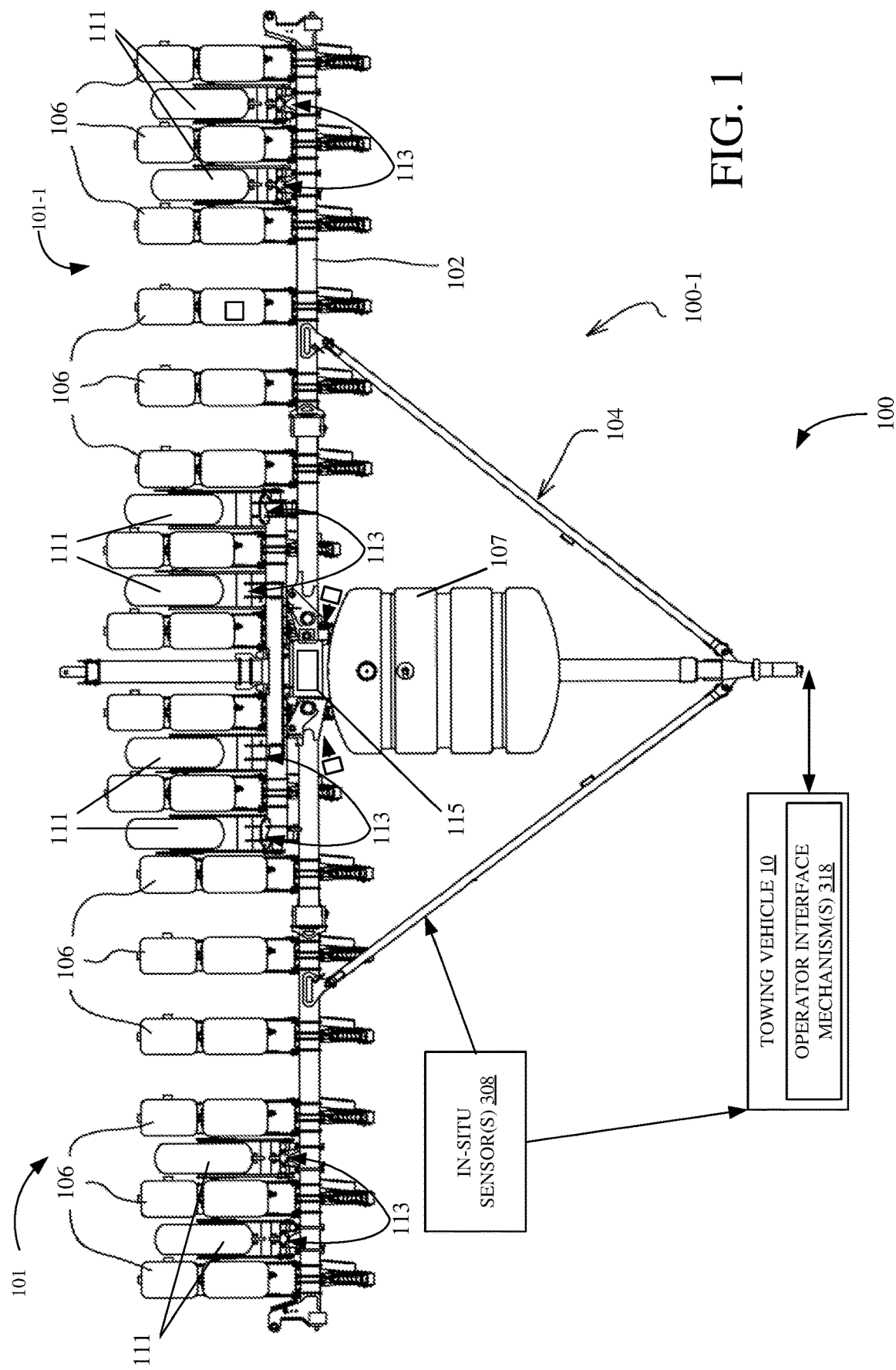
FIG. 1 is a partial top view and partial block diagram of one example of a mobile agricultural machine.

For the purposes of promoting an understanding of the principles of the present disclosure, reference will now be made to the examples illustrated in the drawings, and specific language will be used to describe the same. It will nevertheless be understood that no limitation of the scope of the disclosure is intended. Any alterations and further modifications to the described devices, systems, methods, and any further application of the principles of the present disclosure are fully contemplated as would normally occur to one skilled in the art to which the disclosure relates. In particular, it is fully contemplated that the features, components, and/or steps described with respect to one example may be combined with the features, components, and/or steps described with respect to other examples of the present disclosure.

In one example, the present description relates to using in-situ data taken concurrently with an operation, in combination with prior or predicted data, such as prior or predicted data represented in a map, to generate a predictive model and a predictive map, such as a predictive tractive characteristic model and predictive tractive characteristic map. In some examples, the predictive map can be used to control a mobile machine.

Mobile agricultural machines operate at a worksite, such as a field, to perform an agricultural operation. The mobile agricultural machines may include a towing vehicle and a towed implement. The tractive characteristics, such as the tractive effort, the tractive efficiency, wheel slip, draft, as well as various other tractive characteristics may vary during an operation. For example, the tractive characteristics of the machine may vary as characteristics at the field (such as topographic characteristics, soil properties, ground cover, as well as various other characteristics) vary.

In some cases, sensor technology can be employed to detect tractive characteristics, and subsequent control can be undertaken based on the sensor readings. However, such control can suffer from latencies in sensor readings as well as machine latencies. Thus, it would be desirable to provide a system that allows for proactive control that can maintain desired performance through variable conditions. Proactive control reduces (or eliminates) the problems associated with latency.

In one example, the present description relates to obtaining an information map, such as a topographic map. A topographic map illustratively maps topographic characteristic values across different geographic locations in a field of interest, such as elevations of the ground across different geographic locations in a field of interest. Since ground slope is indicative of a change in elevation, having two or more elevation values allows for calculation of slope across the areas having known elevation values. Greater granularity of slope can be accomplished by having more areas with known elevation values. As an agricultural machine travels across the terrain in known directions, the pitch and roll of the agricultural machine can be determined based on the slope of the ground (i.e., areas of changing elevation). Topographic characteristics, when referred to below, can include, but are not limited to, the elevation, slope (e.g., including the machine orientation relative to the slope), and ground profile (e.g., roughness). The topographic map can be derived from sensor readings taken during a previous operation on the field of interest or from an aerial survey of the field (such as a plane, drone, or satellite equipped with lidar or other distance measuring devices). In some examples, the topographic map can be obtained from third parties. These are merely some examples. The topographic map can be generated in a variety of other ways.

In one example, the present description relates to obtaining an information map, such as a soil property map. A soil property map illustratively maps soil property values (which may be indicative of soil type, soil moisture, soil structure, soil compaction, soil surface profile, as well as various other soil properties) across different geographic locations in a field of interest. The soil property map thus provides georeferenced soil properties across a field of interest. Soil type can refer to taxonomic units in soil science, wherein each soil type includes defined sets of shared properties. Soil types can include, for example, sandy soil, clay soil, silt soil, peat soil, chalk soil, loam soil, and various other soil types. Soil moisture can refer to the amount of water that is held or otherwise contained in the soil. Soil moisture can also be referred to as soil wetness. Soil structure can refer to the arrangement of solid parts of the soil and the pore space located between the solid parts of the soil. Soil structure can include the way in which individual particles, such as individual particles of sand, silt, and clay, are assembled. Soil structure can be described in terms of grade (degree of aggregation), class (average size of aggregates), and form (types of aggregates), as well as a variety of other descriptions. Soil compaction can refer to the density of the soil. Soil surface profile, sometimes referred to a soil surface roughness, can refer to the irregularities of the soil surface. These are merely examples. Various other characteristics and properties of the soil can be mapped as soil property values on a soil property map. The soil property map can be derived in a variety of ways, such as from sensor readings during previous operations at the field of interest, from surveys of the field, such as soil sampling surveys, as well as surveys by aerial machines (e.g., satellites, drones, etc.) that includes sensors that capture sensor information of the field. The soil property map can be generated based on data from remote sources, such as third-party service providers or government agencies, for instance, the USDA Natural Resources Conservation Service (NRCS), the United States Geological Survey (USGS), as well as from various other remote sources. These are merely some examples. The soil property map can be generated in a variety of other ways.

In one example, the present description relates to obtaining a map such as a prior operation map. The prior operation map includes geolocated values of prior operation characteristics across different geographic locations in a field of interest. Prior operation characteristics can include characteristics detected by sensors during prior operations at the field, such as characteristics of the field, characteristics of vegetation on the field, characteristics of the environment, as well as operating parameters of the machines performing the prior operations. One example of a prior operation map is a historical tractive characteristic map. A historical tractive characteristic map maps, as values of prior operation characteristics, values of historical tractive characteristics across different geographic locations in the field of interest. A machine performing a prior operation at the field may be outfitted with sensors that detect the tractive characteristics at the field. Another example of a prior operation map is a prior irrigation operation map. A prior irrigation operation map maps, as values of prior operation characteristics, irrigation operation characteristic values across different geographic locations in the field of interest. The irrigation operation characteristic values can indicate locations where water was applied, the timing of the application, as well as the amount of water applied. The machine(s) performing the prior irrigation operation may be outfitted with sensors that detect the irrigation operation characteristic values. Another example of a prior operation map is a prior tiling operation map. A tiling operation illustratively refers to an operation in which drainage tiling is installed at the field of interest. A prior tiling operation maps, as values of prior operation characteristics, tiling operation characteristic values across different geographic locations in the field of interest. The tiling operation characteristic values can indicate the locations where tiling was installed, the depths at which the tiling was installed, as well as the dimensions of the tiling installed. The machine(s) performing the prior tiling operation may be outfitted with sensors that detect the tiling operation characteristic values. Another example of a prior operation map is prior traffic map. A prior traffic map maps, as values of prior operation characteristics, traffic characteristic values across different geographic locations in the field of interest. The traffic characteristic values can indicate the travel paths of the machines during the prior operations as well as load characteristics (e.g., weight of the machine) along the travel path. The machine(s) performing the prior operation(s) may be outfitted with sensors that detect the traffic characteristic values. Various other types of prior operation maps are contemplated herein, such as prior harvesting maps, prior planting maps, prior spraying maps, prior tillage maps, as well as various other prior operation maps. In other examples, the prior operation map can be based on data provided by an operator or user. These are merely some examples. The prior operation map can be generated in a variety of other ways.

In one example, the present description relates to obtaining an information map, such as a ground cover map. A ground cover map illustratively maps ground cover values (which may be indicative of the amount and distribution of material covering the surface of the ground) across different geographic locations in a field of interest. The ground cover values may indicate whether there is bare dirt or whether some material covers a location of the field. The ground covering material may include live vegetation material which may be planted or otherwise alive (e.g., cover crop, weeds, etc.) as well as dead (or previous) vegetation material, such as vegetation residue (e.g., crop residue) from a previous year or season or earlier in the same year or season. The ground covering material may be dry or may be at least partially coated with water, snow, or ice. The ground covering material may also include various other materials, such as a variety of debris at the field. The ground cover map may be derived from sensor readings during a previous operation at the field. For example, the machine performing the previous operation may be outfitted with sensors that detect ground cover values at different geographic locations in the field. The ground cover map may be derived from sensor readings from sensors on aerial machine (e.g., satellites, drones, etc.) that survey the field of interest. The sensors may read one or more bands of electromagnetic radiation reflected from the ground cover material at the field. These are merely some examples. The ground cover map can be generated in a variety of other ways.

In other examples, one or more other types of information maps can be obtained. The various other types of information maps illustratively map values of various other characteristics across different geographic locations in a field of interest.

In one example, the present description relates to obtaining in-situ data from in-situ sensors on the mobile agricultural machine taken concurrently with an operation. The in-situ sensor data can include tractive characteristic data generated by tractive characteristic sensors.

The present discussion proceeds, in some examples, with respect to systems that obtain one or more maps of a field, such as one or more of a topographic map, a soil property map, a prior operation map, as well as various other types of maps and also use an in-situ sensor to detect a variable indicative of a characteristic value, such as a tractive characteristic value. The systems generate a model that models a relationship between the values on the obtained map(s) and the output values from the in-situ sensor. The model is used to generate a predictive map that predicts characteristic values, such as tractive characteristic values. The predictive map, generated during an operation, can be presented to an operator or other user or used in automatically controlling a mobile agricultural machine during an operation, or both. In some examples, the predictive map can be used to control one or more operating parameters of the mobile agricultural machine during an operation.

While the various examples described herein proceed with respect to certain example mobile agricultural machines, it will be appreciated that the systems and methods described herein are applicable to various other types of mobile agricultural machines.

FIG. 1 is a partial top view, partial block diagram of one example of a mobile agricultural machine 100 as a mobile agricultural planting machine 100-1 that includes, as an implement 101, a planting implement 101-1, illustratively in the form of a row planter implement, and a towing vehicle 10 (e.g., a tractor). FIG. 1 also illustrates that mobile agricultural planting machine 100-1 can include one or more in-situ sensors 308 which sense values of various characteristics. In-situ sensors 308 will be discussed in greater detail below. In-situ sensors 308 can be on individual parts of mobile agricultural machine 100, such as on implement 101 or towing vehicle 10, or can be distributed in various ways across both the implement 101 and towing vehicle 10. As illustrated, towing vehicle 10 can include one or more operator interface mechanisms 318 which can be interactable to manipulate and control mobile agricultural machine 100.

Planting implement 101-1 is a row crop planting machine that illustratively includes a toolbar 102 that is part of a frame 104. FIG. 1 also shows that a plurality of planting row units are mounted to the toolbar 102. Agricultural planter 101-1 can be towed behind towing vehicle 10, such as a tractor. FIG. 1 shows that material, such as seed, fertilizer, etc. can be stored in a tank 107 and pumped, using one or more pumps 115, through supply lines to the row units. The seed, fertilizer, etc., can also be stored on the row units themselves. As shown in the illustrated example of FIG. 1, each row unit can include a controller 163 which can be used to control operating parameters of each row unit, such as the downforces, operating depth, as well as various other operating parameters. Planting implement 101-1 can also include a set of frame wheels 111, attached to tool bar 102 or another frame, that support the planting implement 101-1 over the surface at which it operates. Planting implement 101-1 can also include a suspension subsystem. For instance, frame wheels can include a respective controllable suspension 113 (e.g., air suspension, hydraulic suspension, electromechanical suspension, etc.) which can be controllably adjusted, such as by controlling an amount or pressure of fluid (e.g., air or hydraulic fluid) or controlling resistance. The frame wheel actuators 113 are controllable to, among other things, raise and lower wheels 111 to raise and lower toolbar 102 or frame 104.

Figure 2:
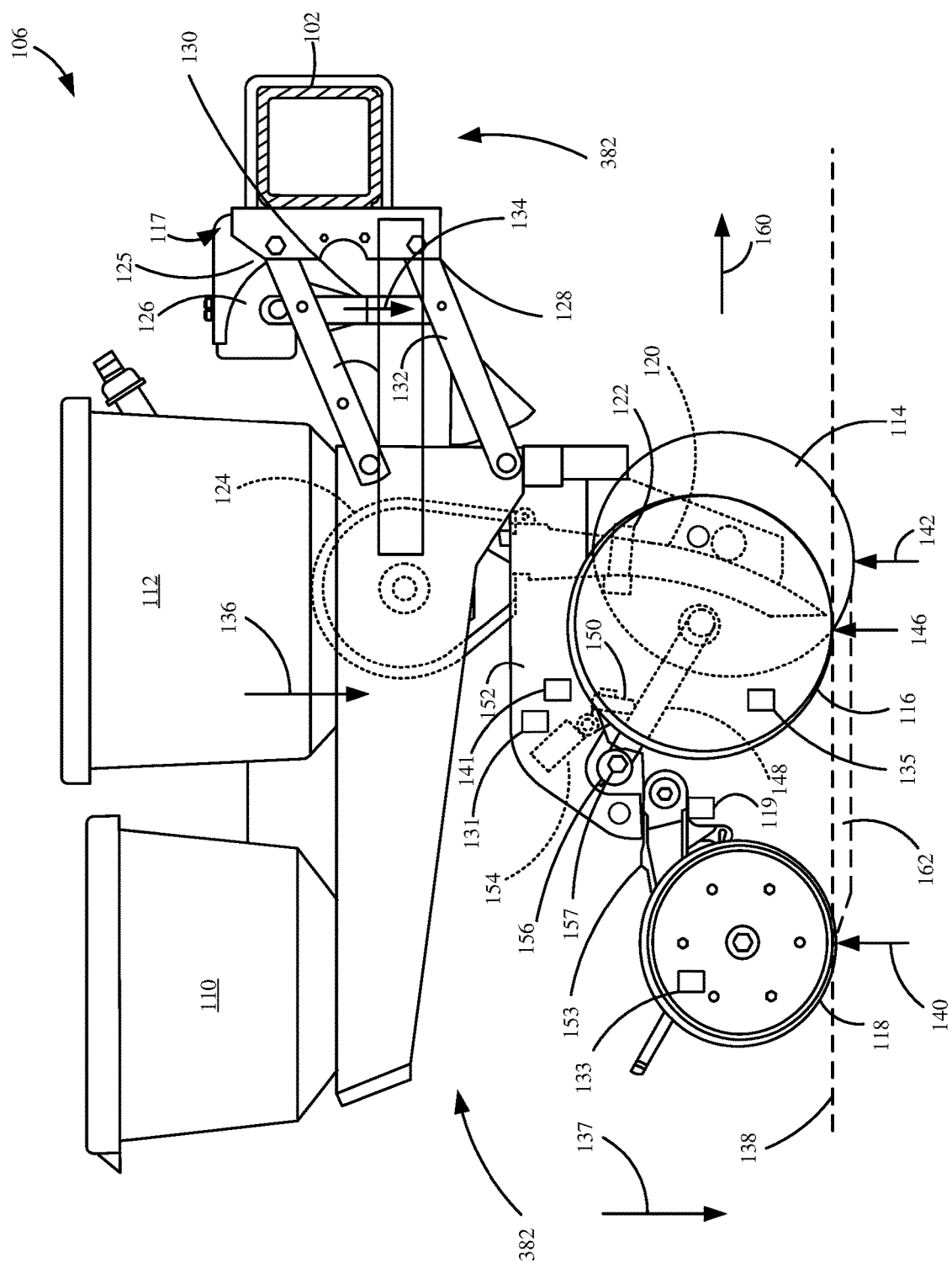
FIG. 2 is a side view showing one example of a row unit of the mobile agricultural machine illustrated in FIG. 1.

FIG. 2 is a side view showing one example of a row unit 106. In the example shown in FIG. 2, row unit 106 illustratively includes a chemical tank 110 and a seed storage tank 112. Row unit 106 also illustratively includes, as ground engaging tools, an opener 114 (e.g., disk opener) that opens a furrow 162, a set of gauge wheels 116, and a closer 118 (e.g., set of closing wheels) that close furrow 162. In other examples, row unit 106 can include various other ground engaging tools, such as a coulter, a residue cleaner, etc. Seeds from tank 112 are fed by gravity into a seed meter 124. The seed meter 124 controls the rate which seeds are dropped into a seed tube 120 or other seed delivery system, such as an actuatable brush belt or flighted brush belt (e.g., assistive seed delivery system) from seed storage tank 112. The seeds can be sensed by a sensor system 119 or sensor 122, or both.

In one example, sensor system 119 is an observation sensor system that includes one or more sensors, such as one or more imaging systems (e.g., stereo or mono cameras), optical sensors, lidar, radar, ultrasonic sensors, as well as various other types of sensors. Sensor system 119 observes the furrow 162 opened by row unit 106 and can detect various characteristics of the furrow 162, as well as characteristics of the seed in the furrow 162.

Some parts of the row unit 106 will now be discussed in more detail. First, it will be noted that there are different types of seed meters 124, and the one that is shown is shown for the sake of example only. For instance, in one example, each row unit 106 need not have its own seed meter. Instead, metering or other singulation or seed dividing techniques can be performed at a central location, for groups of row units 106. The metering systems can include rotatable disks, rotatable concave or bowl-shaped devices, among others. The seed delivery system can be a gravity drop system (such as seed tube 120 shown in FIG. 2) in which seeds are dropped through the seed tube 120 and fall (via gravitational force) through the seed tube and out the outlet end 121 into the furrow (or seed trench) 162. Other types of seed delivery systems are assistive systems, in that they do not simply rely on gravity to move the seed from the metering system into the ground. Instead, such systems actively capture the seeds from the seed meter and physically move the seeds from the meter to a lower opening where the exit into the ground or trench.

A downforce generator or actuator 126 is mounted on a coupling assembly 128 that couples row unit 106 to toolbar 102. Downforce actuator 126 can be a hydraulic actuator, a pneumatic actuator, an electromechanical actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on the row unit 106, and indicated by arrow 136) is offset by upwardly directed forces acting on closer 118 (from ground 138 and indicated by arrow 140) and opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as downforce margin. The force indicated by arrow 146 acts on the gauge wheels 116. This load can be sensed by a gauge wheel load sensor 135 which may located anywhere on row unit 106 where it can sense that load. It can also be placed where it may not sense the load directly, but a characteristic indicative of that load. For example, it can be disposed near a set of gauge wheel control arms (or gauge wheel arm) 148 that movably mount gauge wheels to shank 152 and control an offset between gauge wheels 116 and the disks in double disk opener 114 to control planting depth. Percent ground contact is a measure of a percentage of time that the load (downforce margin) on the gauge wheels 116 is zero (indicating that the gauge wheels are out of contact with the ground). The percent ground contact is calculated on the basis of sensor data provided by the gauge wheel load sensor 135. The gauge wheel load sensor 135 can be placed at any suitable location on row unit 106.

In addition, there may be other separate and controllable downforce actuators, such as one or more of a closing wheel downforce actuator 153 that controls the downforce exerted on closing wheels 118. Closing wheel downforce actuator 153 can be a hydraulic actuator, a pneumatic actuator, an electrical actuator, a spring-based mechanical actuator or a wide variety of other actuators. The downforce exerted by closing wheel downforce actuator 153 is represented by arrow 137.

In the illustrated example, arms (or gauge wheel arms) 148 illustratively abut a mechanical stop (or arm contact member or wedge) 150. The position of mechanical stop 150 relative to shank 152 can be set by a planting depth actuator assembly 154. Planting depth actuator assembly 154 can include a hydraulic actuator, a pneumatic actuator, an electrical actuator, or various other types of controllable actuators. Control arms 148 illustratively pivot around pivot point 156 so that, as planting depth actuator assembly 154 actuates to change the position of mechanical stop 150, the relative position of gauge wheels 116, relative to the double disk opener 114, changes, to change the depth at which seeds are planted. Additionally, row unit 106 can include a depth sensor 157, such a potentiometer, hall effect sensor, or other suitable sensor, that detects a displacement of control arms 148 to indicate the position of gauge wheels 116 and thus the operating depth of double disk opener.

In operation, row unit 106 travels generally in the direction indicated by arrow 160. The opener 114 opens the furrow 162 in the soil 138, and the depth of the furrow 162 is set by planting depth actuator assembly 154, which, itself, controls the offset between the lowest parts of gauge wheels 116 and opener 114. Seeds are dropped through seed tube 120 (or otherwise delivered by a different type of seed delivery system, such as an assistive seed delivery system) into the furrow 162 and closing wheels 118 close the soil.

As the seeds are dropped through seed tube 120, they can be sensed by seed sensor 122. Some examples of seed sensor 122 are an optical sensor or a reflective sensor, and can include a radiation transmitter and a receiver. The transmitter emits electromagnetic radiation and the receiver detects the radiation and generates a signal indicative of the presences or absences of a seed adjacent to the sensor. These are just some examples of seed sensors. Row unit 106 also includes sensor system 119 that can be used in addition to, or instead of, seed sensor 122. Sensor system 119 performs furrow sensing, including in-furrow seed sensing.

In addition to seed sensors, furrow sensors, and observation sensor systems, the individual row units 106 can include a wide variety of different types of in-situ sensors, some examples of which are illustrated in FIG. 2. For instance, row unit 106 can include a ride quality sensor 131, such as an accelerometer that senses acceleration (bouncing) of row unit 106 (or planting implement 101). In the example shown in FIG. 2, accelerometer 131 is shown mounted to shank 152. This is only an example. In other examples, accelerometer 131 can be mounted in other places as well, such as on toolbar 102 or frame 104. In some examples, accelerometer 131 can be a single axis or a multi-axis (e.g., three axis) accelerometer. In some examples, accelerometer 131 is part of an inertial measurement unit which senses, in addition to acceleration of row unit 106, other characteristics such as position and orientation (e.g., pitch, roll, and yaw). For example, in-situ sensors 308 can include machine dynamics sensors 141 that sense machine dynamics characteristics (e.g., pitch, roll, and yaw) of each row unit 106 or of planting implement 101. Machine dynamics sensors 141 can include inertial measurement units, which can include, among other things (e.g., gyroscopes, magnetometers, etc.), an accelerometer, such as accelerometer 131. Thus, while ride quality sensors 131 and machine dynamics sensors 141 are shown as separate, in some examples, ride quality and machine dynamics may be sensed by the same sensor system. Additionally, machine dynamics sensors 141 are shown mounted to shank 152, in other examples, machine dynamics sensors 141 can be mounted in other places as well, such as on toolbar 102 or frame 104.

Row unit 106 can also include one or more closing wheel downforce sensors 133 which can be used to detect force on closing wheels 118.

Mobile agricultural machine 100-1 can include various other types of in-situ sensors 308, which will be described in greater detail in FIG. 6.

Figure 3:
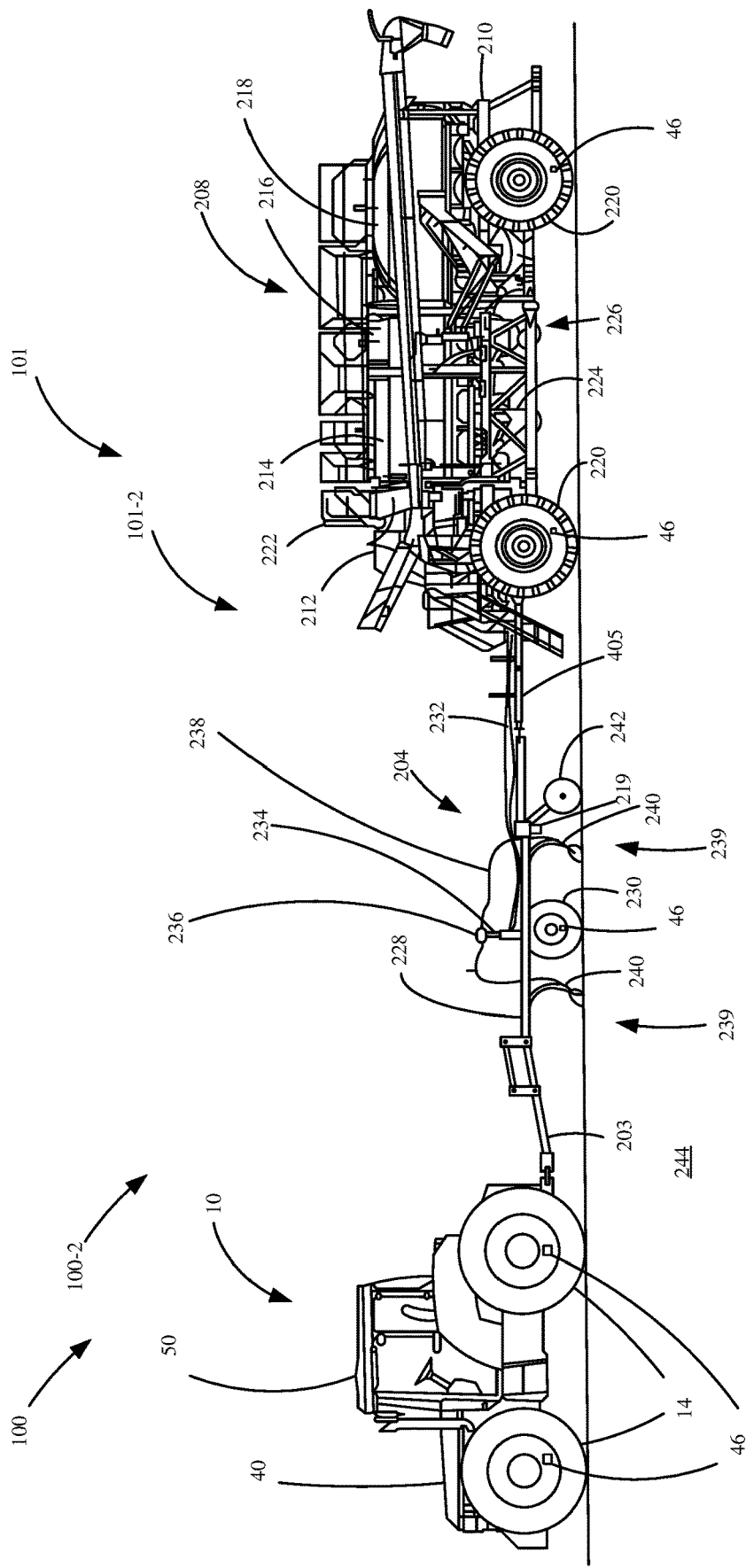
FIG. 3 is a side view showing one example of a mobile agricultural machine

FIG. 3 is a side view showing one example of a mobile agricultural machine 100 as a mobile agricultural planting machine 100-2 that includes, as an implement 101, an agricultural planting implement 101-2, illustratively in the form of an air seeder (e.g., air hoe drill), and a towing vehicle 10. FIG. 3 also illustrates that mobile agricultural planting machine 100-2 can include more in-situ sensors 308 which sense values of various characteristics. In-situ sensors 308 will be discussed in greater detail below. In-situ sensors 308 can be on individual parts of mobile agricultural machine 100, such as on implement 101 or towing vehicle 10, or can be distributed in various ways across both the implement 101 and towing vehicle 10. Towing vehicle 10 can include one or more operator interface mechanisms 318 which can be interactable to manipulate and control mobile agricultural machine 100.

Agricultural planting implement 101-2 is towed by towing vehicle 10, illustratively in the form of a tractor.

Figure 7:
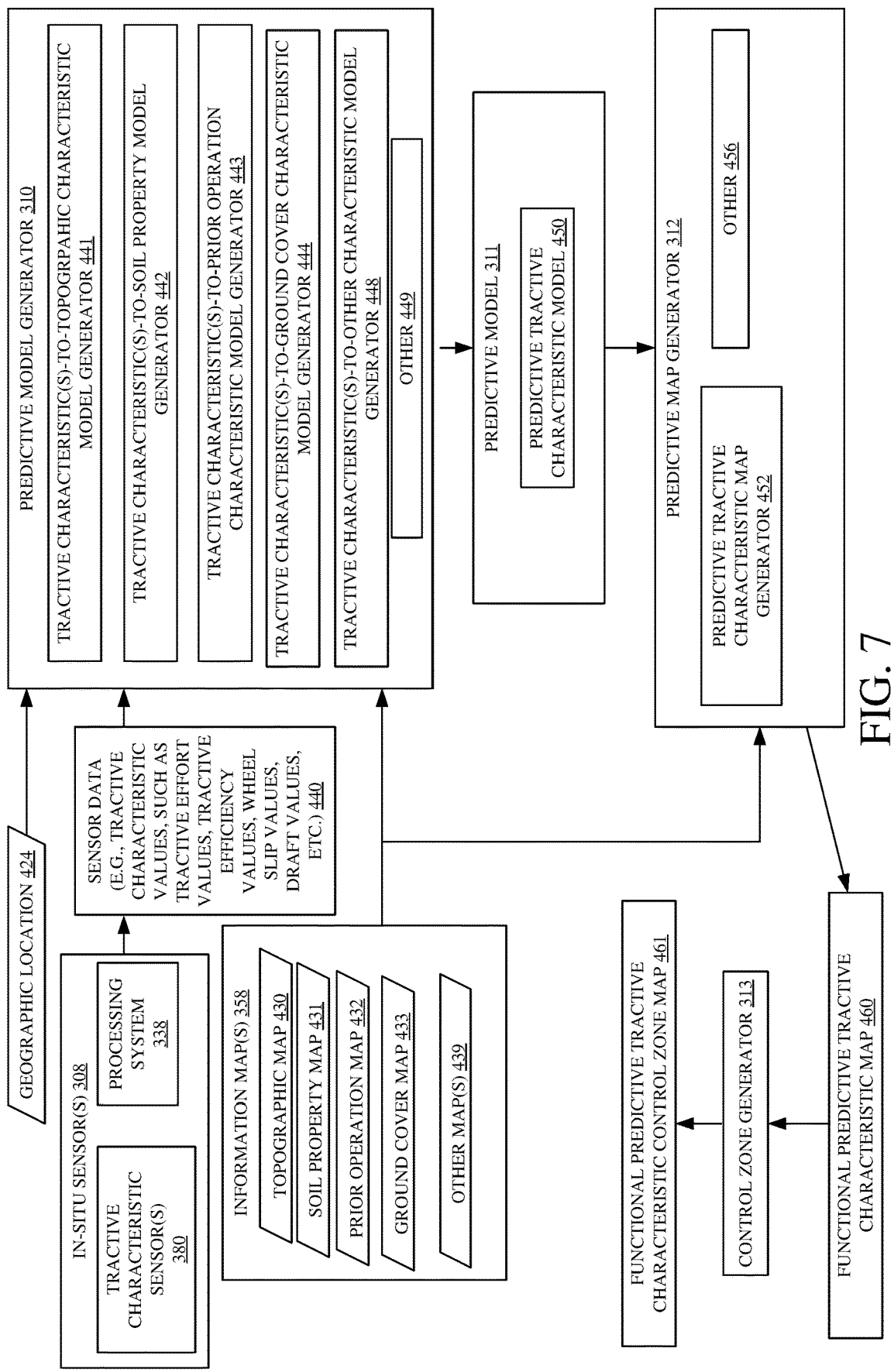
FIG. 7 is a block diagram showing one example of a predictive model generator and predictive map generator.

In the example shown in FIG. 7, the implement 101-2 comprises a tilling implement (or seeding tool) 204 (also sometimes called a drill or a hoe drill) towed between the towing vehicle 10 and a commodity cart 208 (also sometimes called an air cart). The towing vehicle 10 includes a propulsion subsystem 40 which can include various powertrain components, such as a powerplant (e.g., an internal combustion engine or other powerplant) and associated drivetrain components, such as a gear box (or transmission), a transfer case, differential lock, one or more differentials, axels, as well as various other components. Towing vehicle further includes an operator compartment (or cab) 50 and a set of traction elements 14 illustratively in the form of tires (though in other examples, could be in the form of track systems).

The commodity cart 208 has a frame 210 upon which a series of product tanks 212, 214, 216, and 218, and wheels 220 are mounted. Each product tank has a door (a representative door 222 is labeled) releasably sealing an opening at its upper end for filling the tank with product, most usually a commodity of one type or another. A metering system 224 is provided at a lower end of each tank (a representative one of which is labeled) for controlled feeding or draining of product (most typically granular material) into a pneumatic distribution system 226. The tanks 212, 214, 216, and 218 can hold, for example, a material or commodity such as seed or fertilizer, or both, to be distributed to the soil. The tanks can be hoppers, bins, boxes, containers, etc. The term "tank" shall be broadly construed herein. Furthermore, one tank with multiple compartments can also be provided instead of separated tanks.

The tilling implement or seeding tool 204 includes a frame 228 supported by ground wheels 230 which include tires. Tilling implement or seeding tool 204 can include a suspension system (not shown), which can include actuators disposed between frame 228 and wheels 230 to raise and lower wheels 230 relative to frame 228, thus raising and lowering frame 228 relative to the ground. Frame 228 is connected to a leading portion of the commodity cart 208, for example by a tongue style attachment (not labeled). The commodity cart 208 as shown is sometimes called a "tow behind cart," meaning that the cart 208 follows the seeding tool 204. In an alternative arrangement, the cart 208 can be configured as a "tow between cart," meaning the cart 208 is between the towing vehicle 10 and seeding tool 204. In yet a further possible arrangement, the commodity cart 208 and tilling implement or seeding tool 204 can be combined to form a unified rather than separated configuration. These are just examples of additional possible configurations. Other configurations are even possible and all configurations should be considered contemplated and within the scope of the present description.

In the example shown in FIG. 3, towing vehicle 10 is coupled by couplings 203 to seeding tool 204 which is coupled by couplings 205 to commodity cart 408. The couplings 203 and 205 can be mechanical, hydraulic, pneumatic, and electrical couplings and/or other couplings. The couplings 203 and 205 can include wired and wireless couplings as well.

The pneumatic distribution system 226 includes a fan (not shown) connected to a product delivery conduit structure having multiple product flow passages 232. The fan directs air through the flow passages 232. Each product metering system 224 controls delivery of product from its associated tank at a controllable rate to the transporting airstreams moving through flow passages 232. In this manner, each flow passage 232 carries product from the tanks to a secondary distribution tower 234 on the seeding tool 204. Typically, there will be one tower 234 for each flow passage 232. Each tower 234 includes a secondary distributing manifold 236, typically located at the top of a vertical tube.

The distributing manifold 236 divides the flow of product into a number of secondary distribution lines 238. Each secondary distribution line 238 delivers product to one of a plurality of row units 239. Each row unit 239 includes, among other things, as ground engaging tools, ground openers 240 (also known as furrow openers, illustratively in the form of shanks) as well as closing (or packing) wheels 242. An example of a row unit 239 will be shown in greater detail in FIG. 4. The ground opening tools 240 open a furrow in the soil 244 and facilitates deposit of the product therein. The number of flow passages 232 that feed into secondary distribution may vary from one to eight or ten or more, depending at least upon the configuration of the commodity cart 208 and seeing tool 204. Depending upon the cart and seeding tool, there may be two distribution manifolds 236 in the air stream between the meters 224 and the ground opening tools 240. Alternatively, in some configurations, the product is metered directly from the tank or tanks into secondary distribution lines that lead to the ground opening tools 240 without any need for an intermediate distribution manifold. The product metering system 224 can be configured to vary the rate of delivery of seed to each work point on tool 204 or to different sets or zones of work points on tool 204. The configurations described herein are only examples. Other configurations are possible and should be considered contemplated and within the scope of the present description.

A packing or closing wheel 242 is associated with each ground opening tool 240 trails the tool 240 and closes or packs the soil over the product deposited in the soil. The tools 240 are typically moveable between a lowered position engaging the ground and a raised position riding above the ground. Each individual tool 240 may be configured to be raised by a separate actuator. Alternatively, multiple tools 240 may be mounted to a common component for movement together. In yet another alternative, the tools 240 may be fixed to the frame 228, the frame being configured to be raised and lowered with the tools 240, such as by controllable actuation of an actuator that raises and lowers wheels 230.

It should be noted that a mobile agricultural machine 100 can include a variety of in-situ sensors 308, some examples of which are shown in FIG. 3. For example, FIG. 3 shows that mobile agricultural machine 100 can include one or more one or more sensors 46 that sense the movement of traction elements or wheels of mobile machine 100, or the movement of other components of the drivetrain. Sensors 46 can sense the travel speed of mobile agricultural machine 100 over the ground. Machine speed sensors 46 may sense the travel speed of the mobile ground engaging machine 100 by sensing the speed of rotation of the ground engaging elements (such as 14, 230, or 220), a drive shaft, an axel, or other components. In some instances, the travel speed may be sensed using a positioning system, such as geographic position sensors (e.g., 304 shown in FIG. 6), a global positioning system (GPS), a dead reckoning system, a long range navigation (LORAN) system, or a wide variety of other systems or sensors that provide an indication of travel speed. Additionally, in some examples, sensors 46 can detect the angle of ground engaging elements (e.g., 14) to detect the heading of mobile machine 100.

Figure 4:
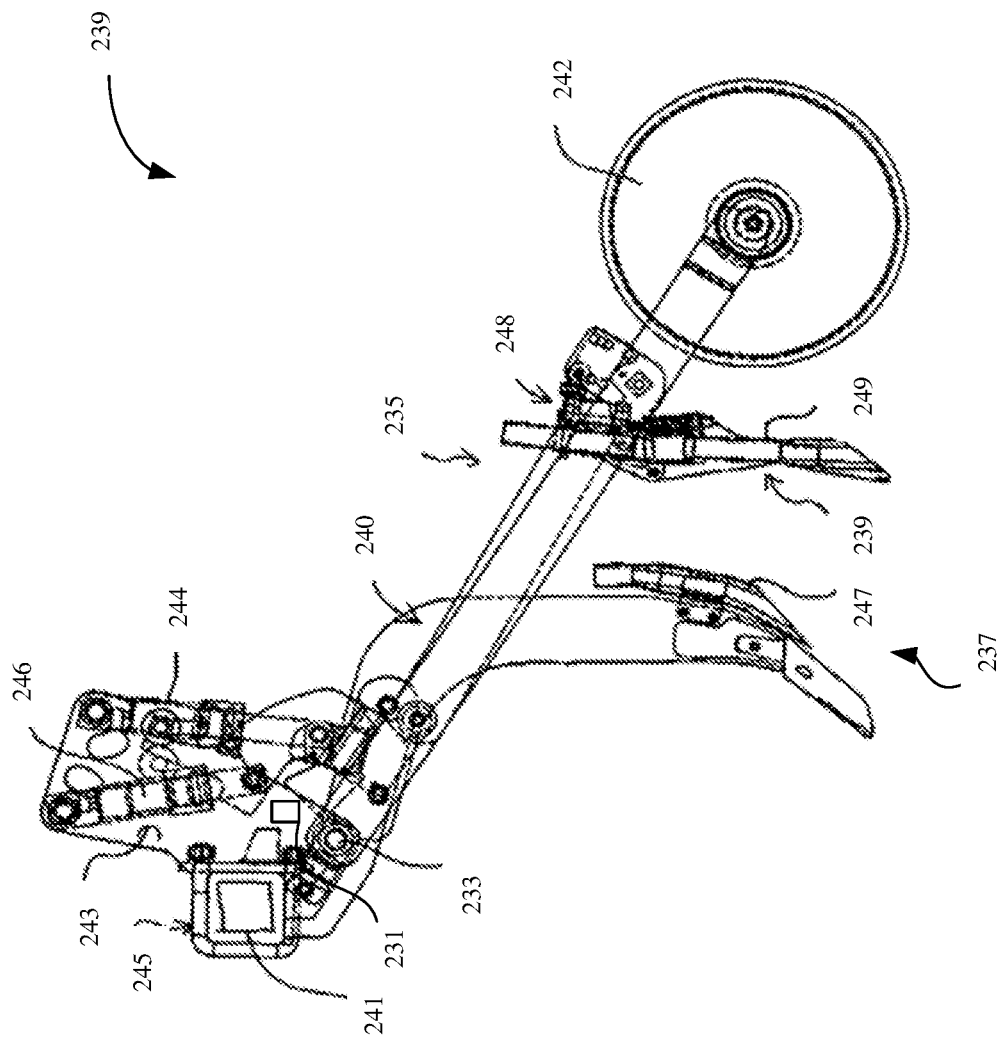
FIG. 4 is a perspective view showing one example of a row unit of the mobile agricultural machine illustrated in FIG. 3.

FIG. 4 is a perspective view showing one example of a row unit 239 in more detail. As illustrated in FIG. 4, row unit 239 include ground opening tool 240 and closing or packing wheel 242. FIG. 8 shows that row unit 239 is coupled to bracket 243 which is coupled to a toolbar 241, by suitable coupling mechanisms 245 (such as U-shaped clamping bolts). Toolbar 241 is attached to (or forms part of) frame 228, and has a longitudinal axis that is transverse to the longitudinal axis of frame 228. Row unit includes a first material delivery member 237 that includes a tube 247 and a second material delivery member 239 that includes a tube 249 and a mounting system 248. In some examples, the tube 247 delivers a first material (such as fertilizer) and the tube 249 delivers a second material (such as seed). The tubes 247 and 249 can be laterally and vertically offset such that the first and second materials are placed at different depths and different lateral positions in the furrow (or trench).

Ground opening tool 240 is pivotally coupled to the bracket 245 at pivot point 233. Closing wheel is coupled to an end of control arm 235. The other end of control arm 235 is pivotally coupled to pivot point 233. A ground opening tool actuator 244 actuates ground opening tool 240 to control a position (e.g., depth) of ground opening tool 240). A closing or packing wheel actuator 246 actuates closing or packing wheel 242 to control a position (e.g., depth) of closing or packing wheel 242.

As illustrated in FIG. 4, row unit 239 can include one or more sensors 231 that sense that displacement of ground opening tool 240 or control arm 235, or both, and thus indicate a working depth of ground opening tool 240 or closing or packing wheel 242, or both.

Figure 5:
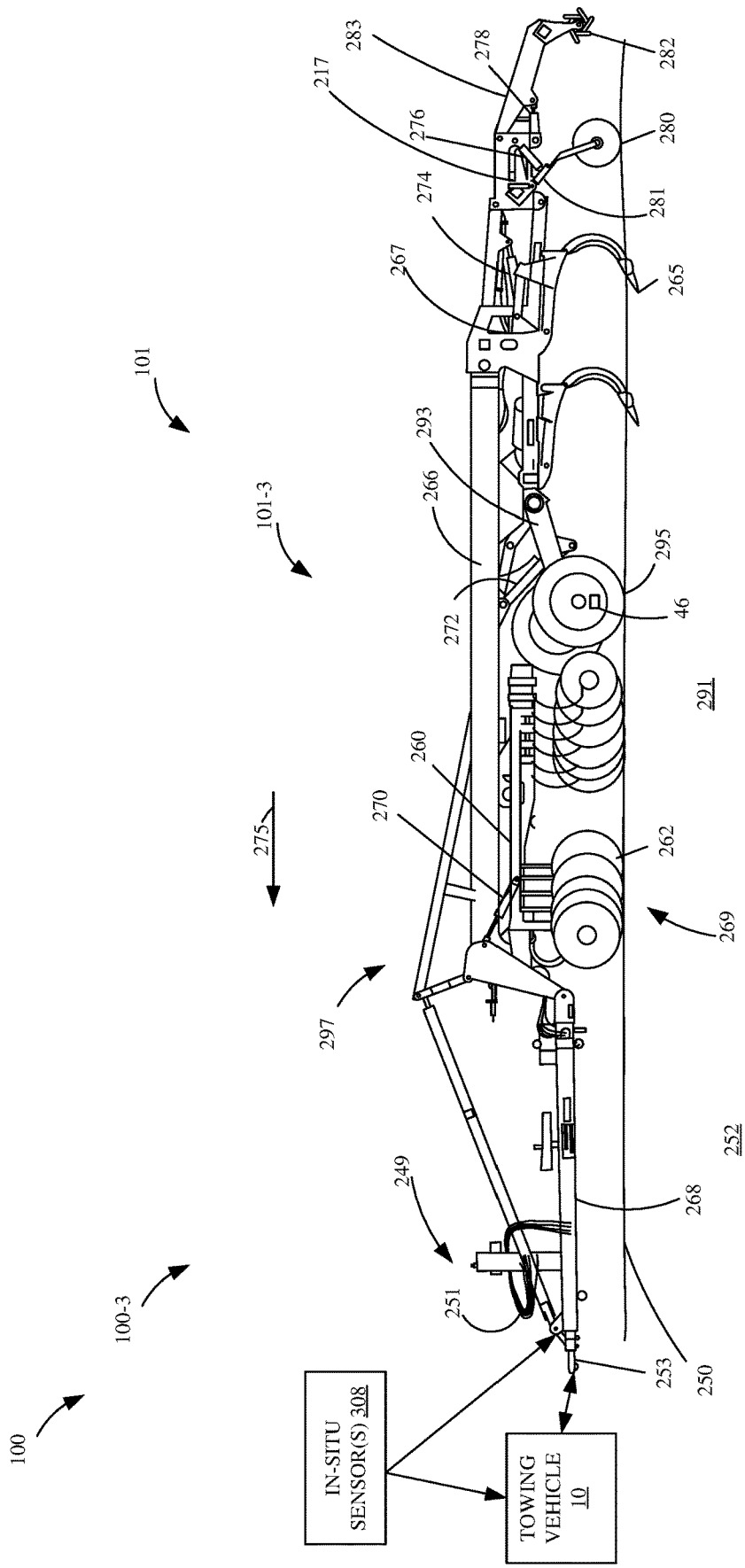
FIG. 5 is a partial side view and partial block diagram showing one example of a mobile agricultural machine.

FIG. 5 is a partial side view, partial block diagram showing one example of a mobile agricultural machine 100 as a mobile agricultural tillage machine 100-3 that includes, as an implement 101, a tillage implement 101-3 and a towing vehicle 10 (e.g., a tractor). FIG. 5 also illustrates that mobile agricultural tillage machine 100-3 can include one or more in-situ sensors 308 which sense values of various characteristics. In-situ sensors 308 will be discussed in greater detail below. In-situ sensors 308 can be on individual parts of mobile agricultural machine 100, such as on implement 101 or towing vehicle 10, or can be distributed in various ways across both the implement 101 and towing vehicle 10. Towing vehicle 10 can include one or more operator interface mechanisms 318 which can be interactable to manipulate and control mobile agricultural machine 100.

As shown tillage implement 101-3 is towed by towing vehicle 10 in the direction indicated by arrow 275 and operates at a field 291. Tillage implement 101-3 includes a plurality of tools that can engage the surface 250 of the ground 291 or penetrate the sub-surface 252 of the ground 292. As illustrated, tillage implement 101-3 may include, as tools, forward disks 262 (which form a disk gang 269), shanks 265, rearward disks 280, and roller basket 282. Alternatively or additionally, tillage implement 101-3 can include various other kinds of tools, such as tines. As illustrated, implement 101-3 may include a connection assembly 249, for coupling to the towing vehicle 10, that includes a mechanical connection mechanism 253 (shown as a hitch) as well as a connection harness 251 which may include a plurality of different connection lines, which may provide, among other things, power, fluid (e.g., hydraulics or air, or both), as well as communication. In some examples, implement 101-3 may include its own power and fluid sources. The connection lines of connection harness 251 may form a conduit for delivering power and/or fluid to the various actuators on implement 101-3.

As illustrated in FIG. 5, implement 101-3 can include a plurality of actuators. Actuators 270 are coupled between subframe 260 and main frame 266 and are controllably actuatable to change a position of the subframe 260 relative to the main frame 266 in order to change a position of the disks 262 relative to the main frame 266.

Actuators 272 are coupled between a wheel frame 293 and main frame 266 and are controllably actuatable to change a position of the wheels 295 relative to the main frame 266 and thus change a distance between main frame 266 and the surface 250 of the field 291. Thus, actuators 272 can be used to control the depth of the various tools of implement 101-3. Additionally, each wheel 295 can include a respective actuator 272 that is separately controllable such that the implement 101-3 can be leveled across its width. For instance, where the ground near a left wheel 295 is lower than the ground by a right wheel, the left wheel can be extended farther, by controllably actuating a respective actuator 272, than the right wheel 295 to level the implement 101-3 across its width. Additionally, a tillage implement 101-3 may include a plurality of wheels 295 across both its width and across its fore-to-aft length such that both side-to-side leveling and fore-to-aft (e.g., front-to-back, or vice versa) leveling can be achieved by variably controlling the separate wheels. These additional wheels can be coupled to the main frame or to subframes such that wing leveling can also occur.

As shown, hinge or pivot assembly 297 allows for movement of main frame 266 relative to hitch frame 268.

Actuators 274 are coupled between tool frame 267 and main frame 266 and are controllably actuatable to change a position of tools 265. While tools 265 are shown as ripper shanks, in other examples a tillage implement 101 may include other tools, alternatively or in addition to ripper shanks 265, such as tines.

Actuators 276 are coupled between tool frame 281 and main frame 266 and are controllably actuatable to change a position of tools 280. While tools 280 are shown as disks, in other examples a tillage implement 101-3 may include other tools, alternatively or in addition to disks 280, such as tines.

Actuators 278 are coupled between tool frame 283 and main frame 266 and are actuatable to change a position of tools 282. Tools 282 are illustratively roller baskets.

It should be noted that a mobile agricultural machine 100 can include a variety of in-situ sensors 308, some examples of which are shown in FIG. 5. For example, FIG. 5 shows that mobile agricultural machine 100 can include one or more one or more sensors 46 that sense the movement of traction elements (e.g., 295 and/or traction elements or wheels of towing vehicle 10) of mobile machine 100, or the movement of other components of the drivetrain. Sensors 46 can sense the travel speed of mobile agricultural machine 100 over the ground. Machine speed sensors may sense the travel speed of the mobile ground engaging machine 100 by sensing the speed of rotation of the ground engaging elements (such as 295 and/or traction elements or wheels of towing vehicle 10), a drive shaft, an axel, or other components. In some instances, the travel speed may be sensed using a positioning system, such as geographic position sensors (e.g., 304 shown in FIG. 6), a global positioning system (GPS), a dead reckoning system, a long range navigation (LORAN) system, or a wide variety of other systems or sensors that provide an indication of travel speed. Additionally, in some examples, sensors 46 can detect the angle of ground engaging elements to detect the heading of mobile machine 100.

Figure 6:
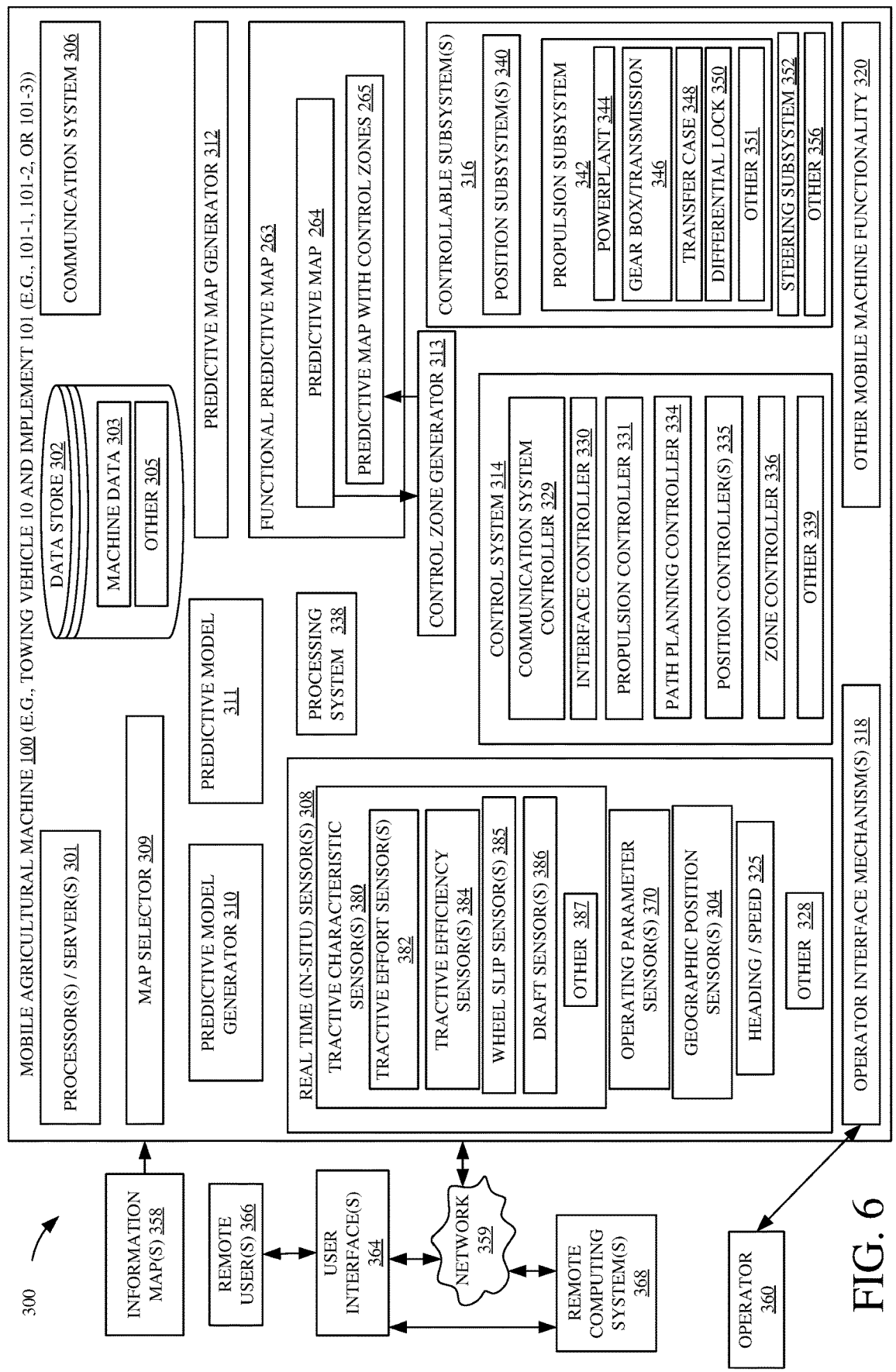
FIG. 6 is a block diagram showing some portions of an agricultural system architecture, including a mobile agricultural machine, in more detail, according to some examples of the present disclosure.

FIG. 6 is a block diagram showing some portions of an agricultural system architecture 300. FIG. 6 shows that agricultural system architecture 300 includes mobile agricultural machine 100 (e.g., 100-1, 100-2, or 100-3), which may include a towing vehicle 10 and implement 101 (e.g., 101-1, 101-2, or 101-3). In other examples, mobile agricultural machine 100 may be a different type of mobile agricultural machine, such as a sprayer, a harvester, as well as various other mobile agricultural machines. Agricultural system 300 also includes one or more remote computing systems 368, one or more remote user interfaces 364, network 359, and one or more information maps 358. Mobile agricultural machine 100, itself, illustratively includes one or more processors or servers 301, data store 302, geographic position sensor 304, communication system 306, one or more in-situ sensors 308 that sense one or more characteristics of at field concurrent with an operation, and a processing system 338 that processes the sensor data (e.g., sensor signals, images, etc.) generated by in-situ sensors 308 to generate processed sensor data. The in-situ sensors 308 generate values corresponding to the sensed characteristics. Mobile machine 100 also includes a predictive model or relationship generator (collectively referred to hereinafter as "predictive model generator 310"), predictive model or relationship (collectively referred to hereinafter as "predictive model 311"), predictive map generator 312, control zone generator 313, control system 314, one or more controllable subsystems 316, and an operator interface mechanism 318. The mobile machine can also include a wide variety of other machine functionality 320.

Data store 302, itself, can include one or more data items, some of which are shown in FIG. 6, such as machine data 303. Machine data 303 can include machine dimensionality data, such as machine (towing vehicle and implement) dimensions (e.g., length, width, height, weight) as well as dimensions of machine components (e.g., traction element dimensions, such as tire or track dimensions). Machine data 303 can include various powertrain data, powertrain ratio, gear ratios or gear reduction, engine speed/torque curves, machine power ratings, as well as various other powertrain data. Data store 302 can include various other data 305.

The in-situ sensors 308 can be on-board mobile machine 100, remote from mobile machine, such as deployed at fixed locations on the worksite or on another machine operating in concert with mobile machine 100, such as an aerial vehicle, and other types of sensors, or a combination thereof. In-situ sensors 308 sense characteristics at the worksite during the course of an operation. In-situ sensors 308 illustratively include tractive characteristic sensors 380, heading/speed sensors 325, geographic position sensors 304, and can include various other sensors 328, such as the various other sensors described in FIGS. 1-5. Tractive characteristic sensors 380 themselves include one or more tractive effort sensors 382, one or more tractive efficiency sensors 384, one or more wheel slip sensors 385, one or more draft sensors 386, and can include various other sensors 387.

Tractive characteristic sensors 380 provide sensor data indicative of tractive characteristics, such as tractive effort, tractive efficiency, wheel slip, draft, as well as various other tractive characteristics.

Tractive effort sensors 382 illustratively detect characteristics, or values, indicative of the tractive effort of mobile machine 100, that is the tractive effort (power) utilized by mobile machine 100 to propel mobile machine 100 across the worksite. Tractive effort of each driven traction element can be expressed as the force (e.g., torque) at the traction element divided by the radius of the traction element. The tractive effort of the mobile machine 100 is the sum of the tractive effort at the traction elements. In some examples, the force (e.g., torque) at each traction element can be sensed directly by force sensors (e.g., torque sensors) at the traction elements. In other examples, the force at each traction element can be estimated based on the output (e.g., torque) of the powerplant 344 and the total ratio of the powertrain (e.g., gear reduction). Tractive effort sensors 382 can include, for example, force sensors (e.g., torque sensors) that sense the force (e.g., torque) at the traction element or force sensors (e.g., torque sensors) that sense the output of powerplant 344. In other examples, such as where a powerplant 344 utilizes electric generator(s) to drive the traction elements, tractive effort sensors 382 can include voltage sensors and amperage sensors (current sensors). In other examples, such as where the powerplant 344 drives fluid pump(s) to drive the traction elements, tractive effort sensors 382 can include pressure sensors or flow sensors. Flow sensors may directly measure material passing through a conduit over a time interval or flow may be derived indirectly from machine data such as, in one example, pump displacement combined with pump speed (which may be detected by pump speed sensors). The total ratio of the powertrain, gear reduction, traction element dimensions, as well as other data can be obtained from machine data 303. Thus, processing system 338 can generate tractive effort values based on the data generated by tractive effort sensors 382 and machine data 303.

Wheel slip sensors 385 illustratively detect characteristics, or values, indicative of wheel slip. Wheel slip is a ratio of the actual travel speed of the machine and the theoretical or expected speed of the machine. Wheel slip is generally expressed as $1-(Va/Vt)$ or $(Vt-Va)/Vt$. Where Va is actual velocity and Vt is theoretical (or expected) velocity. Positive wheel slip can indicate that the wheels are spinning. Negative wheel slip can indicate that the wheels are skidding. In some examples, the movement (e.g., rotation) of the traction element can be sensed or the movement of an associated drivetrain element can be sensed. In other examples, the theoretical or expected speed can be calculated based on the speed of the powerplant 344 and the total powertrain ratio. Thus, wheel slip sensors 385 can include sensors that detect the movement (e.g., rotation) of traction elements, movement (rotation) of an associated drivetrain element, or movement (e.g., rotation) of powerplant 344, some examples of which are Hall effect sensors and variable reluctance sensors. Wheel slip sensors 385 can also include sensors that detect the actual travel speed such as geographic position sensors 304 (e.g., RTK) or other types of sensors, such as radar, lidar, or an accelerometer.

Tractive efficiency sensors 384 illustratively detect characteristics, or values, indicative of the tractive efficiency of mobile machine 100. Tractive efficiency is a ratio of the drawbar power of the machine to the axle power of the machine and can be calculated when wheel slip is known. Drawbar power is the product of the force at the point the implement is attached to the towing vehicle (sometimes referred to as the drawbar pull) and the actual travel speed of the mobile machine. The drawbar pull can, in some examples, be detected by detecting the load at the attachment. This load can be detected by, for example, draft sensors 386, or other type of sensors. The travel speed (actual travel speed) of the mobile machine 100 can be detected based on data from geographic positions sensors 304 (e.g., RTK data) or data from other types of sensors such as radar, lidar, or an accelerometer. Axle power is the product of force at the traction element (e.g., torque) and the speed of the traction element (e.g., rotational speed of the traction element). The force at the traction elements can be, in some examples, sensed directly such as by torque sensors at the traction elements. In other examples, the force at the traction elements can be detected based on the output (e.g., torque) of the powerplant 344 and the total powertrain ratio (e.g., gear ratio of the drive train elements, such as transmission or gear box and differential(s)). The speed of the traction elements can be, in some examples, sensed by sensors that detect the movement (e.g., rotation) of the traction elements or movement of an associated drivetrain element, such as heading/speed sensors 325 or wheel slip sensors 385, or other types of sensors. In other examples, the theoretical or expected speed can be calculated based on the speed of the powerplant 344 and the total powertrain ratio. As can be seen, tractive efficiency of mobile machine 100 can be determined based, at least in part, on the detected wheel slip. Tractive efficiency sensors 384 can include, for example, force sensors (e.g., torque sensors) that sense the force (e.g., torque) at the traction elements or force sensors (e.g., torque sensors) that sense the output of powerplant 344. Tractive efficiency sensors 384 can include actual travel speed sensors (e.g., geographic position sensors, radar, lidar, accelerometer, etc.), traction element movement (rotation) sensors, drivetrain element movement (rotation) sensors, or sensors that sense the speed of powerplant 344. Tractive efficiency sensors 385 can include draft sensors, such as draft sensors 386, as well as various other draft sensors. Thus, while tractive efficiency sensors 384 are shown as separate sensors, in some examples, tractive efficiency is derived from data from other sensors, such as tractive effort sensors 382, wheel slip sensors 385, draft sensors 386, geographic position sensors 304, and/or heading/speed sensors 325 and subsequent processing. In other examples, tractive efficiency sensors 384 are separate sensors and do not utilize data received from other sources. In other examples, such as where a powerplant 344 utilizes electric generator(s) to drive the traction elements, tractive efficiency sensors 384 can include voltage sensors and amperage sensors (current sensors). In other examples, such as where the powerplant 344 drives fluid pump(s) to drive the traction elements, tractive efficiency sensors 384 can include pressure sensors or flow sensors or may derive flow from pump speed in combination with pump displacement (which can be indicated by machine data 303). The total ratio of the powertrain, gear reduction or gear ratio, dimensions of the traction elements, as well as other data can be obtained from machine data 303. Thus, processing system 338 can generate tractive efficiency values based on the data generated by tractive efficiency sensors 384 and, in some examples, machine data 303.

Draft sensors 386 illustratively detect the draft of mobile machine 100, that is, the total force required to pull implement 101. The draft of mobile machine 100 is affected by various factors, such as the dimensions of the implement 101, the operating depth of the implement 101 as well as characteristics of the field (e.g., soil properties, topography, etc.). Draft sensors 386 thus illustratively detect the draft (or draft force) required to pull implement 101 across the worksite. Draft sensors 386 can include load sensors (e.g., load cells, strain gauges, etc.) incorporated into the mechanical linkage (e.g., hitch) of mobile machine 100. Thus, processing system 338 can generate draft values based on sensor data generated by draft sensors 386.

Tractive characteristic sensors 380 can include a variety of other types of sensors 387.

Operating parameter sensors 370 provide sensor data indicative of operating parameters of mobile agricultural machine 100. Operating parameter sensors 370 can detect such parameters as tool positions (e.g., tool depth, tool angle, etc.), applied downforce, as well as various other operating parameters. Operating parameter sensors 370 can include a wide variety of different types of sensors, including, for example, the sensor described above with respect to FIGS. 1-5.

Geographic position sensors 304 illustratively sense or detect the geographic position or location of mobile agricultural machine 100. Geographic position sensors 304 can include, but are not limited to, a global navigation satellite system (GNSS) receiver that receives signals from a GNSS satellite transmitter. Geographic position sensors 304 can also include a real-time kinematic (RTK) component that is configured to enhance the precision of position data derived from the GNSS signal. Geographic position sensors 304 can include a dead reckoning system, a cellular triangulation system, or any of a variety of other geographic position sensors. Geographic positions sensors 304 can be on towing vehicle 10 or planting implement 101, or both.

Heading/speed sensors 325 detect a heading and speed at which mobile machine is traversing the worksite during the operation. This can include sensors that sense the movement of ground-engaging elements (e.g., wheels or tracks of towing vehicle 10 or implement 101, or both) or drivetrain elements, such as sensors 46, or can utilize signals received from other sources, such as geographic position sensor 304. Thus, while heading/speed sensors 325 as described herein are shown as separate from geographic position sensor 304, in some examples, machine heading/speed is derived from signals received from geographic positions sensor 304 and subsequent processing. In other examples, heading/speed sensors 325 are separate sensors and do not utilize signals received from other sources. In some examples, heading/speed sensors 325 can include sensors that detect the movement (e.g., rotation) of traction elements (e.g., wheels or tracks of towing vehicle 10 or implement 101, or both), and other sensors that detect the travel speed of mobile machine 100, such as radar, lidar, as well as other types of sensors.

Other in-situ sensors 328 may be any of the sensors described above with respect to FIGS. 1-5. Other in-situ sensors 328 can be on-board mobile machine 100 or can be remote from mobile machine 100, such as other in-situ sensors 328 on-board another mobile machine that capture in-situ data of characteristics at the field or sensors at fixed locations throughout the field. The remote data from remote sensors can be obtained by mobile machine 100 via communication system 306 over network 359.

In-situ data includes data taken from a sensor on-board the mobile agricultural machine 100 or taken by any sensor where the data are detected during the operation of mobile agricultural machine 100 at a field.

Processing system 338 processes the sensor data (e.g., signals, images, etc.) generated by in-situ sensors 308 to generate processed sensor data indicative of one or more characteristics. For example, processing system generates processed sensor data indicative of characteristic values based on the sensor data generated by in-situ sensors 308, such as tractive characteristic values (e.g., tractive effort values, tractive efficiency values, wheel slip values, draft values, etc.) based on sensor data generated by tractive characteristic sensors 380. Processing system 338 also processes sensor signals generated by other in-situ sensors 308 to generate processed sensor data indicative of other characteristic values, such as operating parameter values based on sensor data generated by operating parameter sensors 370, machine speed characteristic (travel speed, acceleration, deceleration, etc.) values based on sensor data generated by heading/speed sensors 325, machine heading values based on sensor data generated by heading/speed sensors 325, geographic position (or location) values based on sensor data generated by geographic position sensors 304, as well as various other values based on sensors signals generated by various other in-situ sensors 328.

It will be noted that processing system 338, in generating processed sensor data, can also utilize other data, such as machine data 303.

It will be understood that processing system 338 can be implemented by one or more processors or servers, such as processors or servers 301. Additionally, processing system 338 can utilize various sensor signal filtering functionalities, such as noise filtering functionality, sensor signal categorization, aggregation, normalization, as well as various other processing functionalities. Similarly, processing system 338 can utilize various image processing functionalities such as, sequential image comparison, RGB, edge detection, black/white analysis, machine learning, neural networks, pixel testing, pixel clustering, shape detection, as well any number of other suitable image processing and data extraction functionalities.

FIG. 6 also shows remote users 366 interacting with mobile machine 100 or remote computing systems 368, or both, through user interfaces mechanisms 364 over network 359. In some examples, user interface mechanisms 364 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, user 366 may interact with user interface mechanisms 364 using touch gestures. These examples described above are provided as illustrative examples and are not intended to limit the scope of the present disclosure. Consequently, other types of user interface mechanisms 364 may be used and are within the scope of the present disclosure.

Remote computing systems 368 can be a wide variety of different types of systems, or combinations thereof. For example, remote computing systems 368 can be in a remote server environment. Further, remote computing systems 368 can be remote computing systems, such as mobile devices, a remote network, a farm manager system, a vendor system, or a wide variety of other remote systems. In one example, mobile machine 100 can be controlled remotely by remote computing systems or by remote users 366, or both. As will be described below, in some examples, one or more of the components shown being disposed on mobile machine 100 in FIG. 6 can be located elsewhere, such as at remote computing systems 368.

FIG. 6 also shows that an operator 360 may operate mobile machine 100. The operator 360 interacts with operator interface mechanisms 318. In some examples, operator interface mechanisms 318 may include joysticks, levers, a steering wheel, linkages, pedals, buttons, dials, keypads, user actuatable elements (such as icons, buttons, etc.) on a user interface display device, a microphone and speaker (where speech recognition and speech synthesis are provided), among a wide variety of other types of control devices. Where a touch sensitive display system is provided, operator 360 may interact with operator interface mechanisms 318 using touch gestures. In some examples, at least some operator interface mechanisms 318 may be disposed in an operator compartment of mobile machine 100. In some examples, at least some operator interface mechanisms 318 may be remote (or separable) from mobile machine 100 but are in communication therewith. Thus, the operator 360 may be local or remote. These examples described above are provided as illustrative examples and are not intended to limit the scope of the present disclosure. Consequently, other types of operator interface mechanisms 318 may be used and are within the scope of the present disclosure.

FIG. 6 also shows that mobile machine 100 can obtain one or more information maps 358. As described herein, the information maps 358 include, for example, a topographic map, a soil property map, a prior operation map, a ground cover map, as well as various other maps. However, information maps 358 may also encompass other types of data, such as other types of data that were obtained prior to a current operation or a map from a prior operation. In other examples, information maps 358 can be generated during a current operation, such a map generated by predictive map generator 312 based on a predictive model 311 generated by predictive model generator 310.

Information maps 358 may be downloaded onto mobile ground engaging machine 100 over network 359 and stored in data store 302, using communication system 306 or in other ways. In some examples, communication system 306 may be a cellular communication system, a system for communicating over a wide area network or a local area network, a system for communicating over a near field communication network, or a communication system configured to communicate over any of a variety of other networks or combinations of networks. Network 264 illustratively represents any or a combination of any of the variety of networks. Communication system 306 may also include a system that facilitates downloads or transfers of information to and from a secure digital (SD) card or a universal serial bus (USB) card or both.

Predictive model generator 310 generates a predictive model 311 that is indicative of a relationship between the values sensed by the in-situ sensors 308 and values mapped to the field by the information maps 358. For example, if the information map 358 maps topographic values to different locations in the worksite, and the in-situ sensor 308 are sensing values indicative of tractive characteristics, then model generator 310 generates a predictive tractive characteristic model that models the relationship between the topographic values and the tractive characteristic values. In another example, if the information map 358 maps soil property values to different locations in the worksite, and the in-situ sensors 308 are sensing values indicative of tractive characteristics, then model generator 310 generates a predictive tractive characteristic model that models the relationship between the soil property values and the tractive characteristic values. In another example, if the information map 358 maps prior operation characteristic values to different locations in the worksite, and the in-situ sensors 308 are sensing values indicative of tractive characteristics, then model generator 310 generates a predictive tractive characteristic model that models the relationship between the prior operation characteristic values and the tractive characteristic values. In another example, if the information map 358 maps ground cover values to different locations in the worksite, and the in-situ sensors 308 are sensing values indicative of tractive characteristics, then model generator 310 generates a predictive tractive characteristic model that models the relationship between the ground cover values and the tractive characteristic values. These are merely some examples.

In some examples, the predictive map generator 312 uses the predictive models generated by predictive model generator 310 to generate functional predictive maps that predict the value of a characteristic, sensed by the in-situ sensors 308, at different locations in the field based upon one or more of the information maps 358.

For example, where the predictive model is a predictive tractive characteristic model that models a relationship between tractive characteristic values sensed by in-situ sensors 308 and one or more of topographic characteristic values from a topographic map, soil property values from a soil property map, prior operation characteristic values from a prior operation map, ground cover values from a ground cover map, and other characteristic values from an other map, then predictive map generator 312 generates a functional predictive tractive characteristic map that predicts tractive characteristic values at different locations at the worksite based on one or more of the mapped values at those locations and the predictive tractive characteristic model.

In some examples, the type of values in the functional predictive map 263 may be the same as the in-situ data type sensed by the in-situ sensors 308. In some instances, the type of values in the functional predictive map 263 may have different units from the data sensed by the in-situ sensors 308. In some examples, the type of values in the functional predictive map 263 may be different from the data type sensed by the in-situ sensors 308 but have a relationship to the type of data type sensed by the in-situ sensors 308. For example, in some examples, the data type sensed by the in-situ sensors 308 may be indicative of the type of values in the functional predictive map 363. In some examples, the type of data in the functional predictive map 363 may be different than the data type in the information maps 358. In some instances, the type of data in the functional predictive map 263 may have different units from the data in the information maps 358. In some examples, the type of data in the functional predictive map 263 may be different from the data type in the information map 358 but has a relationship to the data type in the information map 358. For example, in some examples, the data type in the information maps 358 may be indicative of the type of data in the functional predictive map 263. In some examples, the type of data in the functional predictive map 263 is different than one of, or both of, the in-situ data type sensed by the in-situ sensors 308 and the data type in the information maps 358. In some examples, the type of data in the functional predictive map 263 is the same as one of, or both of, of the in-situ data type sensed by the in-situ sensors 308 and the data type in information maps 358. In some examples, the type of data in the functional predictive map 263 is the same as one of the in-situ data type sensed by the in-situ sensors 308 or the data type in the information maps 358, and different than the other.

As shown in FIG. 6, predictive map 264 predicts the value of a sensed characteristic (sensed by in-situ sensors 308), or a characteristic related to the sensed characteristic, at various locations across the worksite based upon one or more information values in one or more information maps 358 at those locations and using the predictive model 311. For example, if predictive model generator 310 has generated a predictive model indicative of a relationship between soil property values and tractive characteristic values then, given the soil property value at different locations across the worksite, predictive map generator 312 generates a predictive map that predicts tractive characteristic values at different locations across the worksite. The soil property value, obtained from the soil property map, at those locations and the relationship between soil property values and tractive characteristic values, obtained from the predictive model 311, are used to generate the predictive map 264. This is merely one example.

Some variations in the data types that are mapped in the information maps 358, the data types sensed by in-situ sensors 308, and the data types predicted on the predictive map 264 will now be described.

In some examples, the data type in one or more information maps 358 is different from the data type sensed by in-situ sensors 308, yet the data type in the predictive map 264 is the same as the data type sensed by the in-situ sensors 308. For instance, the information map 358 may be a topographic map, and the variable sensed by the in-situ sensors 308 may be one or more tractive characteristics (e.g., tractive effort, tractive efficiency, wheel slip, draft, etc.). The predictive map 264 may then be a predictive tractive characteristic map that maps predictive tractive characteristic values (e.g., one or more of tractive effort values, tractive efficiency values, wheel slip values, and draft values) to different geographic locations in the in the worksite. This is merely an example.

Also, in some examples, the data type in the information map 358 is different from the data type sensed by in-situ sensors 308, and the data type in the predictive map 264 is different from both the data type in the information map 358 and the data type sensed by the in-situ sensors 308.

In some examples, the information map 358 is from a prior pass through the field during a prior operation and the data type is different from the data type sensed by in-situ sensors 308, yet the data type in the predictive map 264 is the same as the data type sensed by the in-situ sensors 308. For instance, the information map 358 may be a prior operation map generated during a previous operation on the field, and the variable sensed by the in-situ sensors 308 may be one or more tractive characteristics. The predictive map 264 may then be a predictive tractive characteristic map that maps predictive tractive characteristic values to different geographic locations in the field. This is merely one example.

In some examples, the information map 358 is from a prior pass through the field during a prior operation and the data type is the same as the data type sensed by in-situ sensors 308, and the data type in the predictive map 264 is also the same as the data type sensed by the in-situ sensors 308. For instance, the information map 358 may be a tractive characteristic map generated during a previous year or earlier in the same season, and the variable sensed by the in-situ sensors 308 may be one or more tractive characteristics. The predictive map 264 may then be a predictive tractive characteristic map that maps predictive tractive characteristic values to different geographic locations in the field. In such an example, the relative tractive characteristic differences in the georeferenced information map 358 from the prior year or earlier in the same season can be used by predictive model generator 310 to generate a predictive model that models a relationship between the relative tractive characteristic differences on the information map 358 and the tractive characteristic values sensed by in-situ sensors 308 during the current operation. The predictive model is then used by predictive map generator 310 to generate a predictive tractive characteristic map. This is merely one example.

In another example, the information map 358 may be a map, such as ground cover map, generated during a prior operation, and the variable sensed by the in-situ sensors 308 during the current operation may be one or more tractive characteristics. The predictive map 264 may then be a predictive tractive characteristic map that maps predictive tractive characteristic values to different geographic locations in the field. In such an example, a map of the ground cover values at time of the prior operation is geo-referenced, recorded, and provided to mobile machine 100 as an information map 358 of ground cover values. In-situ sensors 308 during a current operation can detect one or more tractive characteristics at geographic locations in the field and predictive model generator 310 may then build a predictive model that models a relationship between the tractive characteristic values at the time of the current operation and ground cover values at the time of the prior operation. This is because the ground cover values at the time of the prior operation are likely to be the same as at the time of the current operation or may be more accurate or otherwise may be more fresh or reliable than ground cover values obtained in other ways. For instance, aerial imaging of the field may not be available or reliable closer in time to the current operation. This is merely one example.

In some examples, predictive map 264 can be provided to the control zone generator 313. Control zone generator 313 groups adjacent portions of an area into one or more control zones based on data values of predictive map 264 that are associated with those adjacent portions. A control zone may include two or more contiguous portions of a worksite, such as a field, for which a control parameter corresponding to the control zone for controlling a controllable subsystem is constant. For example, a response time to alter a setting of controllable subsystems 316 may be inadequate to satisfactorily respond to changes in values contained in a map, such as predictive map 264. In that case, control zone generator 313 parses the map and identifies control zones that are of a defined size to accommodate the response time of the controllable subsystems 316. In another example, control zones may be sized to reduce wear from excessive actuator movement resulting from continuous adjustment. In some examples, there may be a different set of control zones for each controllable subsystem 316 or for groups of controllable subsystems 316. The control zones may be added to the predictive map 264 to obtain predictive control zone map 265. Predictive control zone map 265 can thus be similar to predictive map 264 except that predictive control zone map 265 includes control zone information defining the control zones. Thus, a functional predictive map 263, as described herein, may or may not include control zones. Both predictive map 264 and predictive control zone map 265 are functional predictive maps 263. In one example, a functional predictive map 263 does not include control zones, such as predictive map 264. In another example, a functional predictive map 263 does include control zones, such as predictive control zone map 265.

It will also be appreciated that control zone generator 313 can cluster values to generate control zones and the control zones can be added to predictive control zone map 265, or a separate map, showing only the control zones that are generated. In some examples, the control zones may be used for controlling or calibrating mobile machine 100 or both. In other examples, the control zones may be presented to the operator 360 and used to control or calibrate mobile machine 100, and, in other examples, the control zones may be presented to the operator 360 or another user, such as a remote user 366, or stored for later use.

Predictive map 264 or predictive control zone map 265 or both are provided to control system 314, which generates control signals based upon the predictive map 264 or predictive control zone map 265 or both. In some examples, communication system controller 329 controls communication system 306 to communicate the predictive map 264 or predictive control zone map 265 or control signals (or control values) based on the predictive map 264 or predictive control zone map 265 to other mobile machines (e.g., other mobile ground engaging machines) that are operating at the same worksite or in the same operation. In some examples, communication system controller 329 controls the communication system 306 to send the predictive map 264, predictive control zone map 265, or both to other remote systems, such as remote computing systems 368.

Control system 314 includes communication system controller 329, interface controller 330, propulsion controller 331, path planning controller 334, one or more position controllers 335, zone controller 336, and control system 314 can include other items 339. Controllable subsystems 316 include position subsystem 341, propulsion subsystem 342, steering subsystem 352, and subsystem 316 can include a wide variety of other controllable subsystems 356. Propulsion subsystem 342, itself, includes powerplant 344, gearbox/transmission 346, transfer case 348, differential lock 350, and can include various other items 351.

Interface controller 330 is operable to generate control signals to control interface mechanisms, such as operator interface mechanisms 318 or user interface mechanisms 364, or both. The interface controller 330 is also operable to present the predictive map 264 or predictive control zone map 265 or other information derived from or based on the predictive map 264, predictive control zone map 265, or both, to operator 360 or a remote user 366, or both. Operator 360 may be a local operator or a remote operator. As an example, interface controller 330 generates control signals to control a display mechanism to display one or both of predictive map 264 and predictive control zone map 265 for the operator 360 or a remote user 366, or both. Interface controller 330 may generate operator or user actuatable mechanisms that are displayed and can be actuated by the operator or user to interact with the displayed map. The operator or user can edit the map by, for example, correcting a value displayed on the map, based on the operator's or the user's observation.

Path planning controller 334 illustratively generates control signals to control steering subsystem 352 to steer mobile machine 100 according to a desired path or according to desired parameters, such as desired steering angles based on one or more of the predictive map 264 and the predictive control zone map 265. Path planning controller 334 can control a path planning system to generate a route for mobile machine 100 and can control propulsion subsystem 342 and steering subsystem 352 to steer mobile machine 100 along that route. Steering subsystem can include one or more controllable actuators that are controllable actuatable to control a steering angle of one or more traction elements (e.g., tires or tracks) of mobile machine 100. Path planning controller 334 can generate control signals based on predictive map 264 or predictive control zone map 265, or both. In some examples, based on predictive map 264 or predictive control zone map 265, or both, path planning controller 334 may control steering subsystem 352 to control a route or heading of mobile machine 100, such as to avoid a given location on the field or to head into a given location on the field from a certain direction.

Propulsion controller 331 illustratively generates control signals to control propulsion subsystem 342 to control operating parameters of propulsion subsystem 342. For example, propulsion controller 331 can control powerplant 344 to increase the output of the powerplant 344, such as by controlling the flow of energy, such as fuel (e.g., throttle up or throttle down) or electrical energy (e.g., current) provided to the powerplant 344. Thus, powerplant 344 can be controlled to adjust its output (e.g., power output) such as to controllably increase or decrease the output (e.g., power) of the powerplant 344 such that the powerplant 344 supplies (or provides) more or less output (e.g., power) to components of mobile machine 100. In another example, propulsion controller 331 can control gear box/transmission to control the gear in which mobile machine 100 is in. In some examples, gear box/transmission may include multiple gear sets (e.g., 4 high and 4 low), in which case, propulsion controller 331 can also control which gear set gear box/transmission is in. In another example, propulsion controller 331 may controllably engage or disengage a transfer case 348, such as when mobile machine 100 has part-time 4-wheel drive. Engaging the transfer case 348 engages four-wheel drive by locking front and rear drive shafts together. In another example, propulsion controller 331 may controllably lock or unlock a differential (e.g., a front differential, a center differential, or a rear differential) by actuation of differential lock 350. Mobile machine 100 may have one or more differentials, depending on the drive mode of the mobile machine (e.g., front wheel drive, rear wheel drive, part-time four-wheel drive, all wheel drive). Differentials allow the traction elements (e.g., tires or tracks) to spin at variable speeds. A differential may be locked, by way of differential lock 350, such that the traction elements (e.g., tires or tracks) are forced to spin at the same speed. In the case of front wheel drive, a front differential may be controllably locked and unlocked by a differential lock 350. In the case of rear-wheel drive, a rear differential may be controllably locked and unlocked by a differential lock 350. In the case of part-time four-wheel drive or all-wheel drive, a center differential may be controllable locked and unlocked by a differential lock 350. Propulsion controller 331 can also illustratively generate control signals to control a speed characteristic of mobile machine 100, such as one or more of travel speed, acceleration, and deceleration. It will be understood that propulsion subsystem 342 may include a powerplant 344, such as an internal combustion engine or electrical generator(s), or both, as well as various other items 351, such as energy sources, (e.g., fuel supply or battery supply, or both), various motors which may be driven by the powerplant, such as electric motor or hydraulic motors (in which case, propulsion subsystem 342 may also include one or more hydraulic pumps that drive the hydraulic motors), as well as various other items. The powerplant 344 can be controlled by propulsion controller 331 to also adjust operating parameters of the other components, such as the electric motors or hydraulic motors (e.g., by adjusting operating parameters of the hydraulic pumps), etc.

Propulsion controller 331 can generate control signals based on predictive map 264 or predictive control zone map 265, or both.

Position controllers 335 illustratively generate control signals to control positions (e.g., height, depth, angle, etc.) of one or more components of machine 100, such as a frame, a tool or tool assembly. For example, the position controllers 335 can generate control signals to control position subsystems 343 to control operation of the position subsystems 343 and thus an operating height, depth or operating angle, of one or more components of mobile machine 100, such as a frame, a tool, or a tool assembly of implement 101. The position subsystems 341 may include various actuators that actuate to control a position of a component of implement 101. Some examples of these actuators are shown in previous FIGS., such as actuators 113, 153, 154, 244, 246, 270, 272, 274, 276, and 278). Some of these actuators have not been previously shown, such as actuators that actuate wheels of implement 101, such as wheels 230. Additionally, some example mobile machines 100 may have front attachments, for example, a mobile machine 100 in the form of a harvester (e.g., combine harvester, self-propelled windrower, etc.). In such an example, position subsystems 341 may include actuators that are controllable to alter the position of the front attachment (e.g., header) relative to the ground. For example, the front attachment may be raised to reduce its engagement with the ground or to take it out of engagement with the ground. In some examples, the actuators that control the position of the front attachment may also include a float circuit, which may include one or more accumulators, for example. The float pressure can be adjusted to reduce the engagement of the attachment with the ground or to take the attachment out of engagement with the ground. The various actuators can be hydraulic actuators, pneumatic actuators, electromechanical actuators, as well as various other types of actuators. In addition, position subsystems 343 can include delivery systems (e.g., fluid, such as hydraulic or air, delivery systems, power deliver systems, etc.), conduits, valves, pumps, motors, and various other items. Position controllers 335 can thus generate control signals to control a position of one or more components of mobile machine 100. Position controllers 335 can generate control signals to control position subsystems 340 based on one or more of the predictive map 264 and the predictive control zone map 265. As an example, based on based on predictive map 264 or predictive control zone map 265, or both, position controllers 335 may generate control signals to reduce an operating depth of implement 101 (or of one or more components of implements 100) to reduce a draft (or draft force).

Zone controller 336 illustratively generates control signals to control one or more controllable subsystems 316 to control operation of the one or more controllable subsystems 316 based on the predictive control zone map 265.

Other controllers 339 included on the mobile machine 100, or at other locations in agricultural system 300, can control other subsystems 316 based on the predictive map 264 or predictive control zone map 265 or both as well.

While the illustrated example of FIG. 6 shows that various components of agricultural system architecture 300 are located on mobile agricultural machine 100, it will be understood that in other examples one or more of the components illustrated on mobile agricultural machine 100 in FIG. 6 can be located at other locations, such as one or more remote computing systems 368. For instance, one or more of data stores 302, map selector 309, predictive model generator 310, predictive model 311, predictive map generator 312, functional predictive maps 263 (e.g., 264 and 265), control zone generator 313, and control system 314 can be located remotely from mobile machine 100 but can communicate with (or be communicated to) mobile machine 100 via communication system 306 and network 359. Thus, the predictive models 311 and functional predictive maps 263 may be generated at remote locations away from mobile machine 100 and communicated to mobile machine 100 over network 302, for instance, communication system 306 can download the predictive models 311 and functional predictive maps 263 from the remote locations and store them in data store 302. In other examples, mobile machine 100 may access the predictive models 311 and functional predictive maps 263 at the remote locations without downloading the predictive models 311 and functional predictive maps 263. The information used in the generation of the predictive models 311 and functional predictive maps 263 may be provided to the predictive model generator 310 and the predictive map generator 312 at those remote locations over network 359, for example in-situ sensor data generator by in-situ sensors 308 can be provided over network 359 to the remote locations. Similarly, information maps 358 can be provided to the remote locations.

In some examples, control system 314 may remain local to mobile machine 100, and a remote system (e.g., 368 or 364) may be provided with functionality (e.g., such as a control signal generator) that communicates control commands to mobile machine 100 that are used by control system 314 for the control of mobile agricultural machine 100.

Similarly, where various components are located remotely from mobile machine 100, those components can receive data from components of mobile machine 100 over network 359. For example, where predictive model generator 310 and predictive map generator 312 are located remotely from mobile machine 100, such as at remote computing systems 368, data generated by in-situ sensors 308 and geographic position sensors 304, for instance, can be communicated to the remote computing systems 368 over network 359. Additionally, information maps 358 can be obtained by remote computing systems 368 over network 359 or over another network.

FIG. 7 is a block diagram of a portion of the agricultural ground engaging system architecture 300 shown in FIG. 6. Particularly, FIG. 7 shows, among other things, examples of the predictive model generator 310 and the predictive map generator 312 in more detail. FIG. 7 also illustrates information flow among the various components shown. The predictive model generator 310 receives one or more of a topographic map 430, a soil property map 431, a prior operation map 432, a ground cover map 433, and another type of map 439. Predictive model generator 310 also receives geographic location information 424, or an indication of geographic location(s), such as from geographic position sensor 304. Geographic location information 424 illustratively represents the geographic location of a value detected by in-situ sensors 308. In some examples, the geographic position of the mobile machine 100, as detected by geographic position sensors 304, will not be the same as the geographic position on the field to which a value detected by in-situ sensors 308 corresponds. It will be appreciated, that the geographic position indicated by geographic position sensor 304, along with timing, machine speed and heading, machine dimensions, sensor position (e.g., relative to geographic position sensor), sensor parameters, as well as various other data, can be used to derive a geographic location at the field to which a value a detected by an in-situ sensor 308 corresponds.

In-situ sensors 308 illustratively include tractive characteristic sensors 380, as well as processing system 338. In some examples, processing system 338 is separate from in-situ sensors 308 (such as the example shown in FIG. 6). In some instances, tractive characteristic sensors 380 may be located on-board mobile agricultural machine 100. The processing system 338 processes sensor data generated from tractive characteristic sensors 380 to generate processed sensor data 440 indicative of tractive characteristic values. The tractive characteristic values may include one or more of tractive effort values, tractive efficiency values, wheel slip values, and draft values.

As shown in FIG. 7, the example predictive model generator 310 includes a tractive characteristic(s)-to-topographic characteristic model generator 441, a tractive characteristic(s)-to-soil property model generator 442, a tractive characteristic(s)-to-prior operation characteristic model generator 443, a tractive characteristic(s)-to-ground cover model generator 444, and a tractive characteristic(s)-to-other characteristic model generator 448. In other examples, the predictive model generator 310 may include additional, fewer, or different components than those shown in the example of FIG. 7. Consequently, in some examples, the predictive model generator 310 may include other items 449 as well, which may include other types of predictive model generators to generate other types of tractive characteristic models.

Tractive characteristic(s)-to-topographic characteristic model generator 441 identifies a relationship between tractive characteristic value(s) detected in in-situ sensor data 440, at geographic location(s) to which the tractive characteristic value(s), detected in the in-situ sensor data 440, correspond, and topographic characteristic value(s) from the topographic map 430 corresponding to the same geographic location(s) to which the detected tractive characteristic value(s) correspond. Based on this relationship established by tractive characteristic(s)-to-topographic characteristic model generator 441, tractive characteristic(s)-to-topographic characteristic model generator 441 generates a predictive tractive characteristic model. The predictive tractive characteristic model is used by predictive tractive characteristic map generator 452 to predict one or more tractive characteristics (e.g., one or more of tractive effort, tractive efficiency, wheel slip, and draft) at different locations in the field based upon the georeferenced topographic characteristic values contained in the topographic map 430 at the same locations in the field. Thus, for a given location in the field, a value of one or more tractive characteristics can be predicted at the given location based on the predictive tractive characteristic model and the topographic characteristic value, from the topographic map 430, at that given location.

Tractive characteristic(s)-to-soil property model generator 442 identifies a relationship between tractive characteristic value(s) detected in in-situ sensor data 440, at geographic location(s) to which the tractive characteristic value(s), detected in the in-situ sensor data 440, correspond, and soil property value(s) from the soil property map 431 corresponding to the same geographic location(s) to which the detected tractive characteristic value(s) correspond. Based on this relationship established by tractive characteristic(s)-to-soil property model generator 442, tractive characteristic(s)-to-soil property model generator 442 generates a predictive tractive characteristic model. The predictive tractive characteristic model is used by predictive tractive characteristic map generator 452 to predict one or more tractive characteristics (e.g., one or more of tractive effort, tractive efficiency, wheel slip, and draft) at different locations in the field based upon the georeferenced soil property values contained in the soil property map 431 at the same locations in the field. Thus, for a given location in the field, a value of one or more tractive characteristics can be predicted at the given location based on the predictive tractive characteristic model and the soil property value, from the soil property map 431, at that given location.

Tractive characteristic(s)-to-prior operation characteristic model generator 443 identifies a relationship between tractive characteristic value(s) detected in in-situ sensor data 440, at geographic location(s) to which the tractive characteristic value(s), detected in the in-situ sensor data 440, correspond, and prior operation characteristic value(s) from the prior operation map 432 corresponding to the same geographic location(s) to which the detected tractive characteristic value(s) correspond. Based on this relationship established by tractive characteristic(s)-to-prior operation characteristic model generator 443, tractive characteristic(s)-to-prior operation characteristic model generator 443 generates a predictive tractive characteristic model. The predictive tractive characteristic model is used by predictive tractive characteristic map generator 452 to predict one or more tractive characteristics (e.g., one or more of tractive effort, tractive efficiency, wheel slip, and draft) at different locations in the field based upon the georeferenced prior operation characteristic values contained in the prior operation map 432 at the same locations in the field. Thus, for a given location in the field, a value of one or more tractive characteristics can be predicted at the given location based on the predictive tractive characteristic model and the prior operation characteristic value, from the prior operation map 432, at that given location.

Tractive characteristic(s)-to-ground cover model generator 444 identifies a relationship between tractive characteristic value(s) detected in in-situ sensor data 440, at geographic location(s) to which the tractive characteristic value(s), detected in the in-situ sensor data 440, correspond, and ground cover value(s) from the ground cover map 433 corresponding to the same geographic location(s) to which the detected tractive characteristic value(s) correspond. Based on this relationship established by tractive characteristic(s)-to-ground cover model generator 444, tractive characteristic(s)-to-ground cover model generator 444 generates a predictive tractive characteristic model. The predictive tractive characteristic model is used by predictive tractive characteristic map generator 452 to predict one or more tractive characteristics (e.g., one or more of tractive effort, tractive efficiency, wheel slip, and draft) at different locations in the field based upon the georeferenced ground cover values contained in the ground cover map 433 at the same locations in the field. Thus, for a given location in the field, a value of one or more tractive characteristics can be predicted at the given location based on the predictive tractive characteristic model and the ground cover value, from the ground cover map 433, at that given location.

Tractive characteristic(s)-to-other characteristic model generator 448 identifies a relationship between tractive characteristic value(s) detected in in-situ sensor data 440, at geographic location(s) to which the tractive characteristic value(s), detected in the in-situ sensor data 440, correspond, and other characteristic value(s) from an other map 439 corresponding to the same geographic location(s) to which the detected tractive characteristic value(s) correspond. Based on this relationship established by tractive characteristic(s)-to-other characteristic model generator 448, tractive characteristic(s)-to-other characteristic model generator 448 generates a predictive tractive characteristic model. The predictive tractive characteristic model is used by predictive tractive characteristic map generator 452 to predict one or more tractive characteristics (e.g., one or more of tractive effort, tractive efficiency, wheel slip, and draft) at different locations in the field based upon the georeferenced other characteristic values contained in the other map 439 at the same locations in the field. Thus, for a given location in the field, a value of one or more tractive characteristics can be predicted at the given location based on the predictive tractive characteristic model and the other characteristic value, from the other map 439, at that given location.

In light of the above, the predictive model generator 310 is operable to produce a plurality of predictive tractive characteristic models, such as one or more of the predictive tractive characteristic models generated by model generators 441, 442, 443, 444, 448, and 449. In another example, two or more of the predictive models described above may be combined into a single predictive tractive characteristic model, such as a predictive tractive characteristic model that predicts one or more tractive characteristics based upon two or more of the topographic values, the soil property values, the prior operation characteristic values, the ground cover values, and the other characteristic values at different locations in the field. Any of these tractive characteristic models, or combinations thereof, are represented collectively by predictive tractive characteristic model 450 in FIG. 7.

The predictive tractive characteristic model 450 is provided to predictive map generator 312. In the example of FIG. 7, predictive map generator 312 includes a predictive tractive characteristic map generator 452. In other examples, predictive map generator 312 may include additional or different map generators. Thus, in some examples, predictive map generator 312 may include other items 456 which may include other types of map generators to generate other types of maps.

Predictive tractive characteristic map generator 452 receives one or more of the topographic map 430, the soil property map 431, the prior operation map 432, the ground cover map 433, and an other map 439, along with the predictive tractive characteristic model 450 which predicts one or more tractive characteristics based upon one or more of a topographic value, a soil property value, a prior operation characteristic value, a ground cover value, and an other characteristic value, and generates a predictive map that predicts one or more tractive characteristics at different locations in the field, such as functional predictive tractive characteristic map 460.

Predictive map generator 312 outputs a functional predictive tractive characteristic map 460 that is predictive of one or more tractive characteristics (e.g., one or more of tractive effort, tractive efficiency, wheel slip, and draft). The functional predictive tractive characteristic map 460 is a predictive map 264. The functional predictive tractive characteristic map 460 predicts one or more tractive characteristics at different locations in a field. The functional predictive tractive characteristic map 460 may be provided to control zone generator 313, control system 314, or both. Control zone generator 313 generates control zones and incorporates those control zones into the functional predictive tractive characteristic map 460 to produce a predictive control zone map 265, that is a functional predictive tractive characteristic control zone map 461. One or both of functional predictive tractive characteristic map 460 and functional predictive tractive characteristic control zone map 461 may be provided to control system 314, which generates control signals to control one or more of the controllable subsystems 316 based upon the functional predictive tractive characteristic map 460, the functional predictive tractive characteristic control zone map 461, or both.

Figure 8A:
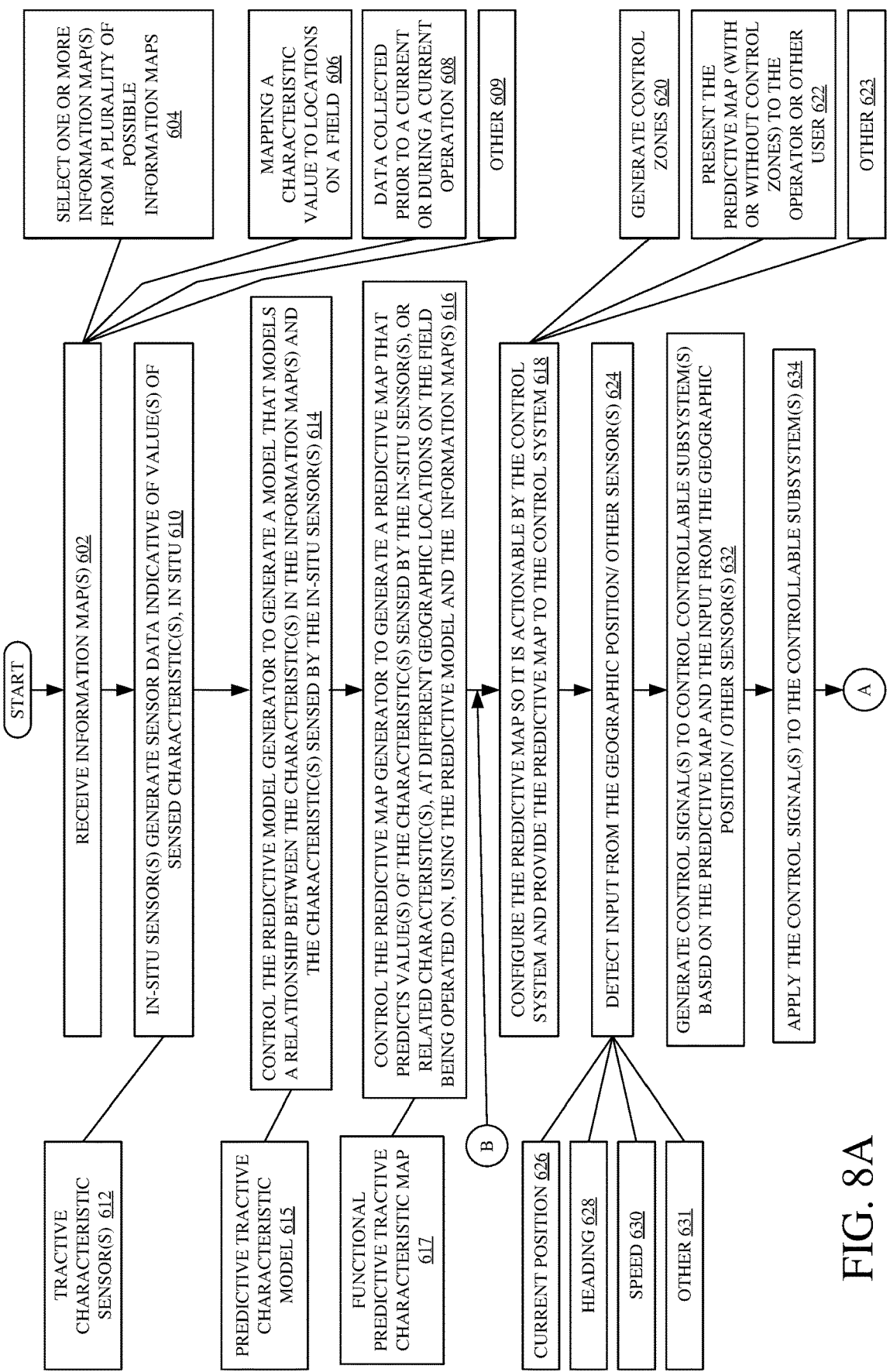
FIGS. 8A-8B (collectively referred to herein as FIG. 8) show a flow diagram illustrating one example of operation of an agricultural system architecture in generating a map.
Figure 8B:
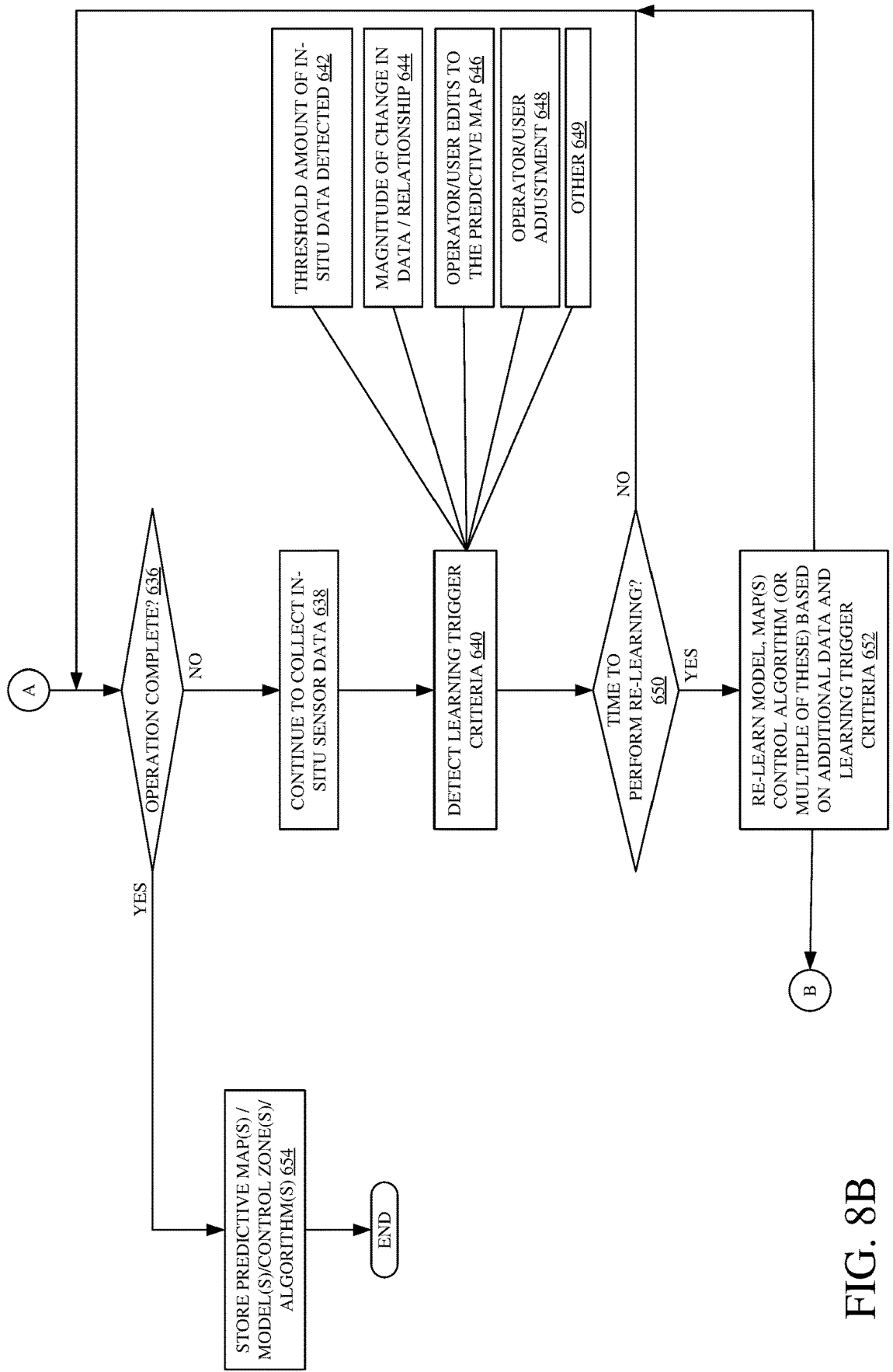

FIGS. 8A-8B (collectively referred to herein as FIG. 8) show a flow diagram illustrating one example of the operation of agricultural system architecture 300 in generating a predictive model and a predictive map.

At block 602, agricultural system 300 receives one or more information maps 358. Examples of information maps 358 or receiving information maps 358 are discussed with respect to blocks 604, 606, 608, and 609. As discussed above, information maps 358 map values of a variable, corresponding to a characteristic, to different locations in the field, as indicated at block 606. As indicated at block 604, receiving the information maps 358 may involve selecting one or more of a plurality of possible information maps 358 that are available. For instance, one information map 358 may be a topographic map, such as topographic map 430. Another information map 358 may be a soil property map, such as soil property map 431. Another information map 358 may be a prior operation map, such as prior operation map 432. Another information map 358 may be a ground cover map, such as ground cover map 433. Information maps 358 may include various other types of maps that map various other characteristics, such as other maps 439.

The process by which one or more information maps 358 are selected can be manual, semi-automated, or automated. The information maps 358 can be based on data collected prior to a current operation or based on data collected during a current operation as indicated by block 608. For instance, the data may be collected based on aerial images taken during a previous year, or earlier in the current season, or at other times. The data may be based on data detected in ways other than using aerial images. For instance, the data may be collected during a previous operation on the worksite, such an operation during a previous year, or a previous operation earlier in the current season, or at other times. The machines performing those previous operations may be outfitted with one or more sensors that generate sensor data indicative of one or more characteristics. For example, the sensed characteristics (e.g., characteristics of the field, characteristics of the vegetation, characteristics of the environment, operating parameters, etc.) during a previous operation be used as data to generate the information maps 358. In other examples, and as described above, the information maps 358 may be predictive maps having predictive values. The predictive information map 358 can be generated by predictive map generator 312 based on a model generated by predictive model generator 310. The data for the information maps 358 can be obtained by agricultural system 300 using communication system 306 and stored in data store 302. The data for the information maps 358 can be obtained by agricultural system 300 using communication system 306 in other ways as well, and this is indicated by block 609 in the flow diagram of FIG. 8.

As mobile agricultural machine 100 is operating, in-situ sensors 308 generate sensor data (e.g., signals, images, etc.) indicative of one or more in-situ data values indicative of a characteristic, as indicated by block 610. For example, tractive characteristic sensors 380 generate sensor data indicative of one or more in-situ data values indicative of one or more tractive characteristics (e.g., one or more of tractive effort values, tractive efficiency values, wheel slip values, draft values, etc.), as indicated by block 611. In some examples, data from in-situ sensors 308 is georeferenced using position, heading, or speed data, as well as machine dimension information, sensor position information, sensor parameter information, etc.

At block 614, predictive model generator 310 controls one or more of the model generators 441, 442, 443, 444, 448, and 449 to generate a model that models the relationship between the mapped values, such as the topographic characteristic values, the soil property values, the prior operation characteristic values, the ground cover values, and the other characteristic values contained in the respective information map and the tractive characteristic values (e.g., one or more of tractive effort values, tractive efficiency values, wheel slip values, draft values, and other tractive characteristic values) sensed by the in-situ sensors 308. Predictive model generator 310 generates a predictive tractive characteristic model 450 that predicts tractive characteristic values (e.g., one or more of tractive effort values, tractive efficiency values, wheel slip values, draft values, and other tractive characteristic values) based on one or more of topographic characteristic values, soil property values, prior operation characteristic values, ground cover values, and other characteristic values, as indicated by block 615.

At block 616, the relationship(s) or model(s) generated by predictive model generator 310 is provided to predictive map generator 312. Predictive map generator 312 generates a functional predictive tractive characteristic map 460 that predicts values of one or more tractive characteristics (or sensor values indicative of tractive characteristic(s)) at different geographic locations in a field at which mobile agricultural machine 100 is operating using the predictive tractive characteristic model 450 and one or more of the information maps 358, such as topographic map 430, soil property map 431, prior operation map 432, ground cover map 433, and an other map 439.

It should be noted that, in some examples, the functional predictive tractive characteristic map 460 may include two or more different map layers. Each map layer may represent a different data type, for instance, a functional predictive tractive characteristic map 460 that provides two or more of a map layer that provides predictive tractive characteristic(s) based on topographic characteristic values from topographic map 430, a map layer that provides predictive tractive characteristic(s) based on soil property values from soil property map 431, a map layer that provides predictive tractive characteristic(s) based on prior operation characteristic values from prior operation map 432, a map layer that provides predictive tractive characteristic(s) based on ground cover values from ground cover map 433, and a map layer that provides predictive tractive characteristic(s) based on other characteristic values from an other map 439. Additionally, or alternatively, functional predictive tractive characteristic map 460 can include a map layer that provides predictive tractive characteristic(s) based on two or more of topographic characteristic values from topographic map 430, soil property value from soil property map 431, prior operation characteristic values from prior operation map 432, ground cover values from ground cover map 433, and other characteristic values from an other map 439.

Providing a predictive tractive characteristic map, such as functional predictive tractive characteristic map 460 is indicated by block 617.

At block 618, predictive map generator 312 configures the functional predictive tractive characteristic map 460 so that the functional predictive tractive characteristic map 460 is actionable (or consumable) by control system 314. Predictive map generator 312 can provide the functional predictive tractive characteristic map 460 to the control system 314 or to control zone generator 313, or both. Some examples of the different ways in which the functional predictive tractive characteristic map 460 can be configured or output are described with respect to blocks 618, 620, 622, and 623. For instance, predictive map generator 312 configures functional predictive tractive characteristic map 460 so that functional predictive tractive characteristic map 460 includes values that can be read by control system 314 and used as the basis for generating control signals for one or more of the different controllable subsystems 316 of mobile agricultural machine 100, as indicated by block 618.

At block 620, control zone generator 313 can divide the functional predictive tractive characteristic map 460 into control zones based on the values on the functional predictive tractive characteristic map 460 to generate functional predictive tractive characteristic control zone map 461. Contiguously-geolocated values that are within a threshold value of one another can be grouped into a control zone. The threshold value can be a default threshold value, or the threshold value can be set based on an operator or user input, based on an input from an automated system, or based on other criteria. A size of the zones may be based on a responsiveness of the control system 314, the controllable subsystems 316, based on wear considerations, or on other criteria.

At block 622, predictive map generator 312 configures functional predictive tractive characteristic map 460 for presentation to an operator or other user. At block 622, control zone generator 313 can configure functional predictive tractive characteristic control zone map 461 for presentation to an operator or other user. When presented to an operator or other user, the presentation of the functional predictive tractive characteristic map 460 or of functional predictive tractive characteristic control zone map 461, or both, may contain one or more of the predictive values on the functional predictive tractive characteristic map 460 correlated to geographic location, the control zones of functional predictive tractive characteristic control zone map 461 correlated to geographic location, and settings values or control parameters that are used based on the predicted values on functional predictive tractive characteristic map 460 or control zones on functional predictive tractive characteristic control zone map 461. The presentation can, in another example, include more abstracted information or more detailed information. The presentation can also include a confidence level that indicates an accuracy with which the predictive values on functional predictive tractive characteristic map 460 or the control zones on functional predictive tractive characteristic control zone map 461 conform to measured values that may be measured by sensors on mobile agricultural machine 100 as mobile agricultural machine 100 operates at the worksite. Further where information is presented to more than one location, an authentication and authorization system can be provided to implement authentication and authorization processes. For instance, there may be a hierarchy of individuals that are authorized to view and change maps and other presented information. By way of example, an on-board display device may show the maps in near real time locally on the machine, or the maps may also be generated at one or more remote locations, or both. In some examples, each physical display device at each location may be associated with a person or a user permission level. The user permission level may be used to determine which display elements are visible on the physical display device and which values the corresponding person may change. As an example, a local operator of mobile machine 100 may be unable to see the information corresponding to the functional predictive tractive characteristic map 460 or the functional predictive tractive characteristic control zone map 461, or both, or make any changes to machine operation. A supervisor, such as a supervisor at a remote location, however, may be able to see the functional predictive tractive characteristic map 460 or the functional predictive tractive characteristic control zone map 461, or both, on the display but be prevented from making any changes. A manager, who may be at a separate remote location, may be able to see all of the elements on functional predictive tractive characteristic map 460 or functional predictive tractive characteristic control zone map 461, or both, and also be able to change the functional predictive tractive characteristic map 460 or the functional predictive tractive characteristic control zone map 461, or both. In some instances, the functional predictive tractive characteristic map 460 or the functional predictive tractive characteristic control zone map 461, or both, accessible and changeable by a manager located remotely may be used in machine control. This is one example of an authorization hierarchy that may be implemented. The functional predictive tractive characteristic map 460 or functional predictive tractive characteristic control zone map 461, or both, can be configured in other ways as well, as indicated by block 623.

At block 624, input from geographic position sensor 304 and other in-situ sensors 308 are received by the control system 314. Particularly, at block 626, control system 314 detects an input from the geographic position sensor 304 identifying a geographic location of mobile agricultural machine 100. Block 628 represents receipt by the control system 314 of sensor inputs indicative of trajectory or heading of mobile agricultural machine 100, and block 630 represents receipt by the control system 314 of a speed of mobile agricultural machine 100. Block 631 represents receipt by the control system 314 of other information from various other in-situ sensors 308.

At block 632, control system 314 generates control signals to control the controllable subsystems 316 based on the functional predictive tractive characteristic map 460 or the functional predictive tractive characteristic control zone map 461, or both, and the input from the geographic position sensor 304 and any other in-situ sensors 308. At block 634, control system 314 applies the control signals to the controllable subsystems 316. It will be appreciated that the particular control signals that are generated, and the particular controllable subsystems 316 that are controlled, may vary based upon one or more different things. For example, the control signals that are generated and the controllable subsystems 316 that are controlled may be based on the type of functional predictive tractive characteristic map 460 or functional predictive tractive characteristic control zone map 461, or both, that is being used. Similarly, the control signals that are generated and the controllable subsystems 316 that are controlled and the timing of the control signals can be based on various latencies of mobile machine 100 and the responsiveness of the controllable subsystems 316.

By way of example, propulsion controller 331 of control system 314 can generate control signals to control propulsion subsystem 342 to control one or more parameters of propulsion subsystem 342. For example, propulsion controller 331 can generate control signals to control operating parameters of powerplant 344, such as to control an output of powerplant 344, such as by adjusting the speed of powerplant 344, throttling up or throttling down, or providing more or less current. Thus, powerplant 344 can be controlled to adjust its output (e.g., power output) such as to controllably increase or decrease the output (e.g., power) of the powerplant 344 such that the powerplant 344 supplies (or provides) more or less output (e.g., power) to components of mobile machine 100. In another example, propulsion controller 331 can generate control signals to control operating parameters of gear box/transmission 346, such as selecting which gear mobile machine 100 is in or selecting which gear set mobile machine 100 is in. In another example, propulsion controller 331 can generate control signals to control operating parameters of transfer case 348, such as to engage or disengage transfer case 348 (e.g., to engage or disengage 4-wheel drive). In another example, propulsion controller 331 can generate control signals to control a differential lock 350 to lock or unlock a differential. In another example, propulsion controller 331 can generate control signals to control propulsion subsystem 342 to adjust a speed characteristic of mobile machine 100, such as a travel speed, an acceleration, or deceleration. Propulsion controller 331 can generate control signals based on the functional predictive tractive characteristic map 460 or the functional predictive tractive characteristic control zone map 461, or both.

In another example, path planning controller 334 of control system 314 can generate control signals to control steering subsystem 352 to control a route or heading of mobile machine 100, such as one or more of a commanded path at the worksite over which mobile machine 100 travels, and the steering of mobile machine 100, based on the functional predictive tractive characteristic map 460 or the functional predictive tractive characteristic control zone map 461, or both. As an example, path planning controller 334 may generate a route and/or control the steering of mobile machine 100 such that mobile machine 100 avoids travel over a location. In another example, path planning controller 334 may generate a route and/or control the steering of mobile machine 100 such that mobile machine 100 avoids travels over and into a location from a certain direction.

In another example, one or more position controllers 335 of control system 314 can generate control signals to control one or more position subsystems 340 to control a position (e.g., height, depth, angle, etc.) of one or more components of mobile machine 100, such as a frame, a tool, or tool assembly. Position controller 335 can generate control signals to control position subsystems 340 based on functional predictive tractive characteristic map 460 or functional predictive tractive characteristic control zone map 461, or both. For example, tool position controllers 335 can generate control signals to control the position of one or more components of implement 101. For example, tool position controllers 335 may generate control signals to raise one or more of the components of implement 100 (e.g., to reduce operating depth or to take a component out of engagement with the ground altogether) to reduce a draft of mobile machine 100.

In another example, interface controller 330 of control system 314 can generate control signals to control an interface mechanism (e.g., 318 or 364) to generate a display, alert, notification, or other indication based on or indicative of functional predictive tractive characteristic map 460 or functional predictive tractive characteristic control zone map 461, or both.

In another example, communication system controller 329 of control system 314 can generate control signals to control communication system 306 to communicate functional predictive tractive characteristic map 460 or functional predictive tractive characteristic control zone map 461, or both, to another item of agricultural system 300 (e.g., remote computing systems or user interfaces 364).

These are merely examples. Control system 314 can generate various other control signals to control various other items of mobile machine 100 (or agricultural system 300) based on functional predictive tractive characteristic map 460 or functional predictive tractive characteristic control zone map 461, or both.

At block 636, a determination is made as to whether the operation has been completed. If the operation is not completed, the processing advances to block 638 where in-situ sensor data from geographic position sensor 304 and in-situ sensors 308 (and perhaps other sensors) continue to be read.

In some examples, at block 640, agricultural system 300 can also detect learning trigger criteria to perform machine learning on one or more of the functional predictive tractive characteristic map 460, functional predictive tractive characteristic control zone map 461, predictive tractive characteristic model 450, the zones generated by control zone generator 313, one or more control algorithms implemented by the controllers in the control system 314, and other triggered learning.

The learning trigger criteria can include any of a wide variety of different criteria. Some examples of detecting trigger criteria are discussed with respect to blocks 642, 644, 646, 648, and 649. For instance, in some examples, triggered learning can involve recreation of a relationship used to generate a predictive model when a threshold amount of in-situ sensor data are obtained from in-situ sensors 308. In such examples, receipt of an amount of in-situ sensor data from the in-situ sensors 308 that exceeds a threshold triggers or causes the predictive model generator 310 to generate a new predictive model that is used by predictive map generator 312. Thus, as mobile machine 100 continues an operation, receipt of the threshold amount of in-situ sensor data from the in-situ sensors 308 triggers the creation of a new relationship represented by a new tractive characteristic model 450 generated by predictive model generator 310. Further, a new functional predictive tractive characteristic map 460, a new functional predictive tractive characteristic control zone map 461, or both, can be generated using the new predictive tractive characteristic model 450. Block 642 represents detecting a threshold amount of in-situ sensor data used to trigger creation of a new predictive model.

In other examples, the learning trigger criteria may be based on how much the in-situ sensor data from the in-situ sensors 308 are changing, such as over time or compared to previous values. For example, if variations within the in-situ sensor data (or the relationship between the in-situ sensor data and the information in the one or more information maps 358) are within a selected range or is less than a defined amount, or below a threshold value, then a new predictive model is not generated by the predictive model generator 310. As a result, the predictive map generator 312 does not generate a new functional predictive tractive characteristic map 460, a new functional predictive tractive characteristic control zone map 461, or both. However, if variations within the in-situ sensor data are outside of the selected range, are greater than the defined amount, or are above the threshold value, for example, then the predictive model generator 310 generates a new predictive tractive characteristic model 450 using all or a portion of the newly received in-situ sensor data that the predictive map generator 312 uses to generate a new functional predictive tractive characteristic map 460 which can be provided to control zone generator 313 for the creation of a new functional predictive tractive characteristic control zone map 461. At block 644, variations in the in-situ sensor data, such as a magnitude of an amount by which the data exceeds the selected range or a magnitude of the variation of the relationship between the in-situ sensor data and the information in the one or more information maps, can be used as a trigger to cause generation of one or more of a new predictive tractive characteristic model 450, a new functional predictive tractive characteristic map 460, and a new functional predictive tractive characteristic control zone map 461. Keeping with the examples described above, the threshold, the range, and the defined amount can be set to default values; set by an operator or user interaction through a user interface; set by an automated system; or set in other ways.

Other learning trigger criteria can also be used. For instance, if predictive model generator 310 switches to a different information map (different from the originally selected information map), then switching to the different information map may trigger re-learning by predictive model generator 310, predictive map generator 312, control zone generator 313, control system 314, or other items. In another example, transitioning of mobile machine 100 to a different topography or to a different control zone may be used as learning trigger criteria as well.

In some instances, operator 360 or user 366 can also edit the functional predictive tractive characteristic map 460 or functional predictive tractive characteristic control zone map 461, or both. The edits can change a value on the functional predictive tractive characteristic map 460, change a size, shape, position, or existence of a control zone on functional predictive tractive characteristic control zone map 461, or both. Block 646 shows that edited information can be used as learning trigger criteria.

In some instances, it may also be that operator 360 or user 366 observes that automated control of a controllable subsystem 316, is not what the operator or user desires. In such instances, the operator 360 or user 366 may provide a manual adjustment to the controllable subsystem 316 reflecting that the operator 360 or user 366 desires the controllable subsystem 316 to operate in a different way than is being commanded by control system 314. Thus, manual alteration of a setting by the operator 360 or user 366 can cause one or more of predictive model generator 310 to generate a new predictive tractive characteristic model 450, predictive map generator 312 to generate a new functional predictive tractive characteristic map 460, control zone generator 313 to generate one or more new control zones on functional predictive tractive characteristic control zone map 461, and control system 314 to relearn a control algorithm or to perform machine learning on one or more of the controller components 329 through 339 in control system 314 based upon the adjustment by the operator 360 or user 366, as shown in block 648. Block 649 represents the use of other triggered learning criteria.

In other examples, relearning may be performed periodically or intermittently based, for example, upon a selected time interval such as a discrete time interval or a variable time interval, as indicated by block 650.

If relearning is triggered, whether based upon learning trigger criteria or based upon passage of a time interval, as indicated by block 650, then one or more of the predictive model generator 310, predictive map generator 312, control zone generator 313, and control system 314 performs machine learning to generate a new predictive model, a new predictive map, a new control zone, and a new control algorithm, respectively, based upon the learning trigger criteria. The new predictive model, the new predictive map, the new control zone, and the new control algorithm are generated using any additional data that has been collected since the last learning operation was performed. Performing relearning is indicated by block 652.

If the operation has been completed, operation moves from block 652 to block 654 where one or more of the functional predictive tractive characteristic map 460, functional predictive tractive characteristic control zone map 461, the predictive tractive characteristic model 450, the control zone(s), and the control algorithm(s), are stored. The functional predictive tractive characteristic map 460, functional predictive tractive characteristic control zone map 461, predictive tractive characteristic model 450, control zone(s), and control algorithm(s), may be stored locally on data store 302 or sent to a remote system using communication system 306 for later use.

If the operation has not been completed, operation moves from block 652 to block such that the one or more of the new predictive model, the new functional predictive map, the new functional predictive control zone map, the new control zone(s), and the new control algorithm(s) can be used in the control of mobile agricultural machine 100.

The examples herein describe the generation of a predictive model and, in some examples, the generation of a functional predictive map based on the predictive model. The examples described herein are distinguished from other approaches by the use of a model which is at least one of multi-variate or site-specific (i.e., georeferenced, such as map-based). Furthermore, the model is revised as the work machine is performing an operation and while additional in-situ sensor data is collected. The model may also be applied in the future beyond the current worksite. For example, the model may form a baseline (e.g., starting point) for a subsequent operation at a different worksite or the same worksite at a future time.

The revision of the model in response to new data may employ machine learning methods. Without limitation, machine learning methods may include memory networks, Bayes systems, decisions trees, Eigenvectors, Eigenvalues and Machine Learning, Evolutionary and Genetic Algorithms, Cluster Analysis, Expert Systems/Rules, Support Vector Machines, Engines/Symbolic Reasoning, Generative Adversarial Networks (GANs), Graph Analytics and ML, Linear Regression, Logistic Regression, LSTMs and Recurrent Neural Networks (RNNSs), Convolutional Neural Networks (CNNs), MCMC, Random Forests, Reinforcement Learning or Reward-based machine learning. Learning may be supervised or unsupervised.

Model implementations may be mathematical, making use of mathematical equations, empirical correlations, statistics, tables, matrices, and the like. Other model implementations may rely more on symbols, knowledge bases, and logic such as rule-based systems. Some implementations are hybrid, utilizing both mathematics and logic. Some models may incorporate random, non-deterministic, or unpredictable elements. Some model implementations may make uses of networks of data values such as neural networks. These are just some examples of models.

The predictive paradigm examples described herein differ from non-predictive approaches where an actuator or other machine parameter is fixed at the time the machine, system, or component is designed, set once before the machine enters the worksite, is reactively adjusted manually based on operator perception, or is reactively adjusted based on a sensor value.

The functional predictive map examples described herein also differ from other map-based approaches. In some examples of these other approaches, an a priori control map is used without any modification based on in-situ sensor data or else a difference determined between data from an in-situ sensor and a predictive map are used to calibrate the in-situ sensor. In some examples of the other approaches, sensor data may be mathematically combined with a priori data to generate control signals, but in a location-agnostic way; that is, an adjustment to an a priori, georeferenced predictive setting is applied independent of the location of the work machine at the worksite. The continued use or end of use of the adjustment, in the other approaches, is not dependent on the work machine being in a particular defined location or region within the worksite.

In examples described herein, the functional predictive maps and predictive actuator control rely on obtained maps and in-situ data that are used to generate predictive models. The predictive models are then revised during the operation to generate revised functional predictive maps and revised actuator control. In some examples, the actuator control is provided based on functional predictive control zone maps which are also revised during the operation at the worksite. In some examples, the revisions (e.g., adjustments, calibrations, etc.) are tied to regions or zones of the worksite rather than to the whole worksite or some non-georeferenced condition. For example, the adjustments are applied to one or more areas of a worksite to which an adjustment is determined to be relevant (e.g., such as by satisfying one or more conditions which may result in application of an adjustment to one or more locations while not applying the adjustment to one or more other locations), as opposed to applying a change in a blanket way to every location in a non-selective way.

In some examples described herein, the models determine and apply those adjustments to selective portions or zones of the worksite based on a set of a priori data, which, in some instances, is multivariate in nature. For example, adjustments may, without limitation, be tied to defined portions of the worksite based on site-specific factors such as topography, soil type, crop variety, soil moisture, as well as various other factors, alone or in combination. Consequently, the adjustments are applied to the portions of the field in which the site-specific factors satisfy one or more criteria and not to other portions of the field where those site-specific factors do not satisfy the one or more criteria. Thus, in some examples described herein, the model generates a revised functional predictive map for at least the current location or zone, the unworked part of the worksite, or the whole worksite.

As an example, in which the adjustment is applied only to certain areas of the field, consider the following. The system may determine that a detected in-situ characteristic value varies from a predictive value of the characteristic, such as by a threshold amount. This deviation may only be detected in areas of the field where the elevation of the worksite is above a certain level. Thus, the revision to the predictive value is only applied to other areas of the worksite having elevation above the certain level. In this simpler example, the predictive characteristic value and elevation at the point the deviation occurred and the detected characteristic value and elevation at the point the deviation cross the threshold are used to generate a linear equation. The linear equation is used to adjust the predictive characteristic value in areas of the worksite (which have not yet been operated on in the current operation) in the functional predictive map as a function of elevation and the predicted characteristic value. This results in a revised functional predictive map in which some values are adjusted while others remain unchanged based on selected criteria, e.g., elevation as well as threshold deviation. The revised functional map is then used to generate a revised functional control zone map for controlling the machine.

As an example, without limitation, consider an instance of the paradigm described herein which is parameterized as follows.

One or more maps of the field are obtained, such as one or more of a topographic map, a soil property map, a prior operation map, a ground cover map, and another type of map.

In-situ sensors generate sensor data indicative of in-situ characteristic values, such as in-situ tractive characteristic values.

A predictive model generator generates one or more predictive models based on the one or more obtained maps and the in-situ sensor data, such as a predictive tractive characteristic model.

A predictive map generator generates one or more functional predictive maps based on a model generated by the predictive model generator and the one or more obtained maps. For example, the predictive map generator may generate a functional predictive tractive characteristic map that maps predictive tractive characteristic values to one or more locations on the worksite based on a predictive tractive characteristic model and the one or more obtained maps.

Control zones, which include machine settings values, can be incorporated into the functional predictive tractive characteristic map to generate a functional predictive tractive characteristic map with control zones.

As the mobile machine continues to operate at the worksite, additional in-situ sensor data is collected. A learning trigger criteria can be detected, such as threshold amount of additional in-situ sensor data being collected, a magnitude of change in a relationship (e.g., the in-situ characteristic values varies to a certain [e.g., threshold] degree from a predictive value of the characteristic), and operator or user makes edits to the predictive map(s) or to a control algorithm, or both, a certain (e.g., threshold) amount of time elapses, as well as various other learning trigger criteria. The predictive model(s) are then revised based on the additional in-situ sensor data and the values from the obtained maps. The functional predictive maps or the functional predictive control zone maps, or both, are then revised based on the revised model(s) and the values in the obtained maps.

The present discussion has mentioned processors and servers. In some examples, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. The displays can take a wide variety of different forms and can have a wide variety of different user actuatable operator interface mechanisms disposed thereon. For instance, user actuatable operator interface mechanisms may include text boxes, check boxes, icons, links, drop-down menus, search boxes, etc. The user actuatable operator interface mechanisms can also be actuated in a wide variety of different ways. For instance, they can be actuated using operator interface mechanisms such as a point and click device, such as a track ball or mouse, hardware buttons, switches, a joystick or keyboard, thumb switches or thumb pads, etc., a virtual keyboard or other virtual actuators. In addition, where the screen on which the user actuatable operator interface mechanisms are displayed is a touch sensitive screen, the user actuatable operator interface mechanisms can be actuated using touch gestures. Also, user actuatable operator interface mechanisms can be actuated using speech commands using speech recognition functionality. Speech recognition may be implemented using a speech detection device, such as a microphone, and software that functions to recognize detected speech and execute commands based on the received speech.

A number of data stores have also been discussed. It will be noted the data stores can each be broken into multiple data stores. In some examples, one or more of the data stores may be local to the systems accessing the data stores, one or more of the data stores may all be located remote form a system utilizing the data store, or one or more data stores may be local while others are remote. All of these configurations are contemplated by the present disclosure.

Also, the figures show a number of blocks with functionality ascribed to each block. It will be noted that fewer blocks can be used to illustrate that the functionality ascribed to multiple different blocks is performed by fewer components. Also, more blocks can be used illustrating that the functionality may be distributed among more components. In different examples, some functionality may be added, and some may be removed.

It will be noted that the above discussion has described a variety of different systems, components, logic and interactions. It will be appreciated that any or all of such systems, components, logic and interactions may be implemented by hardware items, such as processors, memory, or other processing components, some of which are described below, that perform the functions associated with those systems, components, or logic, or interactions. In addition, any or all of the systems, components, logic and interactions may be implemented by software that is loaded into a memory and is subsequently executed by a processor or server or other computing component, as described below. Any or all of the systems, components, logic and interactions may also be implemented by different combinations of hardware, software, firmware, etc., some examples of which are described below. These are some examples of different structures that may be used to implement any or all of the systems, components, logic and interactions described above. Other structures may be used as well.

Figure 9:
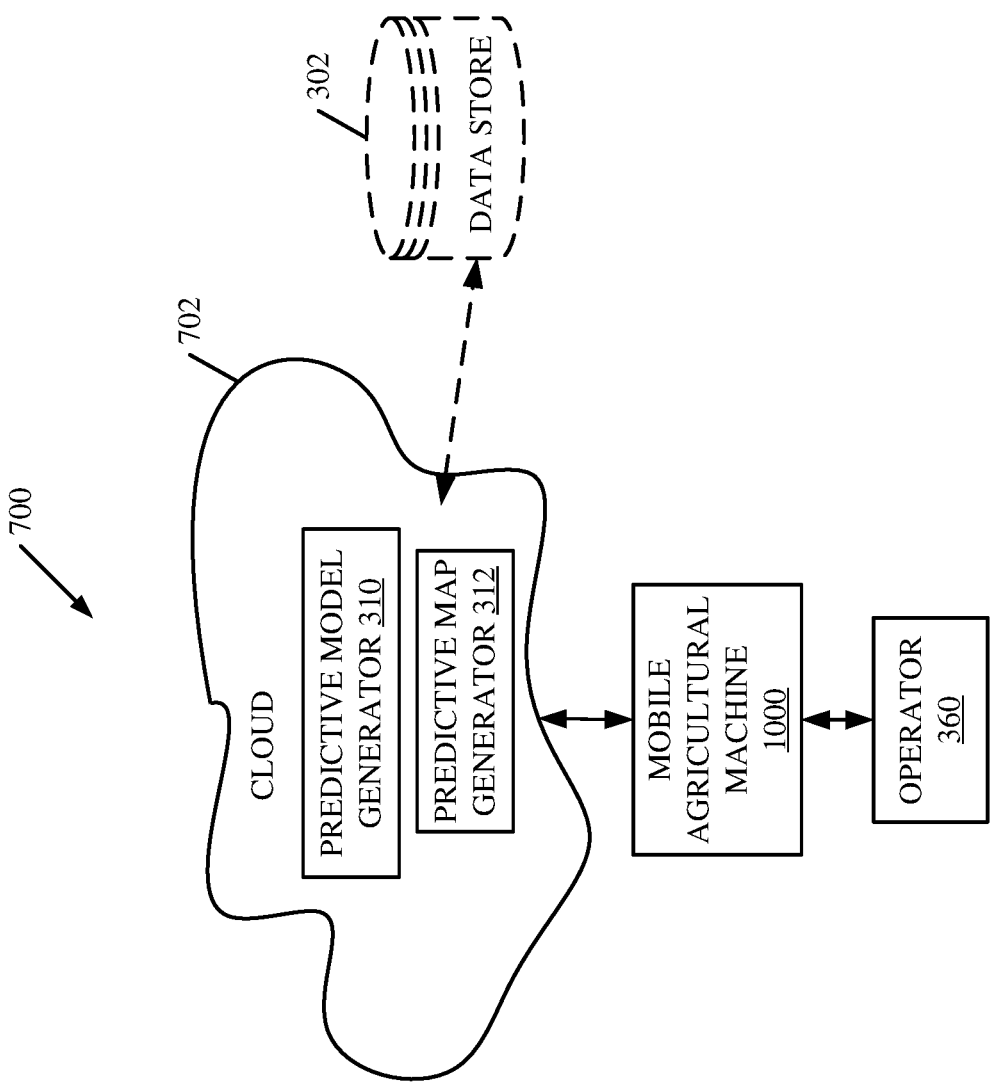
FIG. 9 is a block diagram showing one example of a mobile agricultural machine in communication with a remote server environment.

FIG. 9 is a block diagram of mobile agricultural machine 1000, which may be similar to mobile agricultural machine 100 shown in FIG. 6. The mobile machine 1000 communicates with elements in a remote server architecture 700. In some examples, remote server architecture 700 provides computation, software, data access, and storage services that do not require end-user knowledge of the physical location or configuration of the system that delivers the services. In various examples, remote servers may deliver the services over a wide area network, such as the internet, using appropriate protocols. For instance, remote servers may deliver applications over a wide area network and may be accessible through a web browser or any other computing component. Software or components shown in FIG. 6 as well as data associated therewith, may be stored on servers at a remote location. The computing resources in a remote server environment may be consolidated at a remote data center location, or the computing resources may be dispersed to a plurality of remote data centers. Remote server infrastructures may deliver services through shared data centers, even though the services appear as a single point of access for the user. Thus, the components and functions described herein may be provided from a remote server at a remote location using a remote server architecture. Alternatively, the components and functions may be provided from a server, or the components and functions can be installed on client devices directly, or in other ways.

In the example shown in FIG. 9, some items are similar to those shown in FIG. 6 and those items are similarly numbered. FIG. 9 specifically shows that predictive model generator 310 or predictive map generator 312, or both, may be located at a server location 702 that is remote from the mobile machine 1000. Therefore, in the example shown in FIG. 9, mobile machine 1000 accesses systems through remote server location 702. In other examples, various other items may also be located at server location 702, such as data store 302, map selector 309, predictive model 311, functional predictive maps 263 (including predictive maps 264 and predictive control zone maps 265), control zone generator 313, and processing system 338.

FIG. 9 also depicts another example of a remote server architecture. FIG. 9 shows that some elements of FIG. 9 may be disposed at a remote server location 702 while others may be located elsewhere. By way of example, data store 302 may be disposed at a location separate from location 702 and accessed via the remote server at location 702. Regardless of where the elements are located, the elements can be accessed directly by mobile machine 1000 through a network such as a wide area network or a local area network; the elements can be hosted at a remote site by a service; or the elements can be provided as a service or accessed by a connection service that resides in a remote location. Also, data may be stored in any location, and the stored data may be accessed by, or forwarded to, operators, users or systems. For instance, physical carriers may be used instead of, or in addition to, electromagnetic wave carriers. In some examples, where wireless telecommunication service coverage is poor or nonexistent, another machine, such as a fuel truck or other mobile machine or vehicle, may have an automated, semi-automated or manual information collection system. As the mobile machine 1000 comes close to the machine containing the information collection system, such as a fuel truck prior to fueling, the information collection system collects the information from the mobile machine 1000 using any type of ad-hoc wireless connection. The collected information may then be forwarded to another network when the machine containing the received information reaches a location where wireless telecommunication service coverage or other wireless coverage—is available. For instance, a fuel truck may enter an area having wireless communication coverage when traveling to a location to fuel other machines or when at a main fuel storage location. All of these architectures are contemplated herein. Further, the information may be stored on the mobile machine 1000 until the mobile machine 1000 enters an area having wireless communication coverage. The mobile machine 1000, itself, may send the information to another network.

It will also be noted that the elements of FIG. 6, or portions thereof, may be disposed on a wide variety of different devices. One or more of those devices may include an on-board computer, an electronic control unit, a display unit, a server, a desktop computer, a laptop computer, a tablet computer, or other mobile device, such as a palm top computer, a cell phone, a smart phone, a multimedia player, a personal digital assistant, etc.

In some examples, remote server architecture 700 may include cybersecurity measures. Without limitation, these measures may include encryption of data on storage devices, encryption of data sent between network nodes, authentication of people or processes accessing data, as well as the use of ledgers for recording metadata, data, data transfers, data accesses, and data transformations. In some examples, the ledgers may be distributed and immutable (e.g., implemented as blockchain).

Figure 10:
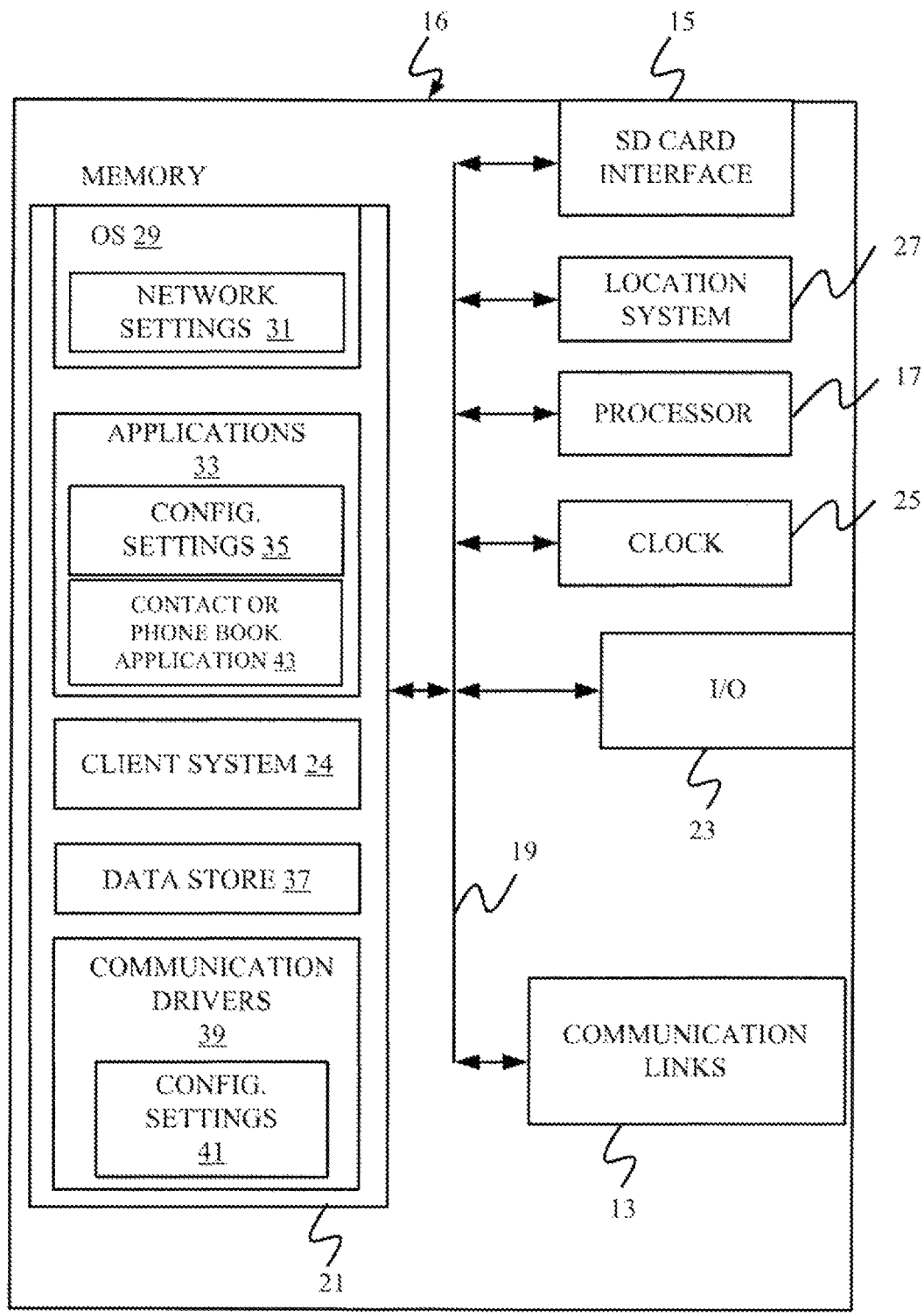
FIGS. 10-12 show examples of mobile devices that can be used in an agricultural system.
Figure 11:
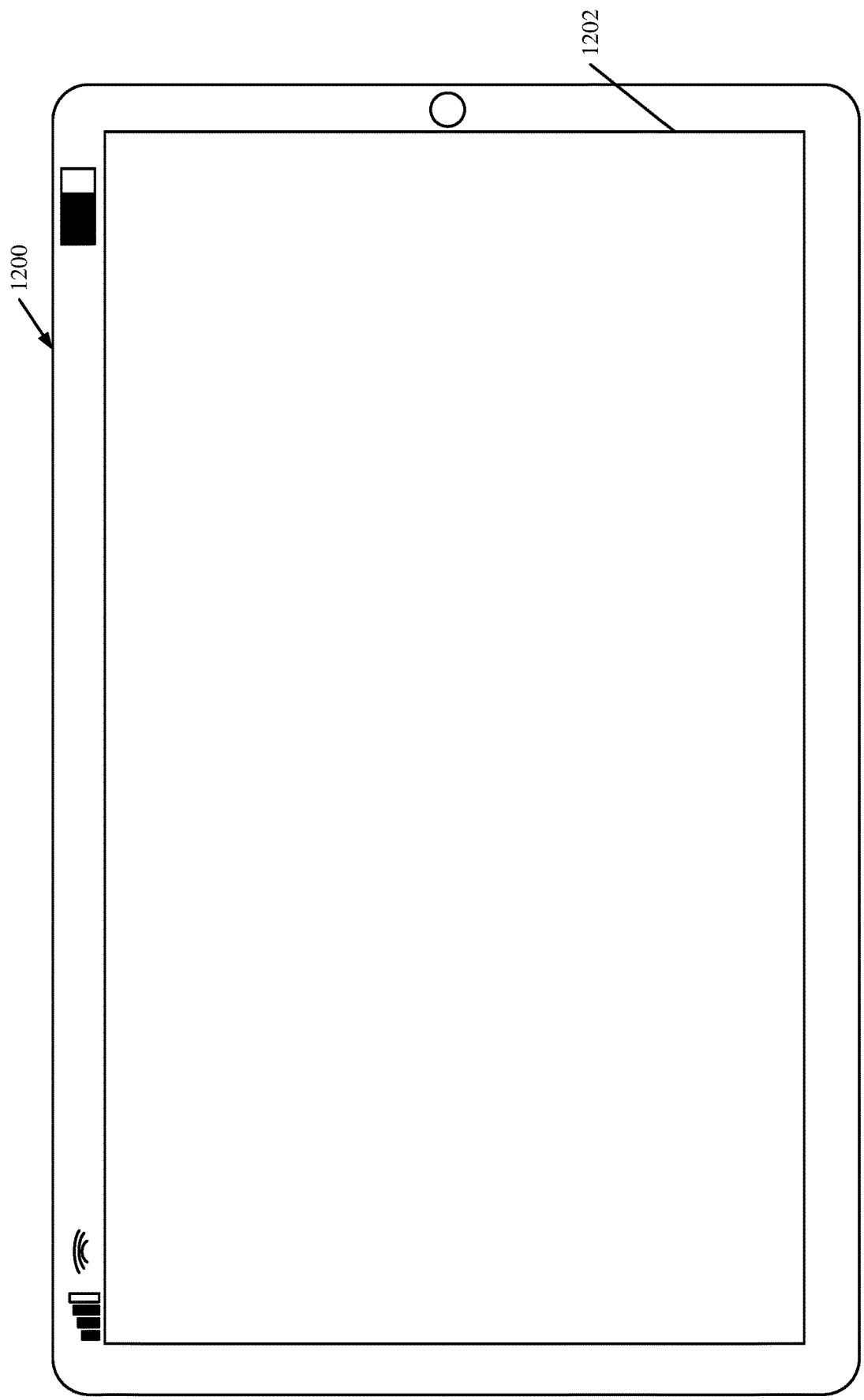
Figure 12:
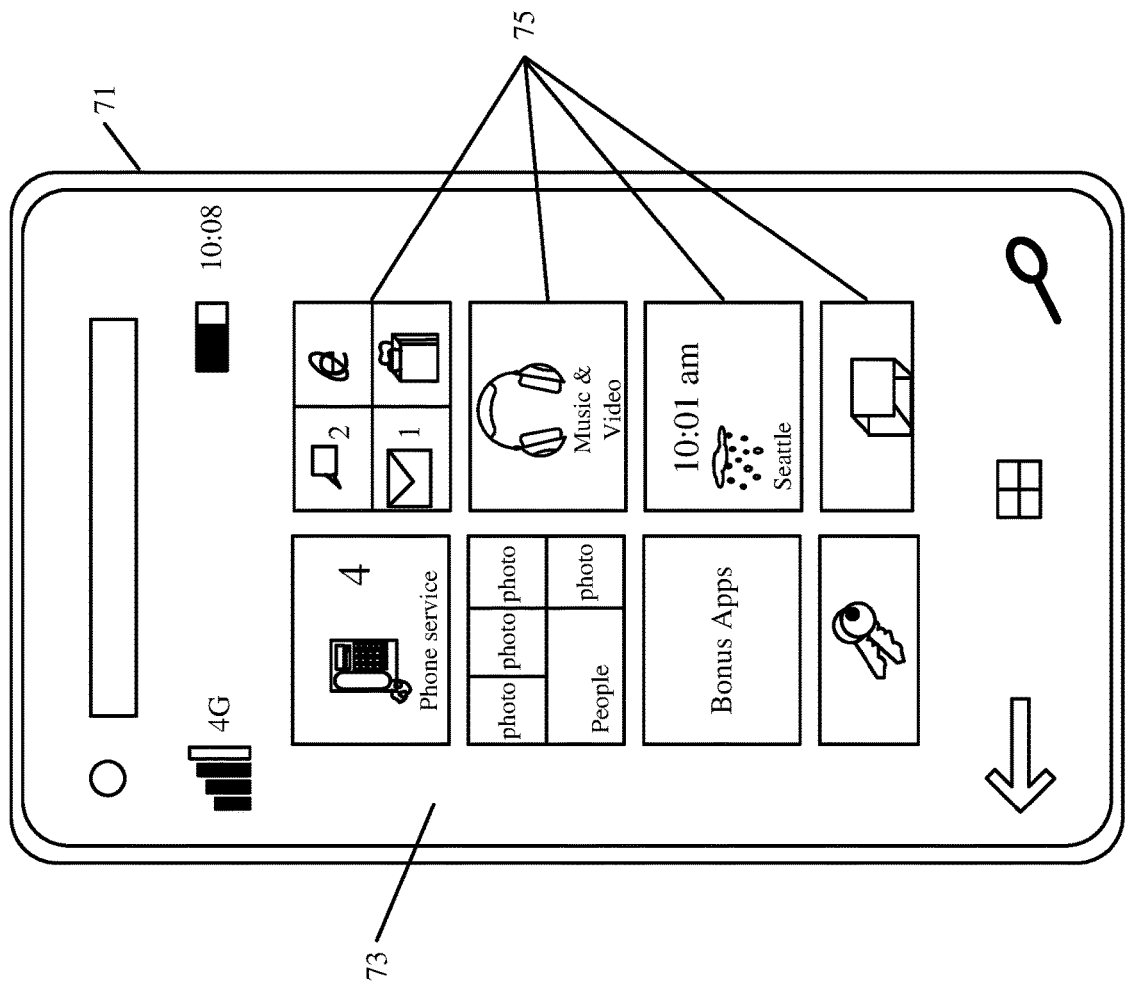

FIG. 10 is a simplified block diagram of one illustrative example of a handheld or mobile computing device that can be used as a user's or client's hand held device 16, in which the present system (or parts of it) can be deployed. For instance, a mobile device can be deployed in the operator compartment of mobile machine 100 for use in generating, processing, or displaying the maps discussed above. FIGS. 11-12 are examples of handheld or mobile devices.

FIG. 10 provides a general block diagram of the components of a client device 16 that can run some components shown in FIG. 6, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. UO components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. Location system 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 may also include computer storage media (described below). Memory 21 stores computer readable instructions that, when executed by processor 17, cause the processor to perform computer-implemented steps or functions according to the instructions. Processor 17 may be activated by other components to facilitate their functionality as well.

FIG. 11 shows one example in which device 16 is a tablet computer 1200. In FIG. 11, computer 1200 is shown with user interface display screen 1202. Screen 1202 can be a touch screen or a pen-enabled interface that receives inputs from a pen or stylus. Tablet computer 1200 may also use an on-screen virtual keyboard. Of course, computer 1200 might also be attached to a keyboard or other user input device through a suitable attachment mechanism, such as a wireless link or USB port, for instance. Computer 1200 may also illustratively receive voice inputs as well.

FIG. 12 is similar to FIG. 11 except that the device is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
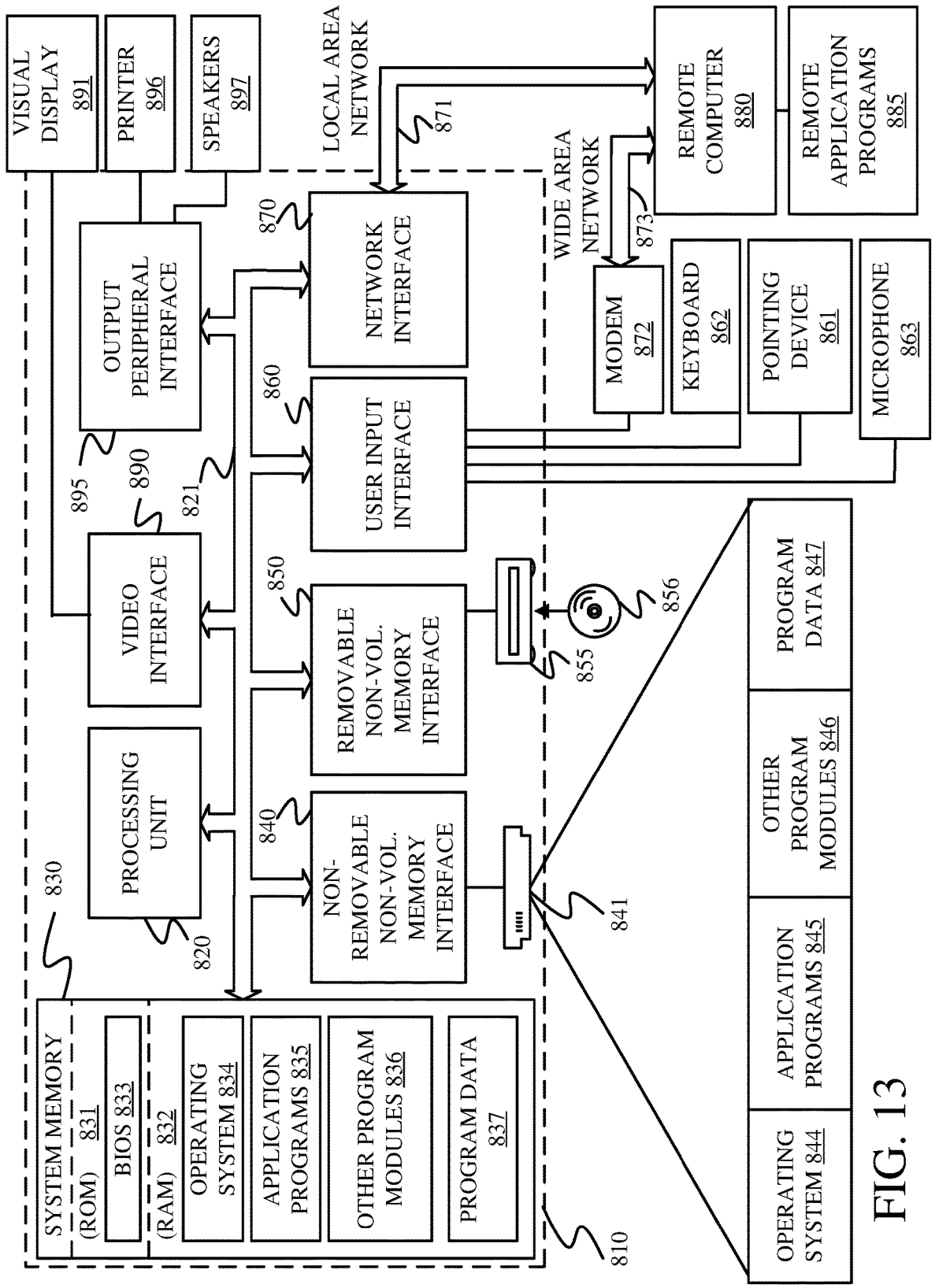
FIG. 13 is a block diagram showing one example of a computing environment that can be used in an agricultural system.

FIG. 13 is one example of a computing environment in which elements of FIG. 6 can be deployed. With reference to FIG. 13, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 6 can be deployed in corresponding portions of FIG. 13.

Computer 810 typically includes a variety of computer readable media. Computer readable media may be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. Computer readable media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory or both such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data or program modules or both that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of the claims

What is claimed is:

1. An agricultural system comprising:
a communication system that receives an information map that maps values of a characteristic to different geographic locations in the field;
an in-situ sensor that detects a tractive characteristic value corresponding to a geographic location;
a predictive model generator that generates a predictive tractive characteristic model indicative of a relationship between the characteristic and the tractive characteristic based on the tractive characteristic value detected by the in-situ sensor corresponding to the geographic location and a value of the characteristic in the information map corresponding to the geographic location;
a predictive map generator that generates a functional predictive tractive characteristic map of the field that maps predictive tractive characteristic values to the different geographic locations in the field based on the values of the characteristic in the information map and based on the predictive tractive characteristic model; and
wherein the predictive map generator configures the functional predictive tractive characteristic map for consumption by a control system that generates control signals to proactively control a controllable subsystem of a mobile machine based on the functional predictive tractive characteristic map.

2. The agricultural system of claim 1, wherein the tractive characteristic is one of tractive effort, tractive efficiency, wheel slip, or draft.

3. The agricultural system of claim 1, wherein the information map is one of:
a topographic map that maps, as the values of the characteristic, topographic characteristic values to the different geographic locations in the field;
a soil property map that maps, as the values of the characteristic, soil property values to the different geographic locations in the field;
a prior operation map that maps, as the values of the characteristic, prior operation characteristic values to the different geographic locations in the field; or
a ground cover map that maps, as the values of the characteristic, ground cover values to the different geographic locations in the field.

4. The agricultural system of claim 1, wherein the information map comprises two or more information maps, each of the two or more information maps mapping values of a respective characteristic to the different geographic locations in the field,
wherein the predictive model generator generates, as the predictive tractive characteristic model, a predictive tractive characteristic model indicative of a relationship between the two or more respective characteristics and the tractive characteristic based on the tractive characteristic value detected by the in-situ sensor corresponding to the geographic location and the values of the two or more respective characteristics in the two or more information maps corresponding to the geographic location, and
wherein the predictive map generator generates, as the functional predictive tractive characteristic map, a functional predictive tractive characteristic map that maps predictive tractive characteristic values to the different geographic locations in the field based on the values of the two more characteristics in the two or more information maps corresponding to the different geographic locations and the predictive tractive characteristic model.

5. The agricultural system of claim 1, wherein the in-situ sensor comprises two or more in-situ sensors, each of the two or more in-situ sensors detecting a value of a respective tractive characteristic corresponding to the geographic location,
wherein the predictive model generator generates, as the predictive tractive characteristic model, a predictive tractive characteristic model indicative of a relationship between the characteristic and the two or more respective tractive characteristics based on the value of the two or more tractive characteristics detected by two or more in-situ sensors corresponding to the geographic location and the value of the characteristics in the information map corresponding to the geographic location, and
wherein the predictive map generator generates, as the functional predictive tractive characteristic map, a functional predictive tractive characteristic map that maps predictive values of two or more tractive characteristics to the different geographic locations in the field based on the values of the characteristic in the information map corresponding to the different geographic locations and the predictive tractive characteristic model.

6. The agricultural system of claim 1 and further comprising:
a control system that generates a control signal to control a controllable subsystem of a mobile machine based on the functional predictive tractive characteristic map.

7. The agricultural system of claim 6, wherein the controllable subsystem comprises a steering subsystem and wherein the control signal controls the steering subsystem to control a heading of the mobile machine.

8. The agricultural system of claim 6, wherein the controllable subsystem comprises a position subsystem and wherein the control signal controls the position subsystem to control a position of a component of the mobile machine.

9. The agricultural system of claim 1 and further comprising
a control system that generates a control signal to control a component of a propulsion subsystem of a mobile machine based on the functional predictive tractive characteristic map, wherein the component comprises one of:
a powerplant, and wherein the control signal controls the powerplant to supply more power;
a gear box, and wherein the control signal selects a gear of the gear box;
a transfer case, and wherein the control signal activates the transfer case to lock a first drive shaft to a second drive shaft; or
a differential lock that is controllable to lock a differential; and wherein the control signal controls the differential lock to lock the differential.

10. A computer implemented method comprising:
receiving an information map that maps values of a characteristic to different geographic locations in a field;
obtaining in-situ sensor data indicative of a value of a tractive characteristic corresponding to a geographic location at the field;
generating a predictive tractive characteristic model indicative of a relationship between the characteristic and the tractive characteristic; and
controlling a predictive map generator to generate a functional predictive tractive characteristic map of the field, that maps predictive values of the tractive characteristic to the different locations in the field based on the values of the characteristic in the information map and the predictive tractive characteristic model.

11. The computer implemented method of claim 10 and further comprising:
controlling a controllable subsystem of a mobile machine based on the functional predictive tractive characteristic map.

12. The computer implemented method of claim 11, wherein controlling the controllable subsystem comprises controlling a propulsion subsystem of the mobile machine based on the functional predictive tractive characteristic map.

13. The computer implemented method of claim 11, wherein controlling the controllable subsystem comprises controlling a steering subsystem of the mobile machine based on the functional predictive tractive characteristic map.

14. The computer implemented method of claim 11, wherein controlling the controllable subsystem comprises controlling a position subsystem to control a position of a component of the mobile machine based on the functional predictive tractive characteristic map.

15. A mobile agricultural machine, comprising:
- a communication system that receives an information map that maps values of a characteristic to different geographic locations in a field;
- a geographic position sensor that detects a geographic location of the mobile agricultural machine;
- an in-situ sensor that detects a tractive characteristic value corresponding to a geographic location, wherein the tractive characteristic value is one of a tractive effort value, a tractive efficiency value, a wheel slip value, and a draft value;
- a predictive model generator that generates a predictive tractive characteristic model indicative of a relationship between values of the characteristic and tractive characteristic values based on the tractive characteristic value detected by the in-situ sensor corresponding to the geographic location and a value of the characteristic in the information map corresponding to the geographic location;
- a predictive map generator that generates a functional predictive tractive characteristic map of the field, that maps predictive tractive characteristic values to the different geographic locations in the field, based on the values of the characteristic in the information map corresponding to those different geographic locations and based on the predictive tractive characteristic model; and
- a control system that generates a control signal to proactively control at least one of a position subsystem, a propulsion subsystem, and a steering subsystem of the mobile agricultural machine based on the functional predictive tractive characteristic map and the geographic location of the mobile agricultural machine.

16. The mobile agricultural machine of claim 15, wherein the control system generates the control signal to control a position subsystem of the mobile agricultural machine.

17. The mobile agricultural machine of claim 15, wherein the control system generates the control signal to control a propulsion subsystem of the mobile agricultural machine.

18. The mobile agricultural machine of claim 15, wherein the control system generates the control signal to control a steering subsystem of the mobile agricultural machine.

* * * * *